US012260027B2

(12) United States Patent
Molla

(10) Patent No.: US 12,260,027 B2
(45) Date of Patent: Mar. 25, 2025

(54) ETHIOPIC SINGLE TO THREE KEYSTROKES TYPING

(71) Applicant: Aberra Molla, Brighton, CO (US)

(72) Inventor: Aberra Molla, Brighton, CO (US)

( * ) Notice: Subject to any disclaimer, the term of this patent is extended or adjusted under 35 U.S.C. 154(b) by 0 days.

(21) Appl. No.: 18/090,331

(22) Filed: Dec. 28, 2022

(65) Prior Publication Data

US 2023/0376124 A1 Nov. 23, 2023

Related U.S. Application Data

(60) Provisional application No. 63/294,691, filed on Dec. 29, 2021.

(51) Int. Cl.

| | |
|---|---|
| ***G06F 3/02*** | (2006.01) |
| ***G06F 3/023*** | (2006.01) |
| ***G06F 3/04895*** | (2022.01) |

(52) U.S. Cl.

CPC .......... *G06F 3/0219* (2013.01); *G06F 3/0238* (2013.01); *G06F 3/04895* (2013.01)

(58) Field of Classification Search

CPC ... G06F 3/0219; G06F 3/0238; G06F 3/04895

See application file for complete search history.

(56) References Cited

U.S. PATENT DOCUMENTS

| | | | |
|---|---|---|---|
| 4,694,280 | A | 9/1987 | Rollhaus et al. |
| 4,891,786 | A | 1/1990 | Goldwasser |
| 5,339,358 | A | 8/1994 | Danish et al. |
| 6,054,941 | A | 4/2000 | Chen |
| 6,130,628 | A | 10/2000 | Schneider-Humfschmidt et al. |
| 6,378,234 | B1 | 4/2002 | Luo |

(Continued)

FOREIGN PATENT DOCUMENTS

| | | |
|---|---|---|
| WO | WO 2023/225663 | 11/2023 |

OTHER PUBLICATIONS

Abebe et al., "Ethiopic Keyboard Mapping and Predictive Text Inputting Algorithm in a Wireless Environment," University of California at Irvine, Department of Mechanical and Aerospace Engineering, Henri Samueli School of Engineering, Jan. 2004, retrieved from https://web.archive.org/web/20210916224035/http://digitaladdis.com/sk/PTIE_Wireless.pdf, 15 pages.

(Continued)

*Primary Examiner* — Priyank J Shah

(74) *Attorney, Agent, or Firm* — SHERIDAN ROSS P.C.

(57) ABSTRACT

A programing method that increases the number of keys available especially for Ethiopic typing to render and settle in computer and virtual keyboards by many folds is provided. The Ethiopic Unicode or other glyphs close to 500 where the default is typed with one keystroke each and the rest with two keystroke each with more efficient novelty is described. It is also possible to increase the keystrokes of some to three, especially to make typing simple with consideration to the spread of the keys on computers. The efficiency of the Ethiopic novel writing system in QWERTY, Heleheme, and other layouts including virtual abbreviated, non-abbreviated, ligated keyboards and the like as well as those useable by other non-default and Unicode alphabets in more than one typing methods in different layouts of the Ethiopic and other world glyphs is described.

12 Claims, 46 Drawing Sheets

(56) References Cited

U.S. PATENT DOCUMENTS

| | | | | |
|---|---|---|---|---|
| 6,430,314 | B1 | 8/2002 | Ko | |
| 6,559,778 | B1 | 5/2003 | Hillmering | |
| 6,753,794 | B1 | 6/2004 | Adams | |
| 6,765,556 | B2 | 7/2004 | Kandogan et al. | |
| 6,822,585 | B1 | 11/2004 | Ni et al. | |
| 7,015,896 | B2 | 3/2006 | Levy et al. | |
| 7,170,430 | B2 | 1/2007 | Goodgoll | |
| 9,000,957 | B2 | 4/2015 | Molla | |
| 9,733,724 | B2 | 8/2017 | Molla | |
| 10,067,574 | B2 | 2/2018 | Molla | |
| 10,133,362 | B2 | 11/2018 | Molla | |
| 2002/0025837 | A1 | 2/2002 | Levy | |
| 2004/0001734 | A1 | 1/2004 | Burrell, IV | |
| 2004/0075648 | A1 | 4/2004 | Koch et al. | |
| 2005/0027534 | A1 | 2/2005 | Meurs | |
| 2005/0182616 | A1 | 8/2005 | Kotipalli | |
| 2006/0061556 | A1 | 3/2006 | Yamane | |
| 2006/0192765 | A1 | 8/2006 | Lin | |
| 2007/0005537 | A1 | 1/2007 | Abdulkader | |
| 2007/0008287 | A1 | 1/2007 | Lin | |
| 2007/0016858 | A1 | 1/2007 | Lee | |
| 2007/0288240 | A1 | 12/2007 | Huang | |
| 2008/0215307 | A1 | 9/2008 | Li | |
| 2008/0215308 | A1 | 9/2008 | Li | |
| 2008/0270111 | A1 | 10/2008 | Hanumanthappa | |
| 2009/0132231 | A1 | 5/2009 | O'Dell | |
| 2010/0107906 | A1 | 5/2010 | Johnson et al. | |
| 2012/0306747 | A1* | 12/2012 | Davidson | G06F 3/04895 345/160 |
| 2013/0057478 | A1 | 3/2013 | Rahmato | |
| 2017/0060261 | A1 | 3/2017 | Molla | |
| 2017/0185164 | A1* | 6/2017 | Molla | G06F 3/0235 |

OTHER PUBLICATIONS

Tamene et al., "Design of Virtual Keyboard for Ethiopic Text Entry on Mobile Devices," Proceedings of the 1st EICTF, 2011, Oct. 27, 2011, 59 pages.
International Search Report and Written Opinion for International (PCT) Patent Application No. PCT/IB2023/000614, dated Jan. 25, 2024, 20 pages.
U.S. Appl. No. 29/854,924, filed Oct. 12, 2022, Molla.
U.S. Appl. No. 17/803,701, filed Oct. 15, 2022, Molla.
U.S. Appl. No. 18/518,228, filed Nov. 22, 2023, Molla.
U.S. Appl. No. 18/518,262, filed Nov. 22, 2023, Molla.
"Abyssinica Amharic Keyboard for iOS Systems," Abyssinica Technologies, Oct. 7, 2014, retrieved from https://web.archive.org/web/20170620030618/https://blog.abyssinica.com/post/abyssinica-amharic-keyboard-for-ios, 8 pages.
"Abyssinica Translator—The Amharic Machine Translator," Kekros Systems, archived webpage dated Mar. 12, 2023, retrieved from https://web.archive.org/web/20230312231701/https://translator.abyssinica.com/, 2 pages.
"Agerigna Amharic Keyboard," Uploaded to Google Play Store by Agerigna Co., Ltd., last updated Sep. 4, 2023, retrieved from https://play.google.com/store/apps/details?id=com.agerigna.keyboard&hl=en_US&gl=US&pli=1, 3 pages.
"Amharic (GFF) Keyboard Help," Ge'ez Frontier Foundation, 2009, retrieved from https://help.keyman.com/keyboard/gff amh7/1.5/gff amh 7, 7 pages.
"Amharic Typing," Abyssinica Dictionary, archived webpage dated Jul. 26, 2015, retrieved from https://web.archive.org/web/20150726003657/https://dictionary.abyssinica.com/amharicTyping.a spx, 2 pages.
"Amharic," Wikipedia, revision dated Feb. 21, 2019, retrieved from https://en.wikipedia.org/w/index.php?title=Amharic&oldid=884481067, 13 pages.
"Amharic: Difference between revisions," Wikipedia, Feb. 23, 2019, retrieved from https://en.wikipedia.org/w/index.php?title=Amharic&diff=884761716&oldid=884761499, 14 pages.
"AmharicDictionary.com," SelamSoft Inc., 2008, retrieved from http://www.amharicdictionary.com, retrieved on Oct. 2, 2008, 1 page.
"BrannaEditor—Amharic Text Editor," EthioCloud, copyright 2023, retrieved from https://www.ethiocloud.com/brannaeditor.aspx/, 2 pages.
"Gate2Home-Ethiopic Keyboard," retrieved from http://gate2home.com/Ethiopic-Keyboard, retrieved on Nov. 4, 2015, 2 pages.
"GeezEdit 2.0," Ethiopian Computers & Software, 2009, retrieved from http://www.ethiopic.com/, 14 pages.
"GeezEdit Amharic Keyboard," Uploaded to Google Play Store by Aberra Molla, last updated Apr. 25, 2019, retrieved from https://play.google.com/store/apps/details?id=com.aol.geezedit.keyboard&hl=en_US&gl=US, 2 pages.
"GeezEdit Amharic Typing on Android Cell Phones," ABSHA/ECS, archived webpage dated Jun. 29, 2013, retrieved from https://archive.is/bff7v#selection-425.0-428.0, 4 pages.
"GeezEdit Amharic," Uploaded to Apple App Store by Aberra Molla, archived webpage dated May 5, 2021, retrieved from https://web.archive.org/web/20210505193157/https://apps.apple.com/US/app/geezedit-amharic/id935624754, 3 pages.
"Google Input Tools Amharic for Google Amharic Typing," Typing Keyboards, 2019, retrieved from https://typingkeyboards.com/google-input-tool-amharic/, 14 pages.
"How to ... Amharic Typing with out Power ge'ez," Uploaded to YouTube.com by Birhanu Sendek, Sep. 3, 2017, retrieved from https://www.youtube.com/watch?v=agrUnsxGhM0, 2 pages.
"how to write amharic on PC 2019 tutorial," Uploaded to YouTube by Mulu Tech, Nov. 14, 2019, 1 page.
"Legends of Ethiopic Computing," The Abyssinia Gateway, archived webpage dated Jan. 15, 2002, retrieved from https://web.archive.org/web/20020115053653/http://abyssiniagateway.net/fidel/legends/, 1 page.
"Making WordPerfect "Perfect": A Conversation with Yitna Firdyiwek," The Abyssinia Gateway, archived webpage dated Apr. 28, 2002, retrieved from https://web.archive.org/web/20020428031339/http://abyssiniagateway.net/fidel/legends/YitnaFird yiwek/, 2 pages.
"Multilingual Keyboard: Amharic," Lexilogos, 2002, retrieved from https://www.lexilogos.com/keyboard/amharic.htm, 2 pages.
"Multilingual Keyboard: Tigrinya," Lexilogos, 2002, retrieved from https://www.lexilogos.com/keyboard/tigrinya.htm, 2 pages.
"Power Ge'ez 2009 User's Manual," Concepts Data Systems Private Limited, 2009, retrieved from https://idoc.pub/queue/power-geez-pon2kjpp1jn0, 26 pages.
"SIL Ethiopic Help," KeymanHelp, publication date unknown, retrieved from https://help.keyman.com/keyboard/sil ethiopic/2.0.3/sil ethiopic, 5 pages.
"SIL Ethiopic Power-G Keyboard Help," publication date unkonnwn, retrieved from https://help.keyman.com/keyboard/sil_ethiopic_power_g/1.2.2/sil ethiopic_power_g, 4 pages.
"Type_Unicode_Ge'ez (Amharic) Online," GF Zemen by Ge'ez Frontier Foundation, retrieved from www.ethiopianreview.com/ethiopia/amharic.html, retrieved on Oct. 1, 2008, 3 pages.
"Virtual Amharic Keyboard," Branahm, archived webpage dated Nov. 23, 2011, retrieved from https://web.archive.org/web/20111123140212/http://www.branah.com:80/amharic, 2 pages.
"WashRa 4.1," Senamirmir Project, 2006, retrieved from https://www.senamirmir.org/projects/typography/washra.html, 4 pages.
Alamnehe, "The Ethiopic Script in ASCII," Ethiopian Science & Technology, vol. 3, No. 1, Feb. 1994, retrieved from https://www.ethiopians.com/abass12.html, 9 pages.
Alamnehe, "Washra 4.0," Senamirmir Project, 2006, pp. 1-12.
Alamnehe, "Washra 4.1," Senamirmir Project, 2008, pp. 1-12.
Devroye, "Plagiarists of Ethiopic," Self-Published, last updated Dec. 9, 2023, retrieved from http://luc.devroye.org/fonts-33347.html, 1 page.
Lehmann, "How Many Letters Needs an Alphabet? The Case of Semitic," in "The Idea of Writing: Writing Across Borders," (ed. De Voogt et al.), Koninklijke Brill NV, Leiden, The Netherlands, 2012, pp. 11-52.
Linda, "Following Orders: A History of Amharic Typing," Book History, vol. 25, No. 2, Fall 2022 pp. 425-442.

(56) References Cited

OTHER PUBLICATIONS

Molla, "Advances Made by Ethiopians in the Computer Technology," Ethiopian Review, Apr. 1991, retrieved from http://ethiopic.com/advances-made-ethiopians-computer-technology/, 4 pages.
Molla, "Engineer Ayana Birru", Ethiopian Computers and Software, 2007, retrieved from http://www.ethipic.com/Ayana_Birru.htm, pp. 1-6.
Molla, "Ethiopic Computerization," Ethiopian Review, Jan. 1991, retrieved from http://www.ethiopic.com/ethiopic_computerization.htm, 2 pages.
Molla, "Ethiopic Numeral Names," ABSHA/ECS, Jan. 9, 2002, retrieved from https://www.scribd.com/doc/7100344/Ethiopian-Nos., 4 pages.
Molla, "The Ethiopic Computer Keyboard," Ethiopian Review, Sep. 1995, retrieved from https://web.archive.org/web/20060503182744/http://www.ethiopic.com/etkeybrd.htm, 4 pages.
Satchell, "Review: MegaWriter," InfoWorld, vol. 5, No. 47, pp. 66-68.
Taylor, "Typesetting African Languages," Self-Published, 2000, retrieved from https://www.academia.edu/37090114/Typesetting_African_languagesAcademia.edu, 55 pages.
Workneh et al., "The "UA" Virtual Ethiopic Keyboard for Smart Phones," Mobile for Development International Conference (M4D 2010), Kampala, Uganda, 2010, retrieved from https://www.academia.edu/4142320/The_%E1%88%80%E1%88%88%E1%88%90_Virtual_Ethio pic_Keyboard_for_Smart Phones?source=swp_share, 9 pages.
Yacob et al., "System for Ethiopic Representation in Ascii (Sera)," Indiana University, retrieved from http://www.ethiopians.com/yitna.html, retrieved on Nov. 4, 2015, 9 pages.
Yacob, "The LiveGe'ez Remote Processing Protocol," Ge'ez Frontiers Foundation, Jan. 1999, retrieved from https://libeth.sourceforge.net/LiveGeez.html, 11 pages.
Notice of Allowance for Ethiopian Patent Application No. EP/P/09/111, dated Nov. 5, 2015, 1 page.
International Search Report and Written Opinion for International (PCT) Patent Application No. PCT/US2023/067258, dated Sep. 26, 2023, 11 pages.
Invitation to Pay Additional Fees for International Patent Application No. PCT/US2023/075548, dated Nov. 7, 2023, 2 pages.
Official Action for U.S. Appl. No. 12/271,650, mailed Mar. 2, 2012, 8 pages.
Official Action for U.S. Appl. No. 12/271,650, mailed Oct. 16, 2012, 8 pages.
Official Action for U.S. Appl. No. 12/271,650, mailed Aug. 14, 2014, 8 pages.
Notice of Allowance for U.S. Appl. No. 12/271,650, mailed Dec. 2, 2014, 7 pages.
Official Action for U.S. Appl. No. 14/679,905, dated May 12, 2016 31 pages.
Official Action for U.S. Appl. No. 14/679,905, dated Nov. 25, 2016 22 pages.
Notice of Allowance for U.S. Appl. No. 14/679,905, dated Mar. 29, 2017 8 pages.
Corrected Notice of Allowance for U.S. Appl. No. 14/679,905, dated Apr. 24, 2017 4 pages.
Official Action for U.S. Appl. No. 15/676,469, dated Dec. 28, 2017 10 pages.
Notice of Allowance for U.S. Appl. No. 15/676,469, dated May 2, 2018, 8 pages.
Official Action for U.S. Appl. No. 15/394,230, dated Jan. 10, 2018, 13 pages.
Notice of Allowance for U.S. Appl. No. 15/394,230, dated May 11, 2018, 13 pages.
International Preliminary Report on Patentability for International (PCT) Patent Application No. PCT/US2023/067258, dated Nov. 28, 2024, 6 pages.

* cited by examiner

| ዓማርኛ ሀለሐመ Amharic Smartphone Heleheme | | | | | | | | | |
|---|---|---|---|---|---|---|---|---|---|
| 1ሀ | 2ሁ | 3ሂ | 4ሃ | 5ሄ | 6ህ | 7ቈ | 8ቋ | 9ቍ | 0ቌ |
| qሀ | wሌ | eሐኀ | rምሚ | tሥሰ | yርሮ | uሽ | iቅ | oብቭ | pት |
| aች | sን | dኝ | fእዕ | gክ | hኽ | jው | kዝዥ | lይ | ;ድ |
| shift | zጅ | xግ | cጥ | vጭ | bጵ | nጽፅ | mፍፎ | ፕ | back |
| tab | ፩፪፫ | globe | - mic | mic/BS | | =ቍ | kb4 | enter | |

FIG. 16

| Ethiopic Computer QWERTY ቅውኤርት | | | | | | | | | | | | | |
|---|---|---|---|---|---|---|---|---|---|---|---|---|---|
| `ትሕ | 1ቕ፩፲፩፡ | 2ቭ፪፳፪፣ | 3ጽ፫፴፫። | 4ኝ፬፵፬$ | 5ስ፭፶፭※ | 6ፅ፮፷፮፤ | 7ዥ፯፸፯፥ | 8ቋ፰፹፰፦ፓ | 9ቈ፱፺፱፧ፙ | 0ቍ፻፼፻፨ | -ቌ | =ቍ | |
| | qቀቐቕ | wው | eኤዔ | rርሮ | tትጥ | yይሕኸኽ | uኡሁ | iኢዒ | oኦፆ | pፐጰ | [ቌ | ]ዥቭ | \ |
| | aኣዓ | sሥሰቶ | dድዶዶ | fፍፎፎ | gግኝኘ | hሀኀ | jጅኸኽ | kክኽኽ | lልዕ | ;ሽሽ | 'ቍ | | |
| | | zዝዥዠዠ | xእዕ | cችቸ | vኣዐ | bብቭቡ | nንኝ | mምሚም | ,ጽፅጸ | .ጭጬጮ | /ኽቍ | | |
| | | | ቌ | | | | | | | ቍ | | | |

FIG. 17

| Amharic Computer Heleheme ሀለሐመ | | | | | | | | | | | | | |
|---|---|---|---|---|---|---|---|---|---|---|---|---|---|
| ` | 1፩፲፩፡ | 2፪፳፪፣ሰ | 3፫፴፫።ቭ | 4፬፵፬$ኅ | 5፭፶፭※ኘ | 6፮፷፮፤ዥ | 7፯፸፯፥ፅ | 8ቋ፰፹፰፦ | 9ቈ፱፺፱፧ | 0ቍ፻፼፻፨ | -ቌ | =ቍ | back |
| | qሀ | wሌ | eሐኀ | rምሚ | tሥሰ | yርሮ | uሽ | iቅ | oብቭ | pት | [ | ] | \ |
| | aች | sን | dኝ | fእዕ | gክ | hኽ | jው | kዝዥ | lይ | ;ድ | ' | | |
| | | zጅ | xግ | cጥ | vጭ | bጵ | nጽፅ | mፍፎ | ,ፕ | . ። | / | | |
| | | | ቌ | | | | | | | ቍ | | | |

FIG. 18

| Amharic Computer QWERTY ቅውኤርት | | | | | | | | | | | | | |
|---|---|---|---|---|---|---|---|---|---|---|---|---|---|
| ` | 1ሕ፩፲፩፡ | 2ቭ፪፳፪፣ | 3ጽ፫፴፫። | 4ኝ፬፵፬$ | 5ስ፭፶፭※ | 6ፅ፮፷፮፤ | 7ዥ፯፸፯፥ | 8ቋ፰፹፰፦ | 9ቈ፱፺፱፧ | 0ቍ፻፼፻፨ | -ቌ | =ቍ | |
| | qቅ | wው | eኤ | rርሮ | tትጥ | yይኅ | uኡ | iኢ | oኦ | pፐጵ | [ጭ | ] | \ |
| | aኣ | sሥስ | dድ | fፍፎ | gግ | hሀሕ | jጅኸ | kክ | lልዕ | ;ሽ | ' | | |
| | | zዝዥ | xእዕ | cች | vኣ | bብቭ | nንኝ | mምሚ | ,ጽፅ | .ጭኽ | /ጵ | | |
| | | | ቌ | | | | | | | ቍ | | | |

FIG. 19

| Ethiopic Smartphone Heleheme ሀለሐመ | | | | | | | | | |
|---|---|---|---|---|---|---|---|---|---|
| 1፩፲፩፡ቕ | 2፪፳፪፣ሰ | 3፫፴፫።ቭ | 4፬፵፬$ኅ | 5፭፶፭※ኘ | 6፮፷፮፤ዥ | 7፯፸፯፥ፅ | 8ቋ፰፹፰፦ፓ | 9ቈ፱፺፱፧ፙ | 0ቍ፻፼፻፨ድ |
| qሀ | wሌ | eሐኀ | rምሚ | tሥሰ | yርሮ | uሽቭ | iቅቕቐ | oብቭቡ | pት |
| aች | sን | dኝ | fእዕ | gክኽ | hኽኸ | jው | kዝዥዠዥ | lይ | ;ዶዶዶ |
| | zጅ | xግጝጎ | cጥ | vጭጬጮ | bጵ | nጽፅጸ | mፍፎፍ | ፕፑ | |
| | | | -ቌ | / | | =ቍ | | | |

FIG. 20

| Ethiopic Smartphone QWERTY ቅውኤርት | | | | | | | | | |
|---|---|---|---|---|---|---|---|---|---|
| 1ቕ፩፲፩፡ | 2ቭ፪፳፪፣ | 3ጽ፫፴፫። | 4ኽ፬፵፬$ | 5ስ፭፶፭※ | 6ፅ፮፷፮፤ | 7ኾ፯፸፯፦ | 8ቋ፰፹፰:-ኻ | 9ቈ፱፺፱፤ጯ | 0ቍ፼፻፼፨ |
| qቀቕቅ | wውጮ | eኤዔ | rርሯጯጮጯ | tትጥ | yይሕኽኽ | uኡዑ | iኢዒ | oኦዖ | pፐጽፑ |
| aኣዓ | sሥስቆ | dድዽዽ | fፍፎፏ | gግጝኈጝ | hሀኅ | jጅኽኸ | kክኸኽኸ | lልዕ | ;ሽሸ |
| | zዝዥዠዥ | xእዕ | cችቸ | vአዐ | bብቭቦ | nንኝ | mምሚሞ | ,ጽፅጿ | |
| | | | -ቓ | | ጮጯጮ | =ቍ | | | |

FIG. 21

| Ethiopic Computer Heleheme ሀለሐመ | | | | | | | | | | | | | |
|---|---|---|---|---|---|---|---|---|---|---|---|---|---|
| ` | 1፩፲፩፡ቕ | 2፪፳፪፣ስ | 3፫፴፫።ቭ | 4፬4፬፵፬$ኻ | 5፭፶፭※ኽ | 6፮፷፮፤ኾ | 7፯፸፯፦ፅ | 8፰ቋ፹፰:- | 9፱ቈ፺፱፤ | 0፼፼፻፼፨ | -ቓ | =ቍ | back |
| | qሀ | wለ | eሐኀ | rምሚ | tሥስ | yርሯ | uሽሸ | iቅቕቅ | oብቭቦ | pት | [ | ] | \ |
| | aች | sን | dኝ | fእዕ | gክኸ | hኽ | jው | kዝዥዠዥ | lይ | ;ድዽድ | ‘ | | |
| | | zጅ | xግጝጓ | cጥ | vጮጯጮ | bጽ | nጽፅጿ | mፍፎፏ | ,ፐፑ | . ። | / | | |
| | | | | | | | | | | | | | |

FIG. 22

| Ethiopic Computer QWERTY ቅውኤርት | | | | | | | | | | | | | |
|---|---|---|---|---|---|---|---|---|---|---|---|---|---|
| `ሖሕ | 1ቕ፩፲፩፡ | 2ቭ፪፳፪፣ | 3ጽ፫፴፫። | 4ኽ፬፵፬$ | 5ስ፭፶፭※ | 6ፅ፮፷፮፤ | 7ኾ፯፸፯፦ | 8ቋ፰፹፰:-ኻ | 9ቈ፱፺፱፤ጯ | 0ቍ፼፻፼፨ | -ቓ | =ቍ | |
| | qቀቕቅ | wው | eኤዔ | rርሯ | tትጥ | yይሕኽኽ | uኡዑ | iኢዒ | oኦዖ | pፐጽ | [ቓ | ]ዡዧ | \ |
| | aኣዓ | sሥስቆ | dድዽድ | fፍፎፏ | gግጝጓ | hሀኅ | jጅኽኸ | kክኸኸ | lልዕ | ;ሽሸ | ‘ቍ | | |
| | | zዝዥዠዥ | xእዕ | cችቸ | vአዐ | bብቭቡ | nንኝ | mምሚሞ | ,ጽፅጿ | .ጮጯጮ | /ኸቍ | | |
| | | | ቓ | | | | | | | ቍ | | | |

FIG. 23

| Amharic Computer QWERTY ቅውኤርት | | | | | | | | | | | | | |
|---|---|---|---|---|---|---|---|---|---|---|---|---|---|
| `ኊ | 1ሐ፩፲ ፡ | 2ቭ፪፳ ፣ | 3ጽ፫፴ ። | 4ኽ፬፵ $ | 5ስ፭፶ ※ | 6ፅ፮፷ ፤ | 7ኾ፯፸ ፦ | 8ቋ፰፹ :- | 9ቈ፱፺ ፤ | 0ቍ፼፻፼ ፨ | -ቓ | =ቍ | |
| | qቅ | wው | eኤ | rርሯ | tት | yይኘ | uኡ | iኢ | oኦ | pፐጽ | [ጮ | ] | \ |
| | aኣ | sሥስ | dድ | fፍፎ | gግ | hሀሐ | jጅኽ | kክ | lልዕ | ;ሽ | ‘ | | |
| | | zዝዥ | xእዕ | cች | vአ | bብቭ | nንኝ | mምሚ | ,ጽፅ | .ጮኸ | /ጵ | | |
| | | | ቓ | | | | | | | ቍ | | | |

FIG. 24

| Ethiopic Smartphone Heleheme ሀለሐመ | | | | | | | | | |
|---|---|---|---|---|---|---|---|---|---|
| 1፩ | 2፪ | 3፫ | 4፬ | 5፭ | 6፮ | 7፯ | 8፰ | 9፱ | 0፼ |
| qሀ | wለ | eሐኀ | rመ | tሠሰ | yረ | uሸሻ | iቀቐ | oበ | pተ |
| aቸ | sነ | dኘ | fአዐ | gከኸ | hኸ | jወ | kዘዠ | lየ | ;ደ |
| | zጀ | xገኘ ጝ | cጠ | vጨ | bጸ | nጸፀ | mፈ | ፐ | |
| | | | -ቓ | / | | =ቍ | | | |

FIG. 25

| Amharic Computer QWERTY ቅውኤርት | | | | | | | | | | | | | |
|---|---|---|---|---|---|---|---|---|---|---|---|---|---|
| `ኍ | 1ሕ፩!፩፡ | 2ሽ፪@፪፣ | 3ጽ፫#፫፤ | 4ኝ፬$፬ቩ | 5ሰ፭%፭※ | 6ፅ፮^፮፤ | 7ዅ፯&፯፥ | 8ቋ፰*፰፦ | 9ቈ፱(፱፧ | 0ኰ፲)፲፨ | -ቌ | =ኵ | |
| | qቅ` | wው~ | eኤ- | rርፘ_ | tት= | yይኀ+ | uኡ[ | iኢ{ | oኦ] | pፕጵ} | [ጭ | ] | \ |
| | aኣ\ | sሥስ\| | dድ; | fፍፚ" | gግ' | hህሕ" | jጅኽ, | kክ< | lልፅ. | ;ኸ> | ' | | |
| | | zዝዥ/ | xእፅ? | cች© | vአ® | bብቭTM | nንኝ¢ | mምሟ€ | ,ጽፀ£ | .ጭኽ | /ጵ | | |
| | | | ቌ: | | | | | | | ኵ፡ | | | |

FIG. 26

| Ethiopic Smartphone Heleheme ሀለሐመ kb4 | | | | | | | | | |
|---|---|---|---|---|---|---|---|---|---|
| 1፩፩! | 2፪፪@ | 3፫፫# | 4፬፬$ | 5፭፭% | 6፮፮^ | 7፯& | 8፰፰* | 9፱፱( | 0፲) |
| qሀ` | wለ~ | eሐኀ- | rመ_ | tሠሰ= | yረ– | uሸ[ | iቀ{ | oበ] | pተ} |
| aቸ\ | sኘ\| | dኘ; | fአ" | gከ' | hኸ" | jወ, | kዘዠዡዢ< | lየ. | ;ደ> |
| | zጀ/ | xገ ? | cጠ© | vጨ® | bጰTM | nጸፀc | mፈ… | ፐ£ | |
| | | | -ቌ: | / | | =ኵ፡ | | | |

FIG. 27

| Amharic Smartphone Heleheme 11 Keys | | | | | | | | | | |
|---|---|---|---|---|---|---|---|---|---|---|
| 1 | 2 | 3 | 4 | 5 | 6 | 7 | 8 | 9 | 0 | |
| | qሀ | wሌ | eሕ | rም | tሥ | yር | uስ | iሽ | oቅ | pቡ |
| | aቭ | sት | dች | fኅ | gን | hኝ | jእ | kዕ | lክ | ;ኽ |
| | zው | xዝ | cዥ | vይ | bድ | nጅ | mግ | ,ጥ | .ጭ | |
| | | ጵ | ጽ | -ቌ | | =ኵ | ፅ | ፍ | ፕ | |

FIG. 28

| Amharic Smartphone Heleheme 11 Keys with Ethiopic | | | | | | | | | | |
|---|---|---|---|---|---|---|---|---|---|---|
| 1ፙ | 2ሰ | 3ቭ | 4ቶ | 5ቡ | 6ቾ | 7ኽ | 8ኾ | 9ዥ | 0ዧ | |
| | qሀ | wሌ | eሕ | rም | tሥ | yር | uስ | iሽ | oቅ | pቡ |
| | aቭ | sት | dች | fኅ | gን | hኝ | jእ | kዕ | lክ | ;ኽ |
| | zው | xዝ | cዥ | vይ | bድ | nጅ | mግ | ,ጥ | .ጭ | |
| | | ጵ | ጽጿ | -ቌጟ | | =ኵጯ | ፅ | ፍ | ፕ | |

FIG. 29

| | Ethiopic Smartphone QWERTY 11 Keys | | | | | | | | | |
|---|---|---|---|---|---|---|---|---|---|---|
| 1ቕ | 2ሰ | 3ጽ | 4እ | 5ኽ | 6ዕ | 7ሕ | 8ቋ | 9ቈ | 0ኰ | back |
| qቅቕቖ | wው | eኤዔ | rር | tትጥ | yይሕ | uኡዑ | iኢዒ | oኦዖ | pፕጵ | [ጭጮጯ |
| aኣዓ | sሥሰሶ | dድዶዷ | fፍፎ | gግጓ | hህኅ | jጅኽኾ | kክኸ | lልፅ | ;ኸሸ | 'ኟኙ |
| tab | zዝዥዦዧ | xእፅ | cችቿ | vኧዐ | bብቭ | nንኝ | mም | ,ጽፀጿ | .ኽኾ | enter |
| shift | ፩፪፫ | globe | kb4 | -ቌ | space | ኟኙ | =ኵ | mic | ኍ | |

FIG. 30

| | | | | | | | | | | |
|---|---|---|---|---|---|---|---|---|---|---|
| ፩ | ፪ | ፫ | ፬ | ፭ | ፮ | ፯ | ፰ | ፱ | ፲ | |
| | ፳ | ፴ | ፵ | ፶ | ፷ | ፸ | ፹ | ፺ | ፻ | ፼ |
| ˘ | ⊔ | ⁝ | ፡ | ⊓ | ر | ، | — | ␣ | ኑ | |
| ¡ | ፠ | ፇ | ፈ | ፇ | ⊕ | ' | « | » | | |
| | [ | | “ | ‘ | | | ’ | ” | ‘ | |

FIG. 31

| | | | | | | | | | | |
|---|---|---|---|---|---|---|---|---|---|---|
| ! | @ | # | $ | % | ^ | & | * | ( | ) | |
| | ` | ~ | - | _ | = | + | [ | { | ] | } |
| | \ | \| | ; | “ | ‘ | “ | , | < | . | > |
| | / | ? | © | ® | ™ | ¢ | € | £ | | |
| | | | ¥ | ‥ | | | … | [illegible] | | |

FIG. 32

| | | | | | | | | | | |
|---|---|---|---|---|---|---|---|---|---|---|
| ፡፩ | ፣፪ | ፣፫ | $፬ | ※፭ | ፤፮ | ÷፯ 7 | :-፰ | ¦ ፱ | ፨፲ | |
| | Q ቀ | Wወ | Eኽ | R ሬ | T ተ | Y የ | Uሡ | Iጰ | Oዐ | P ፐ |
| | Aአ | S ሰ | Dደ | F ፈ | Gገ | Hሀ | Jጀ | Kከ | Lለ | : ጠ |
| | Zዘ | Xጨ | Cቸ | Vሽ | Bበ | Nነ | Mመ | <ፀ | | |
| | {ጘ | ? ጸ | ~ ሽ | | | | ] ኀ | >ፕ | “ሐ | |

FIG. 33

| Ethiopic Smartphone Hele or Qwerty, etc. | | | | | | | | | |
|---|---|---|---|---|---|---|---|---|---|
| 1! | 2@ | 3# | 4$ | 5% | 6^ | 7& | 8* | 9( | 0) |
| ሀቅ` | ~ | - | _ | = | + | [ | { | ] | } |
| \ | \| | ; | “ | ‘ | ” | , | < | . | > |
| | / | ? | ፠ | ⊕ | ፇ | ፇ | ¢ | £ | |
| | | | | : | | | ፡ | | |

FIG. 34

| | | | | | | | | |
|---|---|---|---|---|---|---|---|---|
| Sh | ሸ | ሹ | ሺ | ሻ | ሼ | ሽ | ሾ | [illegible] |
| B | በ | ቡ | ቢ | ባ | ቤ | ብ | ቦ | - |
| T | ተ | ቱ | ቲ | ታ | ቴ | ት | ቶ | - |
| C | ቸ | ቹ | ቺ | ቻ | ቼ | ች | ቾ | [illegible] |
| N | ነ | ኑ | ኒ | ና | ኔ | ን | ኖ | - |
| Ñ | ኘ | ኙ | ኚ | ኛ | ኜ | ኝ | ኞ | [illegible] |
| Vowels | አ | ኡ (alt.) | ኢ | ኣ | ኤ | እ | ኦ (ö) | - |
| K | ከ | ኩ | ኪ | ካ | ኬ | ክ | ኮ | - |
| W | ወ | ዉ | ዊ | ዋ | ዌ | ው | ዎ | [illegible] (ww) |
| Vowels | ዐ (alt.) | ዑ | ዒ (I) | ዓ (a) | ዔ (alt.) | ዕ (o\|ä\|) | ዖ | - |
| Y | የ | ዩ | ዪ | ያ | ዬ | ይ | ዮ | - |
| D | ደ | ዱ | ዲ | ዳ | ዴ | ድ | ዶ | [illegible] |
| J | ጀ | ጁ | ጂ | ጃ | ጄ | ጅ | ጆ | [illegible] |
FIG. 70
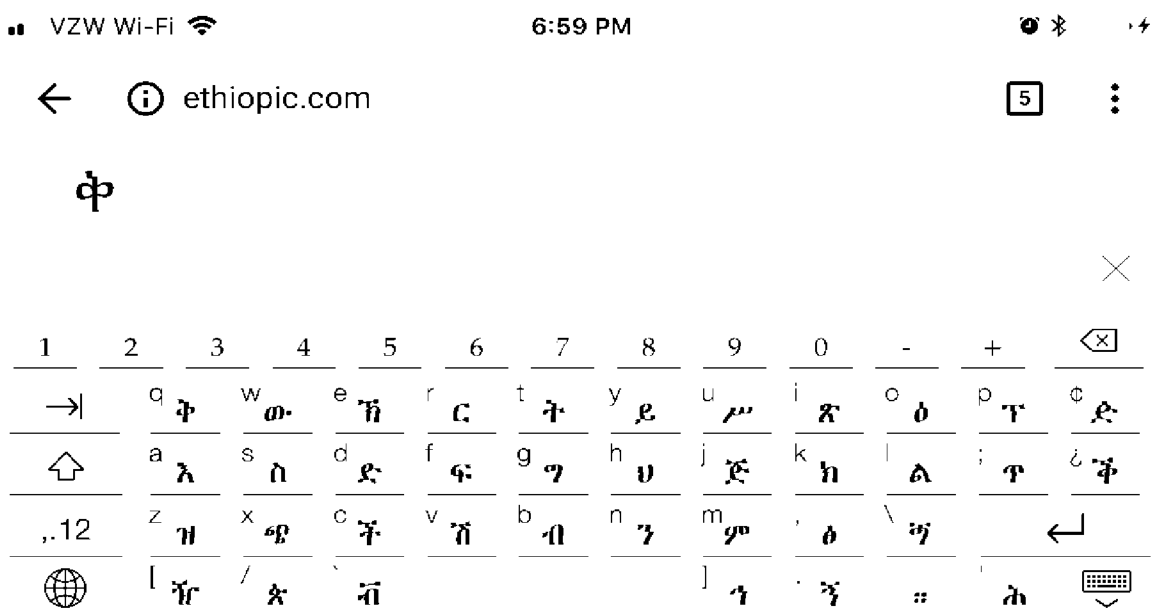
FIG. 71
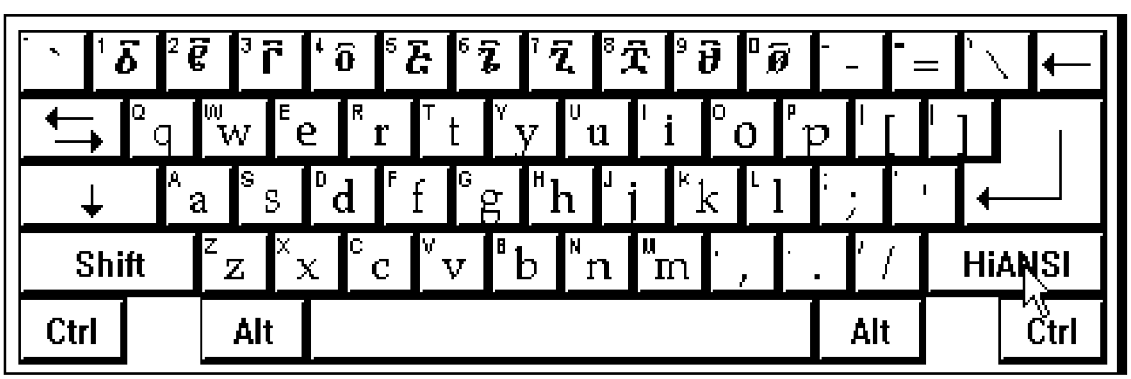
FIG. 72

| Varieties | 1 | 2 | 3 | 4 | 5 | 6 | 7 | 8 | 9 |
|---|---|---|---|---|---|---|---|---|---|
| hv | hv<br>ሀ | hu<br>ሁ | hi<br>ሂ | ha<br>ሃ | he<br>ሄ | h<br>ህ | ho<br>ሆ | h`<br>ú | |
| vh | vh<br>ሐ | uh<br>ሑ | ih<br>ሒ | ah<br>ሓ | eh<br>ሔ | ʽh<br>ሕ | oh<br>ሖ | `h<br>ሗ | |
| | | | | | | | | | |
| vy | vy<br>ጐ | uy<br>ጐ | iy<br>ጒ | ay<br>ጓ | ey<br>ጔ | ʽy<br>ጕ | oy<br>ጎ | | |
| | | | | | | | | | |
| | | | | | | | | | |
| | | | | | | | | | |
| | | | | | | | | | |
| mv | mv<br>መ | mu<br>ሙ | mi<br>ሚ | ma<br>ማ | me<br>ሜ | m<br>ም | mo<br>ሞ | m8<br>ሟ | m`<br>ፙ |
| | | | 0m<br>ᎁ | | | | | | |
| m9 | m9<br>ᎀ | m =<br>ᎃ | m-<br>ᎂ | | m0<br>ሟ | | | | |
| | | | | | | | | | |
| | ቕ | ሥ | ጽ | እ | ኹ | ዕ | ሕ | ኧ | ቈ |
| | | | | | | | | | |
| | | | | | | | | | |

FIG. 80

| Default | 1<br>Nothing | 2<br>Nothing | 3<br>Nothing | 4<br>Nothing | 5<br>Nothing | 6<br>Nothing | 7<br>Nothing | 8<br>Nothing | 9<br>Nothing | 0<br>Nothing | | | | |
|---|---|---|---|---|---|---|---|---|---|---|---|---|---|---|
| tab<br>shift<br>w<br>r<br>t<br>pad<br>y<br>o<br>`<br>l<br>q<br>a | 1<br>፡<br>፩<br>፲<br>‿<br>፩<br>፼<br>¡<br>!<br>/<br>ቀ<br>አ | 2<br>፣<br>፪<br>፳<br>⊔<br>፪<br>‘<br>ⓜ<br>@<br>;<br>ቁ<br>ኡ | 3<br>።<br>፫<br>፴<br>⁝<br>፫<br>’<br>ᵛᵒ<br>#<br>[<br>ቂ<br>ኢ | 4<br>S<br>፬<br>፵<br>:<br>፬<br>“<br>ብር<br>S<br>]<br>ቃ<br>ኣ | 5<br>※<br>፭<br>፶<br>⊓<br>፭<br>”<br>Ì<br>%<br>-<br>ቄ<br>ኤ | 6<br>፤<br>፮<br>፷<br>ノ<br>፮<br>‹<br>⊕<br>^<br>=<br>ቅ<br>እ | 7<br>፥<br>፯<br>፸<br>ን<br>፯<br>›<br>&<br>‘<br>ቆ<br>ኦ | 8<br>፦<br>፰<br>፹<br>—<br>፰<br>«<br>*<br>’<br>ቋ<br>ኧ | 9<br>፧<br>፱<br>፺<br>⌴<br>፱<br>»<br>(<br>\<br>ቌ | 0<br>፨<br>፲<br>፻<br>⊦<br>፲<br>`<br>~<br>)<br>ቍ | -<br>ቊ | =<br>ቍ | `<br>ቈ | BS |
| tab | Q<br>ቅ<br>ቍ<br>ቕ | W<br>ው | E<br>ኤ<br>ዔ | R<br>ር<br>ዥ | T<br>ት<br>ጥ | Y<br>ይ<br>ኅ | U<br>ኡ<br>ዑ | I<br>ኢ<br>ዒ | O<br>ኦ<br>ዖ | P<br>ፐ<br>ጵ<br>ፑ | {<br>ጭ<br>ጯ<br>ጮ | }<br>ኸ<br>ኹ<br>ኽ | \|<br>ዕ | |
| (caps lock) | A<br>ኣ<br>ዓ | S<br>ሥ<br>ስ<br>ሰ | D<br>ድ<br>ዺ<br>ዸ | F<br>ፍ<br>ፎ | G<br>ግ<br>ጉ<br>ጝ | H<br>ህ<br>ሕ | J<br>ጅ | K<br>ክ<br>ኩ<br>ኽ | L<br>ል<br>ዕ | :<br>ሽ<br>ሻ | “<br>ኛ<br>ኙ | | Enter | |
| shift | Z<br>ዝ<br>ዡ<br>ዧ<br>ዥ | X<br>እ<br>ዕ | C<br>ች<br>ቻ | V<br>ኣ<br>ዐ | B<br>ብ<br>ቭ<br>ቦ | N<br>ን<br>ኝ | M<br>ም<br>ᎃ | <<br>ጽ<br>ፅ<br>ጿ | ><br>ኝ<br>ኧ | ?<br>ቕ<br>ቍ | | shift | | |
| ctrl<br>ኸ | fn | start | alt | Space Bar | | | | | | alt | | fn | | ctrl |

FIG. 81

| `ዕ | 1አ | 2ኡ | 3ኢ | 4ኣ | 5ኤ | 6እ | 7ኦ | 8ኧ | 9ቈ | 0ቊ | -ቌ | =ቍ | BS |
|---|---|---|---|---|---|---|---|---|---|---|---|---|---|
| tab | Q<br>ቅ<br>ቍ<br>ቕ | W<br>ው | E<br>ኤ<br>ዔ | R<br>ር<br>ዥ | T<br>ት<br>ጥ | Y<br>ይ<br>ኅ<br>ኍ | U<br>ኡ<br>ዑ | I<br>ኢ<br>ዒ | O<br>ኦ<br>ዖ | P<br>ፕ<br>ጵ<br>ፑ | {<br>ጭ<br>ጮ<br>ጬ | }<br>ኧ<br>ዡ<br>ዥ | \|<br>ኻ<br>ኽ |
| (caps lock) | A<br>ኣ<br>ዓ | S<br>ሥ<br>ስ<br>ሱ | D<br>ድ<br>ዷ<br>ዸ | F<br>ፍ<br>ፏ | G<br>ግ<br>ጕ<br>ጓ | H<br>ሀ<br>ሕ | J<br>ጅ<br>ጃ<br>ጆ | K<br>ክ<br>ኲ<br>ኸ | L<br>ል<br>ዡ | :<br>ሽ<br>ሿ | ‘<br>ዕ | Enter | |
| shift | Z<br>ዝ<br>ዡ<br>ዧ | X<br>እ<br>ዕ | C<br>ች<br>ቿ | V<br>አ<br>ዐ | B<br>ብ<br>ቧ<br>ቦ | N<br>ን<br>ኝ | M<br>ም<br>ᎃ | <<br>ጽ<br>ፅ<br>ጿ | ><br>ኽ<br>ዂ<br>ዅ | ?<br>ቕ<br>ቝ | shift | | |

FIG. 82

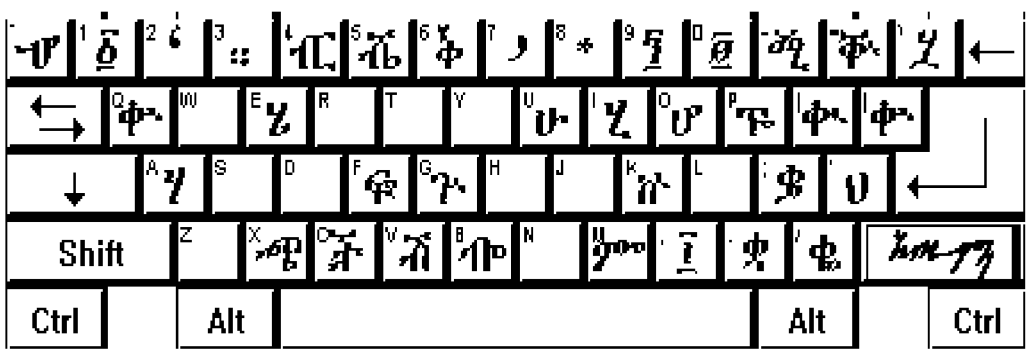

FIG. 83

| | | | | | | | | | | | | | |
|---|---|---|---|---|---|---|---|---|---|---|---|---|---|
| h<br>HEX | ሀ<br>4608 | ሁ<br>4609 | ሂ<br>4610 | ሃ<br>4611 | ሄ<br>4612 | ህ<br>4613 | ሆ<br>4614 | ሇ | | | | | ሗ<br>4615 |
| l | ለ | ሉ | ሊ | ላ | ሌ | ል | ሎ | ሏ | | | | | ሏ |
| m | መ | ሙ | ሚ | ማ | ሜ | ም | ሞ | ሟ | ᎀ | ᎁ | ᎂ | ᎃ | ሟ |
| | ፀ | ፁ | ፂ | ፃ | ፄ | ፅ | ፆ | ፇ | | | | | ፇ |

FIG. 84

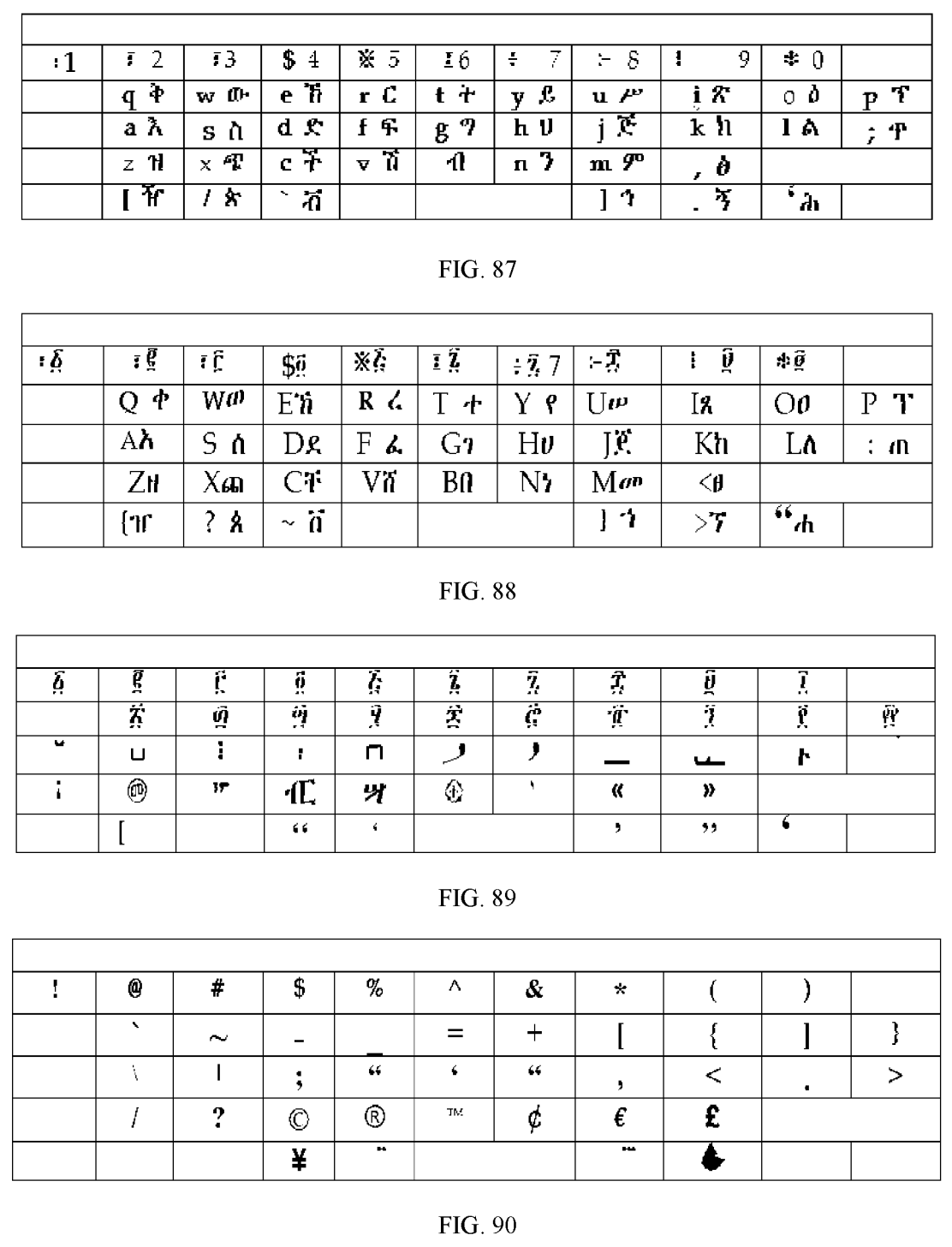

| | | | | | | | | | | |
|---|---|---|---|---|---|---|---|---|---|---|
| ፡1 | ። 2 | ፣3 | $ 4 | ※ 5 | ፤6 | ÷ 7 | ፦ 8 | ! 9 | ፨ 0 | |
| | q ቅ | w ው | e ኽ | r ር | t ት | y ይ | u ሥ | i ጽ | o ዕ | p ፕ |
| | a እ | s ስ | d ድ | f ፍ | g ግ | h ህ | j ጅ | k ክ | l ል | ; ፑ |
| | z ዝ | x ጭ | c ች | v ቭ | ብ | n ን | m ም | , ፅ | | |
| | [ ዥ | / ጵ | ` ሽ | | | | ] ኅ | . ኝ | ' ሕ | |

FIG. 87

| | | | | | | | | | | |
|---|---|---|---|---|---|---|---|---|---|---|
| ፡፩ | ።፪ | ፣፫ | $፬ | ※፭ | ፤፮ | ÷፯ 7 | ፦፰ | ! ፱ | ፨፲ | |
| | Q ቀ | Wወ | Eኸ | R ረ | T ተ | Y የ | Uሠ | Iጸ | Oዐ | P ፐ |
| | Aአ | S ሰ | Dደ | F ፈ | Gገ | Hሀ | Jጀ | Kከ | Lለ | : ጠ |
| | Zዘ | Xጨ | Cቸ | Vቨ | Bበ | Nነ | Mመ | <ፀ | | |
| | {ዠ | ? ጰ | ~ ሸ | | | | } ኀ | >ኘ | "ሐ | |

FIG. 88

| | | | | | | | | | | |
|---|---|---|---|---|---|---|---|---|---|---|
| ፩ | ፪ | ፫ | ፬ | ፭ | ፮ | ፯ | ፰ | ፱ | ፲ | |
| | ፳ | ፴ | ፵ | ፶ | ፷ | ፸ | ፹ | ፺ | ፻ | ፼ |
| ˘ | ⊔ | ⁝ | ፡ | ⊓ | [illegible] | [illegible] | — | [illegible] | [illegible] | |
| ¡ | [illegible] | [illegible] | [illegible] | [illegible] | [illegible] | ' | « | » | | |
| | [ | | “ | ‘ | | | ’ | ” | ‘ | |

FIG. 89

| | | | | | | | | | | |
|---|---|---|---|---|---|---|---|---|---|---|
| ! | @ | # | $ | % | ^ | & | * | ( | ) | |
| | ` | ~ | - | _ | = | + | [ | { | ] | } |
| | \ | \| | ; | “ | ‘ | “ | , | < | . | > |
| | / | ? | © | ® | ™ | ¢ | € | £ | | |
| | | | ¥ | ‥ | | | … | [illegible] | | |

FIG. 90

| Hele Ethiopic | | | | | | | | | | | | | |
|---|---|---|---|---|---|---|---|---|---|---|---|---|---|
| ቕ | 1<br>ሀ | 2<br>ሁ | 3<br>ሂ | 4<br>ሃ | 5<br>ሄ | 6<br>ህ | 7<br>ሆ | 8<br>ቋ | 9<br>ቌ | 0<br>ቍ | -<br>ቊ | =<br>ቍ | BS |
| tab | Q<br>ህ | W<br>ል | E<br>ሕ | R<br>ም | T<br>ሥ | Y<br>ር | U<br>ስ | I<br>ሽ | O<br>ቅ | P<br>ብ | [<br>ቭ | ]<br>ት | \<br>ች |
| caps | A<br>ኅ | S<br>ን | D<br>ኝ | F<br>እ | G<br>ክ | H<br>ኽ | J<br>ው | K<br>ዕ | L<br>ዝ | ;<br>ዥ | '<br>ይ | ENTER | |
| shift | | ድ | ጅ | ግ | ጥ | ጭ | ጵ | ጽ | ፅ | ፍ | ፕ | shift | |
| ctrl ዽ | fn | start | alt | SB | | | | | alt | fn | | Ctrl ኻ | |

FIG. 94

| | | | | | | | | | | | | | |
|---|---|---|---|---|---|---|---|---|---|---|---|---|---|
| ቕ | 1<br>ሀ | 2<br>ሁ | 3<br>ሂ | 4<br>ሃ | 5<br>ሄ | 6<br>ህ | 7<br>ሆ | 8<br>ቋ | 9<br>ቌ | 0<br>ቍ | -<br>ቊ | =<br>ቍ | BS |
| tab | Q<br>ህሕ | W<br>ል | E<br>ሕ | R<br>ም | T<br>ሥስ | Y<br>ር | U<br>ስ | I<br>ሽ | O<br>ቅ | P<br>ርብ | [<br>ቭ | ]<br>ት | \<br>ች |
| caps | A<br>ኅ | S<br>ሽን | D<br>ቅኝ | F<br>ቕእ | G<br>ብክ | H<br>ቭኽ | J<br>ትው | K<br>ችዕ | L<br>ኅዝ | ;<br>ንዥ | '<br>ኝይ | ENTER | |
| shift | | ድዽ | ጅ | ግኻ | ጥ | ጭ | ጵ | ጽ | ፅ | ፍ | ፕ | shift | |
| ctrl ዽ | fn | start | alt | SB | | | | | alt | fn | | Ctrl ኻ | |

FIG. 95

| | | | | | | | | | | | | | |
|---|---|---|---|---|---|---|---|---|---|---|---|---|---|
| ESC | | F1ሀ | F2ሁ | F3ሂ | F4ሃ | F5ሄ | F6ህ | F7ሆ | F8ቌ | F9ቍ | F10ቋ | F11ቊ | F12ቍ |
| ቕ | 1<br>ሀሀ | 2<br>ሁል | 3<br>ሂሕ | 4<br>ሃም | 5<br>ሄሥ | 6<br>ህር | 7<br>ሆስ | 8<br>ቋሽ | 9<br>ቌቅ | 0<br>ቍብ | -<br>ቊቭ | =<br>ቍት | BS |
| tab | Q<br>ህች | W<br>ልኅ | E<br>ሕን | R<br>ምኝ | T<br>ሥእ | Y<br>ርክ | U<br>ስኽ | I<br>ሽው | O<br>ቅዕ | P<br>ብዝ | [<br>ቭዥ | ]<br>ትይ | \<br>ችድ |
| caps | A<br>ኅጅ | S<br>ንግ | D<br>ኝጥ | F<br>እጭ | G<br>ክጵ | H<br>ኽጽ | J<br>ውፅ | K<br>ዕፍ | L<br>ዝፕ | ;<br>ዥቊ | '<br>ይቍ | ENTER | |
| shift | | ድሀ | ጅሁ | ግሂ | ጥሃ | ጭሄ | ጵህ | ጽሆ | ፅቌ | ፍቍ | ፕቋ | shift | |
| ctrl<br>ዽ | fn | start | alt | SB | | | | | alt | fn | | Ctrl ኻ | |

FIG. 96

FIG. 105

| ቃል/ቃላት | በላቲን ፊደላት አቀማመጥ ሲፃፍ | | |
|---|---|---|---|
| | ማይክሮሶፍት | ፓወር ግዕዝ | ኪይማን |
| ሐመር | h.emer | Shift+hmre | (Shif/or Capst+h)emer |
| ኋይት ሃውስ | hWy't' haw's' | h+(Caps+WA) + (Shift+y)ete hawese | h(Shift/or Caps+W)yt haws |
| ሦስት | ssos't' | (Shift+s)osete | ssost |
| ቋንቋ | quanqua | q(Caps+WA)neq(Caps+WA) | q(Caps+W)n q(Shift/or Caps+W) |
| ትዕግሥት | t'eeg'ss't' | Te(Shift+x)e(Shift+s)ete | በመደበኛው አካሄድ መጻፍ አይቻልም |
| ጨካኝ | c'kany' | (Shift+c)ka(Shift+n)e | (Caps/ or Shift + C)ka(Shift/ or Caps + n) |
| በድምሩ (24ፊደላት) | 51 ቁልፎች | 55 ቁልፎች | - |

FIG. 106

| | | | | | | | | | | | | |
|---|---|---|---|---|---|---|---|---|---|---|---|---|
| | | | | | | | | | | | | |
| h | ሀ | ሁ | ሂ | ሃ | ሄ | ህ | ሆ | ô | ሇ | | | |
| | ኸ | ኹ | ኺ | ኻ | ኼ | ኽ | ኾ | | ዀ | | | |
| | ፀ | ፁ | ፂ | ፃ | ፄ | ፅ | ፆ | Ô | | | | |
| | | | | | | | | | | | | |
| | 1 | 2 | 3 | 4 | 5 | 6 | 7 | 8 | 9 | 0 | - | = |
| | ቕኽ | ሥ | ጽ | እ | ኽ | ሕ | ዕ | ኧ | ኝ | ጵ | ኅ | ኽዴ |
| | | | | | | | | | | | | |
| | v | u | | | | | | | | | | |
| | ሠ | ሡ | | | | | | | | | | |
| | | | | | | | | | | | | |
| | | | | | | | | 8 | 9 | 0 | | |
| | ዀ | ዂ | ዃ | ዄ | ዅ | ኽ | ኾ | | | | | |
| | ፡ | ፤ | ። | . | ※ | ፤ | ÷ | :- | ፥ | ፨ | | |
| | ሠ | ሡ | ሢ | ሣ | ሤ | ሥ | ሦ | | | | | |
| | | | | | | | | | | | | |
| | 1 | 2 | 3 | 4 | 5 | 6 | 7 | 8 | 9 | 0 | | |
| | ሠ | ሡ | ሢ | ሣ | ሤ | ሥ | ሦ | | | | | |
| q | | | | | | | | | | | | |
| | ቐ | ቑ | ቒ | ቓ | ቔ | | | | | | | |
| | ቘ | ቚ | ቛ | ቜ | ቝ | | | | | | | |
| | | | | | | | | | | | | |
| | ቘ | | | | | | | | | | | |
| | | | | | | | | | | | | |
| | | | | | | | | | | | | |
| | ሀ | ሁ | ሂ | ሃ | ሄ | ህ | ሆ | | | | | |
| | ፘ | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

| | | | | | | | | | | | | |
|---|---|---|---|---|---|---|---|---|---|---|---|---|
| | ቀ | ቁ | ቂ | ቃ | ቄ | ቅ | ቆ | | | | | |
| | | | | | | | | | | | | |
| | v | | | | | | | | | | | |
| | ፙ | | | | | | | | | | | |
| | | | | | | | | | | | | |
| | ctrl | | | | | | | | | | | |
| | ፙ | | | | | | | | | | | |
| | | | | | | | | | | | | |
| | | | | | | | | | | | | |
| | ሟ | ሙ | | ሚ | ም | | | | | | | |
| | | | | | | | | | | | | |
| | | | | | | | | | | | | |
| | እ | | | | | | | | | | | |
| | ኢ | | | | | | | | | | | |
| | እእ | | | | | | | | | | | |
| | ኧ | | | | | | | | | | | |
| | | | | | | | | | | | | |
| | እ | | | | | | | | | | | |
| | | | | | | | | | | | | |
| | | ~ | | | | ~ | | | | | | |
| | | | ዚ | ዛ | ዜ | ዝ | ዘ | | | | | |
| | | | | | | | | | | | | |
| | | | . | | | | | | | | | |
| | | | ዚ | ዛ | ዜ | ዝ | ዘ | | | | | |
| | | | | | | | | | | | | |

FIG. 113

ETHIOPIC SINGLE TO THREE KEYSTROKES TYPING

CROSS REFERENCE TO RELATED APPLICATIONS

This U.S. Non-Provisional Patent application claims the benefit of priority from U.S. Provisional Patent Application 63/294,691, filed on Dec. 29, 2021, the entire disclosure of which is hereby incorporated by reference.

The present application is also related to U.S. Patent Application Nos. 62/212,17, 62/921,217, Ser. Nos. 16/891,303 and 15/394,230, and U.S. Pat. No. 10,133,362, and International Application PCT/US20/36011, the entire disclosures of which are hereby incorporated by reference.

FIELD OF THE INVENTION

Embodiments of the present disclosure relate to methods to type phonetic alphabets without the need for a timer and disable key because of the availability of more keys due to the novel programming methods disclosed herein. The number of keys available for typing has been increased more than those described in previous patents. The typist can now also use more than one typing method at the same time. The methods disclosed herein drastically increase the power to type Ethiopic with one and two keystrokes each from Ethiopic layout distributed on the default, shifted and command keys and the numeric pad. The present disclosure allows for varieties of keyboard layouts and novel modifications of these methods including the reverse. Numerous novel methods of Ethiopic documentations applicable to Unicode language glyphs also are described. Different layouts can also be presented separately or together. The major novelty is the display and settlement of a default glyph with a keystroke or two each and its subsequent modification with vowels without affecting the default settlement. A glyph typed with two or more keystrokes can revert to the defaults by striking the vowel.

BACKGROUND

Ethiopic is one of the oldest alphabets in the world that existed as "ሀለሐመ" and "አበገደ" series. It has managed to use the printing press since 1513. With the advent of the computer technology Dr. Aberra Molla started working on Ethiopic in 1982 and computerized it using an app released in 1983 and advanced it. The patented novel Ethiopic typing methods have continued to be improved and the novel invention involving even the use of "tab" for typing has been introduced by him.

It should be noted that the Amharic typewriter and its computerized versions are fake character parts distributed on a single ASCII table of less than 100 spots or to be scrambled out of such pieces and are not Ethiopic. It is like typing the 26 English alphabets out of pieces distributed on the 10 number keys.

Ethiopic is the stand-alone glyph similar to the English alphabet except that their numbers are more than 400 in use by the printing press for hundreds of years. It is the Ethiopic computerized by the doctor that became Unicode's Ethiopic.

Ethiopic typing has continued to be a problem because its typing method was tied to the Latin alphabet keyboard. As a result, the about 500 Ethiopic character set has continued to run into problems because of its dependence on the QWERTY type and similar keyboard with 101 keys. While the typing of Ethiopic with one and two keystrokes across technologies from computers to smartphones has been achieved, there are rooms for improvement. It should be noted that the typing of Ethiopic with one and two keystrokes covers varieties of keyboards and moving the layouts around or utilizing more keystrokes are included. It is worth noting that Molla was the first to use character sets in excess of the Latin set for the first time.

One other feature introduced by Molla with computerization of Ethiopic is its layout as there was none before. Initially the Amharic typewriter layout was adapted by assigning the most commonly used varieties to a key. The typewriter layout came from one the inventor's brother, Getachew, learned from the Ethiopian Embassy in Washington D.C. in 1983. An unpublished material by Mattew Lindia (2018) describes Dr. Molla's contributions and the huge differences between the Amharic typewriter and Ethiopic.

In spite of these developments, many have continued to use Ethiopic typing methods with varieties of problems. For instance, one renamed EthioWord's two-keystroke method (FIG. 109) as Washra. Before that Washera's Ethiopic half font distributed on code 33 to 256 were declared standard for Amharic and later another one who distributed the fragmented Amharic typewriter on less than half the same code points became an Ethiopic legend without an Ethiopic. Another similar fake legend was someone who copied the Ethiopic digitized in 1983 by the inventor and presented it in a ChiWriter app in 1988, In another method Lexilogos Amharic can't type Amharic words such as "ትዝታ" even with mouse clicks because the spelling of "ትዝ" is the same with that of "ፀ" and this is just one example. A system for Ethiopic representation in ASCII also known as SERA has continued to force people to add and remove spaces to settle some glyphs mapped under the vowels. Others have continued to use the mouse clicks to type on computers unsuccessfully while more type Ethiopic with three or more keystrokes as in Keyman and SIL and at "ኬሻ" is typed as k↑e↑s↑sa with eight keystrokes. Opportunities-of-Amharic-Keyboard-Layouts-የአማርኛ አካባቢነትየኮምፒዩ ተር-ቁልፍ-ሰሌዳ-አ ቀማመጥ-ረገድ weaknesses of the versions by Microsoft, PowerGeez and Keyman have been discussed (FIG. 106) though the author seemed clueless about Mod-Eth, EthioWord (FIG. 109) and GeezEdit. Existing systems have generally continued to falsely claim that they type a default Ethiopic glyph with a keystroke each. To some and as described above typing Amharic is the primitive method of selecting the characters with a mouse toggling through drop-down menus. It is surprising that Ethiopians continue to accept such gimmicks as English is not typed that way. Various known system cannot type an Amharic glyph followed by a vowel and the typist is cheated as if the apostrophe or a "-" key is not a second keystroke at and the instruction is for the "-" key default or the 6th form not to be typed and thus wrong in spite of not able to type Basketo, Gumuz and Gamo-Gofa-Dawro Ethiopic. Google has introduced something similar (FIG. 97.) FIG. 106 uses the typing method rejected at FIG. 104. To make things worse they don't read what has been published even in Amharic at https://am.wikipedia.org/wiki/አበራ_ሞላ and instead continue to waste their time without understanding what is going on. A Wikipedia SysOp has been deleting whatever was published by the inventor to keep people in the dark and he is most likely one of the plagiarists who knows English. An example is where GeezEdit Amharic parts renamed to AmharicQ by plagiarists was falsely used as Amharic. The current invention is also a solution for similar problems created by ligated fake glyphs also even involving more than one font as in Feedel software. Current approaches of moving to translation and programming in Amharic and even artificial intelligence is not on scientific grounds. This current invention as a solution also applies to EthioConvert (FIG. 100) copycats as well as its pre-cursers such as GeezEdit Amharic P (FIG. 50), ModEth and EthioWord types. It also covers the settlement of fake Amharic, etc. fonts converted to Unicode. Fake Ethiopic legends and the so-called pioneers, plagiarists and their followers have dragged back Ethiopic by over thirty years instead of translating the technology to Amharic and other Ethiopian languages. Many are assuming that they are documenting Ethiopic while using the computer as a typewriter to this date. Google's Amharic app is advertised as the first in spite of USA patents. This is one app that has created incompatibility with Molla's invention by confusing the iOS operating system. The need to expand the claim to EthioWord methods where the Unicode Ethiopic is broken down to vowel forms as fonts is to exclude such applications. In this app adding a space enables font switching of the unsettled default glyph generated. Some have abandoned Ethiopic for Latin based writing system because of tribal hatred. A two-keystrokes method for a virtual keyboard provided by Google has recently introduced an online Amharic typing search tool for Chrome that is a two-keystroke default (three for shifted glyphs) method requiring a space and then removing the space with a mouse and thus one cannot type without the use of a mouse. Others are using the default sixth order alone or with a second keystroke.

While some systems provide for touching a key that brings up an incomplete and undocumented glyphs showing "ቀቁቂቃቄቅቆቋ" when "ቅ" is struck that supposedly picks a "ቅ" on selecting it from the popup list while the manual claims the typing of a default glyph with a single stroke. This is similar to another app, with similar problems. In spite of typing the "ቅ", it has not been settled even with mouse clicks. Even the English accent typing method of scooting to an accented glyph is a two-key system and that was not adaptable for the computer version. While the Ethiopic is broken down to orders, the accented method is for classes showing up in the cells and the current claim include documentation by those methods. The computer and the virtual keyboards are similar.

The current method is improvement over the one and two keystrokes and also addition of third keystrokes as novel keyboarding. This is because the use of four and more keystrokes has continued to also be a problem and thus require discouragement. Typing of Ethiopic glyphs with one or two keystrokes is described in U.S. Pat. No. 10,133,362 to Molla irrespective of the methods of rendering the Ethiopic. Some have also continued to base the typing on English spelling and examples are those such as Microsoft, SIL, Keyman and Google. For instance, SIL types "ኹ" with five or six keystrokes because Ethiopic glyphs are typed as words with different spellings. Historically Dr. Molla as a pioneer of Ethiopic computerization considered the potential users in assignment of the keys. Languages with less numbers of users, and thus keystrokes, were assigned to the periphery while glyphs like the "v" (FIG. 35) that were alien to Ethiopic were assigned to another commonly used Geez glyph ("ቨ") instead of its Ethiopic version or the "v" key.

Even glyphs such as "ኸሠጸዐ" that have related glyphs were assigned to the vowels making the keys available as letters and vowels just like the Latin typing system while others were having difficulty using them as dedicated vowels only. The most commonly utilized Ethiopic glyphs belong to the sixth order and they were typed with the sixth order Ethiopic font from the get go. The ten numeric keys were expanded to accommodate units of tens in different varieties. Just like Schultz' typewriter keyboard that assigned a key for the English alphabet glyph, those of Ethiopic 37 were distributed among the 37 keys. (FIG. 58, 59, 62, 69, 71, 73, 74, 91, 93, 94, 107) (It looks like the keyboard was also created for Ethiopic at its inception.) Molla assigned the Ethiopic symbols to the number keys, created novel symbols for Ethiopic and even a novel base ten working numerals and published the principles. (FIGS. 17 to 24, 26, 41, 43, 44, 45). Even the Hele reassignment is moving the 37 glyphs around (FIG. 60). The bottom two lines are the inventor's addition to Ethiopic Unicode (Ethiopic, Supplement, Extended and Extended-A) that have not yet been included in Unicode (FIG. 61). Ethiopic Unicode is based on the typeface Molla gave to Unicode through DigiFonts of Colorado in 1989 and subsequently improved.

Molla started out with two keyboard layouts in the 80's and one was the Amharic typewriter type without the ligation to support those who were used to it. The other configuration was the QWERTY type where similar Latin sounds were associated with the Amharic keys. The typewriter was arbitrary and discontinued after support for a decade and the QWERTY keyboard was standardized at the request of the consumers. The advantage of the QWERTY keyboard is because the Latin alphabet and Ethiopic share most of the key sounds. For instance, the "ASDFGHJKL" share the same Ethiopic "አሰደፈገሀጀከለ" phonemes making typing simple. An example of typing Amharic in English from a cellphone is incorporated as a claim here is available (FIG. 101) Methods described at FIG. 103, for example includes those of ModEth where each character is typed with two keystrokes.

The inventor started working on Ethiopic in 1982 and an app he computerized Ethiopic with was released in 1983 and he later applied for a U.S.A. patent. He was encouraged to patent his methods in Ethiopia by USPTO. Unfortunately, he could not get patents for his methods because Ethiopia did not have patent laws at the time. He was advised to release the applications on the promise that the issue would be looked into in the future by the Ethiopian government. In 1991 the military government was replaced by a tribal one that was hostile to Amharic and refused to give the patent to the inventor. This resulted with the appearance of numerous plagiarists and the inventor started with improved methods switching priority to the USA and subsequently received four Ethiopic U.S.A. patents and three Ethiopian patents.

In spite of the patents being for the typing methods, some have recently started with the Ethiopic sorting order as a default and Molla does not recommend it and has presented it for the sake of the claims, as it adds unnecessary cost. His methods allow the use of the English keyboard for Ethiopic and it even works in Notepad. The principles described for Windows works in smartphones and other gadgets with virtual, on-screen and other keyboards. Making the Ethiopic keyboard layout similar to that of Latin has helped to easily adapt and modify current technologies. The patent covers various layouts.

In the past people have used jailbreaking and simulation programs instead of paying royalties or buying software from the inventor. These and similar approaches are for varieties of patented and non-patented methods that can be utilized in Ethiopic and examples are speech, optical character recognition, Swiftkey, simulation in different operation systems, language operation systems, jailbreaking, layouts, conversions, onscreen keyboard, autocorrection, spell checker and more such as the virtual keyboard Google has presented. The claim by the inventor thus includes such methods where applicable. Examples of other instances are the use of a second keystrokes such as the space instead of the apostrophe key and removing the space if there is a need to type another glyph next to it. Such tricks have been used as a way to go around the patent at the expense of the keystrokes and scientific honesty. All these are now claimed to stop such problems. For instance, Ethiopic is the best live phonetic alphabet and can be improved to cover all possible phenomes with a glyph each and use speech as standalone app or supplement to type in numerous languages of the world. The need for these claims is because some are using false claims of the fake typewriter glyphs as Ethiopic and present such inefficient methods to get to Ethiopic based on false stories. Others have failed to grasp the science behind the patents and fraud with undocumented materials includes Amharic Wikipedia. Amharic books have been typed without an Ethiopic period and whole books are not even single sentences.

One of the reasons for this application is to put an end to false claims by many who have continued to drag Ethiopic backward without documenting Ethiopic. Numerous false methods have also been used for further studies taking down newer applications with them. The current invention is to incorporate the various incomplete attempts as a scientifically sound standard. In the past the inventor has shown that the Ethiopic "ኧ" series need more keys while those like the "v" key do not have to be wasted on less used "ቨ" orders. What is important is to create a system to spell out each and every Ethiopic glyph with a separate spelling with the least number of keystrokes. The novel invention fulfills those with one and two keystrokes while focusing on the keys around the "F" and "J" home keys. The need for more vowels ("a" and the third shift "tab") mentioned in the previous patent has been put to different uses in the current inventions and applications. Characters that were displaced by the vowels and shown at the bottom row have been moved to the top row and replaced by the glyphs that share keys. The use of the previous layouts in the current invention has not been abandoned. For instance, the command keys can be used as vowels or any glyphs. Different use of the "tab" key has been expanded to other command keys while the symbols on the numeric pad as well as the numbers have also been utilized for the novel Ethiopic numerals. Even the arrow keys are now typing tools without abandoning previous methods. It should be noted the current novel methods are not similar to the lining up of accented Latin vowels which are actually two-keystroke incomplete methods when used with Geez. This is because a default system can't type an English glyph and an Ethiopic with a keystroke each in methods other than described in the patents by Molla before and now. An example of current programing is where "&c" is for the "left ctrl".

The keyboards are standardized such that all language character sets are built around Amharic that includes the Geez language. As the language sets are incorporated, they should not interfere with previous Ethiopic languages. It may be better to increase the keystrokes to three rather than use the reverse typing with two.

SUMMARY

An improved Ethiopic typing system where defaults are typed with one and the rest with a maximum of two and/or three keystrokes to render and settle a glyph is described. The method is uniform across platforms and operating systems that vary from usages in computers, smartphones, laptops and the like. It also applies similarly in keyboards such as QWERTY, Hele (ሀለ) or others layouts in computers, smartphones and the like including abbreviated, virtual, custom or on-screen. Rendering can be achieved through the use of fingers as well as methods that mimic it and vary from mouse clicks to external keyboards. More than one typing methods and layouts can be used from a keyboard and timeout and disable keys are optional. The purpose is to incorporate Ethiopic in any application that allow the usage of the font or typeface and include coding key sequences that may or may not result in the appearances of all on the screen. A method of progressive typing that breaks up an Ethiopic glyph to its default forms or non-combination characters is included. In one method a character is rendered with one or more keystrokes such that the glyph is settled with second activity involving programming of the sequences. In another the activities are performed in the reverse directions with the same end results. In a third method a glyph rendered with two or more keystrokes is broken down to two or its settled components with a third or more keystroke. In a fourth novelty two of the same or different glyphs are rendered and settled with two keystrokes as in the use of the shifted glyphs or those rendered with the accompanying command keys. Glyphs rendered with two or more keystrokes are also rendered and settled with non-printable glyphs just like the single keystroke varieties. There is thus no need to utilize more than three keystrokes to type and render Ethiopic and similar number of glyphs. Long holds and appearance of glyphs in a row showing the glyphs or just highlighting the choices can also be optional. The pint here is to incorporate what others have tried and current them with the new features.

The invention describes novel methods of expanding the keyboard for many languages and the breakthrough is really worth celebrating. The invention expands on the number of glyphs that can be typed by improving the functionality of the keys. More important than that the novel method eliminates the gimmicks others have utilized to render and settle Ethiopic without scientifically sound solutions. The novel method has allowed to expand keyboarding around the "F" and "J" home keys in computers.

BRIEF DESCRIPTION OF THE FIGURES

FIG. 15-10 or 11-key Ethiopic

FIG. 16. Amharic Smartphone Hele

FIG. 17. Amharic Smartphone Qwerty

FIG. 18. Amharic Computer Hele

FIG. 19. Amharic Computer Qwerty

FIG. 20. Ethiopic Smartphone Hele

FIG. 21. Ethiopic Smartphone Qwerty

FIG. 22. Ethiopic Computer Hele

FIG. 23. Ethiopic Computer Qwerty

FIG. 24. Amharic Computer Qwerty ፩፪፫

FIG. 25. Ethiopic Smartphone Hele ፩፪፫ and Shift

FIG. 26. Amharic Smartphone Qwerty Keyboard 4

FIG. 27. Ethiopic Smartphone Hele Keyboard 4

FIG. 28. Amharic Smartphone Hele 11 Keys

FIG. 29. Amharic Smartphone Hele 11 Keys with Ethiopic

FIG. 30. Ethiopic Smartphone Qwerty 11 Keys. Shift opens one of the second keyboards FIG. 31. The ፩፪፫keyboard FIG. 32. Symbol Keyboard 11 keys FIG. 33. Kb4. Double strike, shifted or long press could become "RK". Note that "ቈ" can also be typed with "wke", etc.

FIG. 34. Ethiopic Smartphone Hele or Qwerty, etc.

FIG. 70. An example of an Ethiopic character set for Maasai from a 2018 publication by Mark Powell.

FIG. 71. Typing at Ethiopic.com from Smartphone. Also works with different keys per row FIG. 72. Ethiopic Base Ten Numerals Typed with or Without the Arabic Numerals, Example: Ethiopic one is typed with "1" and "left alt" keys.

FIG. 80. Optional keystrokes

FIG. 81. Ethiopic typing with one and two keystrokes only.

FIG. 82. Three Keystrokes Layout

FIG. 83. ABSHA Ethiopic GeezEdit Third Keyboard

FIG. 84. Note that some glyphs are not in Unicode

FIG. 89. Some command keys are optional

FIG. 90. Keyboard reverts to default in this two-keystroke system

FIG. 94. Hele Ethiopic layout

FIG. 95. Hele Optional keyboard

FIG. 96. Another Hele layout

FIG. 105. Android Google GeezEdit Amharic App

FIG. 106. Keyman was unable to type 24 characters while it took (Microsoft) 51 (PowerGeez) 55 keystrokes FIG. 107. Smartphone Ethiopic, highlight (or generate glyphs)

FIG. 113. An example typing table

DETAILED DESCRIPTION

Figure 1:
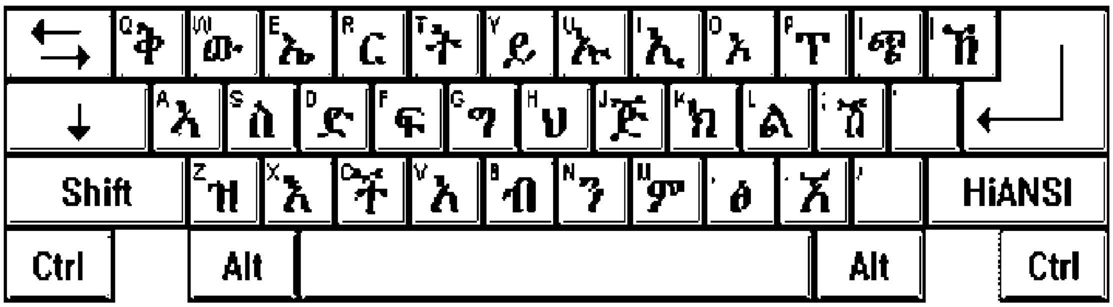
FIG. 1. Default Amharic Qwerty
Figure 2:
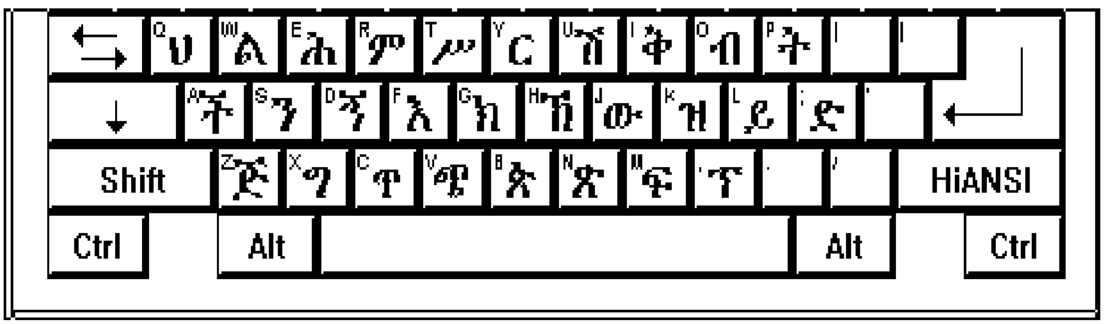
FIG. 2. Default Amharic Hele
Figure 3:
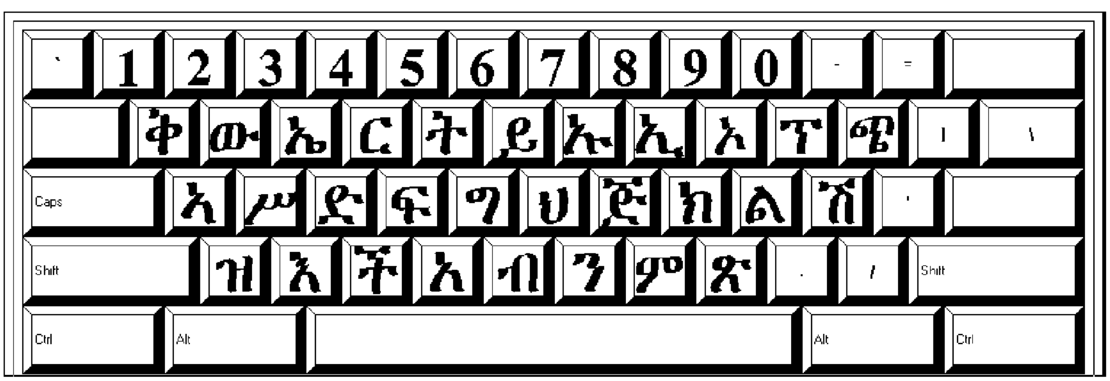
FIG. 3. Ten-Key Amharic Qwerty Layout

The novel invention is about special type of programing where the use of the command keys and arrows expand the keyboard keys available for the purpose of typing Ethiopic and other Unicode glyphs. In the past the tab key was used as a second keystroke and that added the number of new keys by as many as the number of keys on the keyboard.

In the past and as described in U.S. Pat. No. 9,000,957 a total of 14 glyphs were rendered from two keys such as "a" and "e". In the current invention some of the features are avoided because of previous commitment and to avoid confusion. For instance, the combined use of the left ctrl and alt keys disable the GeezEdit app and not used here without voiding the claims. In the past the tab key was also used as a standalone optional third shift key in the GeezEdit and EthioSuite apps. ("fn Z" could be used to type "ዡ", "alt Z" for "ዢ", etc. while changing to another layout is just by moving the glyphs and vowels around.) In the current Ethiopic typing system named "Werqie" the command keys are utilized in many ways other than solitary and default keys. As a result, it is also possible to now move the keys dedicated to the QWERTY keyboard to different glyphs giving priority to methods Ethiopic needs. With due respect to Ethiopians who used Molla's keyboard for the ABSHA system, the new one could appear as a second, independent or superimposed system. Actually, the inventor wants the novel Ethiopic Werkie to be the standard. Over the years the inventor digitized Ethiopic starting out in 1982 and two types of major programs were released. One group was dedicated Ethiopic publishers with superimposed English while the others were memory resident apps to work in various English apps. The biggest challenges were to limit the number of characters around the "F" and "J" keys for fast typing on computers. The challenge involving virtual keyboards like those of smartphones is limiting the keys to about a dozen glyphs in a row. The layouts have remained close to older methods to maintain uniformity in all gadgets without ignoring or excluding others. Feature available were utilized in the Ethiopic systems and examples are like selecting a glyph with a mouse from a set or screen to modifying speech and character recognition apps and the like to fit the Ethiopic systems. All apps that allow fonts were in use and the limitation was the knowledge of the user. Apps such as EthioSuite are to build Ethiopic features not available in the Latin and current systems without excluding them. Ethiopic computerization has remained a serious problem because the computer was built on the needs of the English Latin alphabet. By 1982 only the ASCII keyboard with 128 potential spots were available. This was enough to simulate the Amharic typewriter patented earlier by Engineer Ayana Birru and Alem Work and Molla was not interested in those as they were not Ethiopic and were character parts assembled from different pieces to look like Amharic. The doctor was into the ancient real Ethiopic that was in use for thousands of years. In 1983 Grum got hold of a demo disk of a software by the name of MegaWriter that seemed to fulfill what the doctor wanted which were primarily an application that would allow making Ethiopic fonts and has also the capability to handle more than one font. MegaWriter allowed the use of different languages such as Arabic and Hebrew that needed only one ASCII sets each to be selected through the function keys. Large and small fonts were selected though other function keys. A review of this application is available at InfoWorld Vol 5, No 47 of Nov. 21, 1983 page 68.

Figure 110:
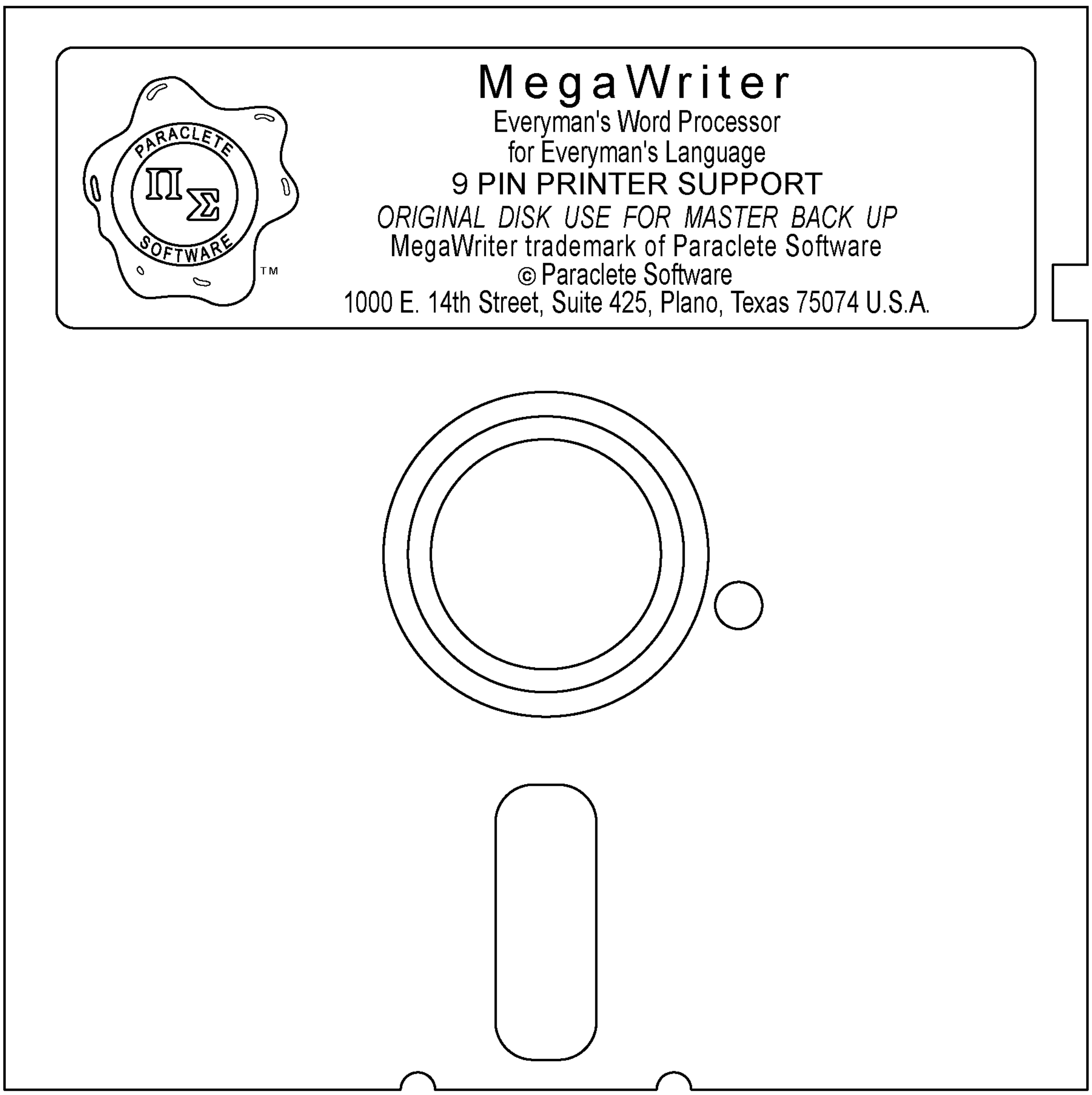
FIG. 110. MegaWriter, 1983

Molla started by trying out this and other applications in computer shops (FIG. 110). At the same time my brother, Getachew, sent me the layout of an Amharic typewriter and its picture from the Ethiopian Embassy in Washington D.C.

The principle behind computerizing Ethiopic with this method is to break up the Ethiopic into orders and permit their appearance through the function keys while the Ethiopic glyphs were entered on second keystroke of the keyboard keys. A simple example is to render "bu" with "F2" and "b" keys as in ModEth. Weyanie in Ethiopia by 1991 refused to give the inventor's patent as promised by the military government it overthrew it with the help of the US government.

Fast forward, Ethiopic computerization has been described at Ethiopian review of January 1991, and September 1995. Ethiophonetics was presented in Microsoft Word as published in Ethiopian Review in 1995. Then typing was improved though regressive and progressive timeouts as described in newer patents to Molla. In the meantime, two groups of copycats appeared. One presented the Amharic typewriter version in 1986 and later started calling it Ethiopic falsely. This individual was not the only one to computerize the typewriter while he was the first fake legend of digitized Ethiopic. Another one who was familiar with ModEth sold with another name for English and presented it as something new in 1988 and became a second fake legend. The current invention is a follow up and solves why a keystroke does not render and settle an Ethiopic glyph. The main reason is because when one shares the keyboard with English, the second font requires a second process to settle the non-English glyph. Using the accented Latin glyphs in the extended ASCII is not the same with it Molla's explanation as in FIG. 71 for "ዷ" and "ቓ" because of the large number of the Ethiopic glyphs. Actually, the Hele configuration for computers is discouraged because it is similar to the abandoned old numeric keyboard by Molla because of the distance between the alphabetic and numeric keys.

Unlike Molla's patented methods where timing was introduced as a differentiating factor these other methods embraced by Keyman and others have no timing factor. As a result, the use of vowel keys is limited and different when the key is used as a character. On the other hand, assigning keys such as "aeiou" to the Ethiopic "አኡኢኣኤእኦ" glyphs resulted in the loss of keys creating shortages. These shortages forced the need to double the function of the vowel and other keys to more than one Ethiopic glyph. An example is "t" for "ተ" and "T" for "ጠ".

Figure 56:
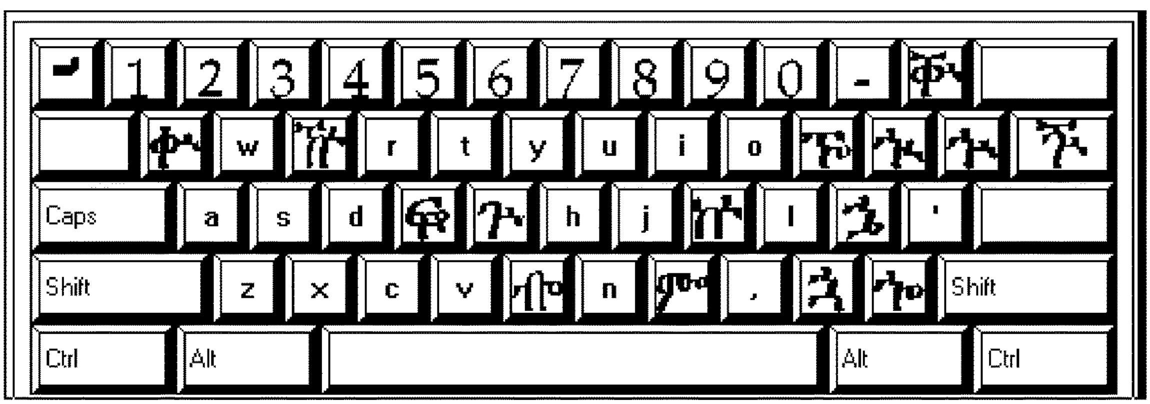
FIG. 56. One of the Tone Symbols on Tilde with ABSHA Layout

The current invention can be utilized by varieties of language glyphs. These vary from those such as Latin to the expanded international phonetic alphabet and those that use it in transliterations. Many African languages can receive their own Geez sets and languages such as N'ko now have Ethiopic tonal marks (FIG. 56). New foreign glyphs can be created from related Ethiopic phenomes as in the past.

Figure 104:
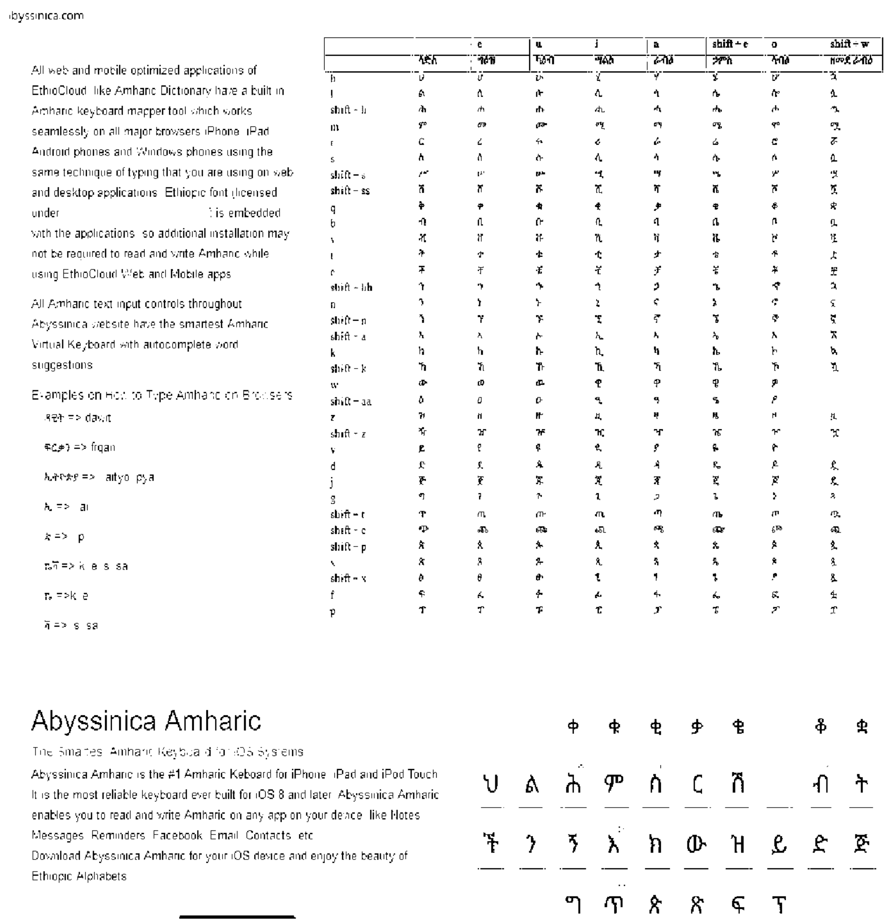
FIG. 104. The default is typed with a keystroke is not true
Figure 107:
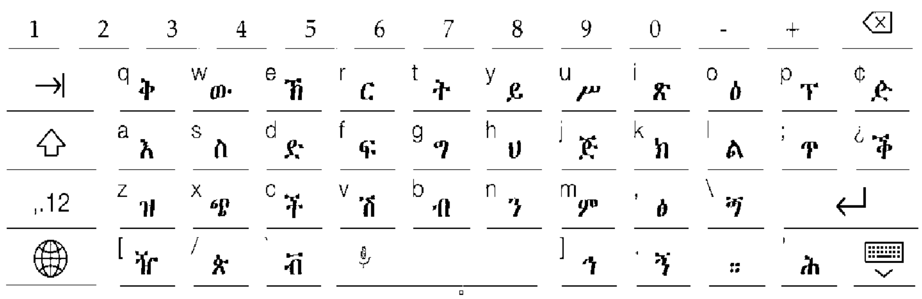

A fifth worth mentioning is detraction of Ethiopic documentation by numerous entities for their own purposes. These vary from the TPLF government that refused to give Ethiopian patents to Molla as earlier promised by the Derg government as well as self-promoting Ethiopian copycats who falsely call themselves Ethiopic legends. Many lacked the intelligence to grasp the points behind the patents and they include late-comers such as Google and numerous Ethiopians. Others such as Wikipedia were busy undermining Ethiopic by allowing deletion of documents such as references #31 and #32 to Ethiopic patents. Latecomers to such gimmicks include Kekros system where the typing of an Ethiopic glyph with a keystroke is claimed as shown in FIG. 104. Rendering an Ethiopic glyph with two keystrokes or more as in with three due to shift is a new claim along with balloons and callouts associated with such activities by Molla. As shown in the FIG. 104 picture bringing up the "ቅ" with a single or shifted keystroke, a mouse click or similar activities whether the glyph is settled or not is a new claim as it is different from Molla's patented methods. Copycats are falsely claiming the typing of a glyph with a single for shifted keystroke, a mouse click or similar activities falsely even without font switching. Just as in SERA, "ኧኧ" can't be typed with two keystrokes. There is no guaranty that other activities based on erroneous narratives are reliable. As a result, Molla's invention covers all potential activities such as speech, ORC, spelling autocorrect based on the invention whether current or in the future. This is mainly because copycats, particularly Ethiopians who know the languages and the Geez alphabet should have appreciated the scientific discovery by the Ethiopian scientist and be part of the solution instead of reading patents and applications and focus on fictions. For instance, some studies of Amharic character frequencies are based on apps such as Lexilogos where a large portion of the alphabet can't be typed. Even some responsible for Amharic wiki do not seem to know the difference between digitized Amharic typewriter glyphs and those of Ethiopic and the Wiki page itself has not been documented while autocorrect and spellcheckers could be based on such fake documents. The sixth was built on the previous invention with additional features. The novel invention can be described using the "tab" and the numeric keys as follows. In the ABSHA system Molla used the "tab" key as an optional third shift key when struck as a second keystroke making it similar to a vowel key. The added novel features can be listed as follows:

A) As a prerequisite the default use of the "tab" key is disabled so that nothing happens on striking it, though there is programing going on in the background.
B) "3" key followed by a "tab" renders the Ethiopic space symbol ("::") as an example. This example feature is optionally added as part of the current efficient method. This is because this symbol can be typed with the shift key and "3" and thus it is to show one feature in combination with the new.
C) Striking the "tab" key followed by the "3" key as a second keystroke renders the "3" glyph making it a novel method of rendering the number "3". This frees up the "3" key from being a dedicated number "3" key in the computer keyboard as well as virtual keyboards as in the Apple iPhone and Android. FIGS. 22, 28, 38, 39 and 47-51. These scientific challenges are complicated with the hardware keyboard as opposed to virtual keyboards. There is more flexibility to work with virtual keyboards, FIG. 12, 13, 15, 17, 18.
D) Another example usage of this number "3" key is to assign the Ethiopic "ጽ" glyph to the default key so that it is rendered by striking the key. Thus, striking the "3" at any time renders the "ጽ" provided it is not proceeded by a "tab" keystroke. Now that the "3" has been displaced by the "ጽ", it is also possible to use the key for any glyph.

E) "tab 33" types "3 ጽ" while "3 tab" types "ጸ" and "tab 3" types "3". Another novelty is incorporation of the next step without relinquishing its previous use. A new additional novelty is the potential use the "3" key followed by the "tab" to generate the "ጸ" glyph instead of the Ethiopic space, "::".
F) "tab 33" types "3 ጽ" while "tab 3 tab" types "3" only.
G) The use of the "3" and "tab" keys alone or in combination to type "ጽ" alone by striking the key, "3" and "tab" to type "ጸ" and then type "3" with the "3" key alone with four keystrokes or a total of three different glyphs with four keystrokes is a novel claim. Out of the four keystrokes the first alone types "ጽ" by striking the "3" key. "3" and "tab" keystrokes type the "ጸ" with a total of three keystrokes. Then striking the "3" key as a fourth keystroke renders the "3" digit". Rendering three separate glyphs i.e. "ጽ", "ጸ" and "3" with four keystrokes is a novel claim.
H) The above incorporates a novel method of typing two different glyphs by striking the keys in different directions. "tab 3" types "3" while "3 tab" types "ጸ".
I) Expansion of these keystrokes to more than two keystrokes to render more glyphs in one direction or in reverse is another claim.
J) A timeout and/or disable third keystrokes as well as long hold and popups can be added optionally depending on the system if necessary.
K) These above features are expanded to other command keys and similar usages exponentially expanded to the current varieties and novel keyboards irrespective of the layout.
L) The above features usable in the Qwerty or Hele (Uλ) layouts are also usable in a combination keyboard where both features can be utilized at the same time where possible. Example is "da" or "d4" to type "ዳ" while "d4" can type "ዻ" and "4d" types "ዻ". Two-keystroke typing with the command keys are also available. This is even without using the shift key where "D4" can type "ዻ" while options such as "4D", "Da" "d$", "$d" for three keystrokes and others are also there.
M) For instance, "3" renders the "ጽ" and settles it. The is no need to utilize all these features at the same time so that the user is not confused.
N) These glyphs generated in GeezEdit or EthioSuite can be copied and pasted in different applications as they work with Unicode or other glyphs.
O) Ethiopic words often use space just like English, though some use the Ethiopic space mark. The space can help with the settlement of the last word, though such marks are themselves settled because of the programming. Some use two space marks as Ethiopic period and this novelty could assist eliminating such errors through the claim.

A practical example is to add the shift key and increase the number of keys rendered. For instance, "tab" "[" renders "ፊ" if the "[" key is to render the Amharic "ፊ". "[" "tab" renders "ፊ" while "shift [" or "{" renders "ፊ". "ፊ" can be rendered by "[" and "left ctrl" or "[" and "1". The use of "tab" and "{" is discouraged to avoid confusion without giving up on the novelty claim. The "left ctrl" and "[" can type "ፊ", "fn [" to type "ፊ", etc. These are new methods used as the character sets increase while adding efficiency to the small sets such as Amharic. The "[glyph]" can also be typed with the right "ctrl" key and "[" to add efficiency by dedicating one hand for each half of the keyboard.

In the numeric row, the Amharic can be typed using these keys as second keystrokes. The number "6" don't even have to be utilized as a default keystroke. This is because the defaults are typed with a keystroke each and there is no need to utilize another keystroke to settle it. This equally apply when shift or command keys are superimposed. If necessary, the "Apostrophe" key is always available for this purpose too. There is thus no need for more than three keystrokes to type any Ethiopic glyph. An example is the use of the "[" to type "[glyph]" and "['" or "[" and "6" can optionally settle it. Thus "{" renders [glyph] while "{'" settles it. The "[right fn" can then be used for "[glyph]". "[glyph]" can be typed with "tab [" or "[9" too. The patterns can be standardized for simplicity and brevity. On the other hand, "[v" renders "[glyph]" and "{v" renders "[glyph]" and "[V" can render "[glyph]". Typing in the reverse as in typing "[glyph]" with "v[" or "v{" is possible. However, this could interfere with prior keystrokes and the best option may be to change the "[glyph]" typing to "[1".

There is thus no need to use more than three keystrokes as in typing "[glyph]" with "V{" and this is a new claim. While these novel methods allow variety of typing methods, some are not utilized to avoid confusion. An example is not typing "ጠ" with "at" as it interferes with the default typing while "At" or "aT" are options. "[1" or "[!" can type "[glyph]". Similarly, in the Hele layout "Shift 1 q" can be used to type "[glyph]". The inventor's choice is to stick to the Qwerty layout such that the default is typed with a keystroke each, while the shift is used for the second layer, the numbers for the third and the command keys for the fourth. This is because the third and the fourth are for minority user-languages. The pattern can be broken down to better keyboarding if the user-languages need simpler ones of their own languages. This is based on the need and principle such as "ቀ" and "አ" have their own 13 and 8 vowel forms individually represented for simple typing. An issue to mind in the standardization of the Ethiopic keyboard is the fact than other Ethiopic-user languages have to be considered when one is set for Amharic keyboard. This is because other keyboards have to be added on the Amharic without changing the Amharic typing methods or keys. For instance, the middle numbers "45678" can be used for the "[glyph]" Amharic to make typing simple. This is unacceptable unless this keyboarding can be used for other Ethiopic alphabets too.

Another novel approach is to type "[glyph]", "[glyph]", "[glyph]", "[glyph]" and "[glyph]" with "vq", "iq", "aq", "eq" and "uq" with two keystrokes each. These can also be typed with "9", "0", "8", "–" and "=" or "1", "3", "4", "5" and "6" and/or "7", "9", "0", "–" and "=". The "[glyph]" can also be typed with "2" and "7" to cut on the spread. Another option is to type them with the ctrl, fn, start, left alt, right alt, right fn and right ctrl keys or their reverse for the above or just some vowels. These seven keys can also be utilized as regular vowels bidirectionally. It is also possible to use two of these at a time or break them up between each half of the keyboard to distribute the burden between the fingers of both hands. These are just examples and not limiting. In one of these methods typing "q" is for "ቅ" while "qv" is for "ቀ" and "vq" types "[glyph]". "[glyph]" is typed with "qvq" while "vvq" types "[glyph]" and it is preferred over "vq" to avoid interference from suspended typing. Note that "[glyph]" can also be typed with "wke", etc.

In the current invention as well as the previous ones by Molla, the whole Ethiopic was considered though the major concern has remained that of Amharic. The current invention solves a few major issues. The primary one is because Ethiopic can be typed with one and two keystrokes only and even more efficiently due to the current invention. Hopefully this would stop false claims by others that the defaults are rendered and settled with a keystroke each. This false information also includes the typing claim of a glyph with two keystrokes that includes the "shift" key. The dangerous issue at hand is because the document has really not been documented and people continue to waste their times. As a result, it is important to shame even large corporations for being part of this sham. For instance, SIL claims that the default form is the 6th order (and one does not have to type the "–" key). The so-called Ethiopic keyboards by numerous companies require scrutiny. With these fake starts they have continued to add even more fictional keyboards dragging the Ethiopic backwards.

Default keystrokes and two keystrokes render and settle a glyph as describe in patents granted to Molla. Optionally adding a mouse click, a space bar after the character or the word or processes such as saving a document may settle such glyphs. This is a new claim because it is not two keystrokes. Without these features the Ethiopic remains undocumented and an example is at Amharic Wikipedia that uses SERA. At Amharic Wiki opening a document to edit even changes the default 6th order glyphs at the end of a word to its vowel form on typing a vowel next to it. This is because the glyph has never been settled initially. The glyph changes from the default to its vowel form with a keystroke because it was never settled in the first place. One can't have a glyph rendered with one or two keystrokes and also change it at the same time other than by methods invented by Molla. In reality no glyph is rendered and settled with one and two keystrokes and the same pattern is followed as the number of keystrokes is increased to three, four and more. The novel Ethiopic numerals can be typed preferably with default keystrokes each from the numeric keypad or with one or two keystrokes each elsewhere.

This invention's difference from the use of the ASCII system as in ModEth and EthioWord has been mentioned above. In ModEth each order was assigned to the function key while the default EA typing font was introduced with EthioWord. In GeezEdit the tab key was introduced as an additional first order key vowel and the second unassigned "a" key in FIG. 32 was introduced in U.S. Pat. No. 10,133,362. The same figure has been modified and reprinted as FIG. 74 here with novel usage.

Figure 73:
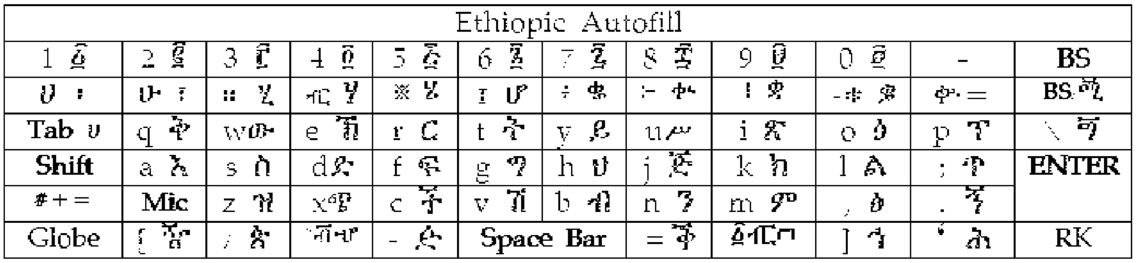
FIG. 73. Another Ethiopic Configuration

These assignment of giving separate keys for the eight orders by adding the "tab" and an "a" key other than the "ኧ" key (FIG. 73 from U.S. Pat. No. 10,133,362 has recently been copied to their assignment in the fake, distorted and multiple keystroke SERA and other systems by assigning them to the "a" "v" and "x" keys.

Figure 74:
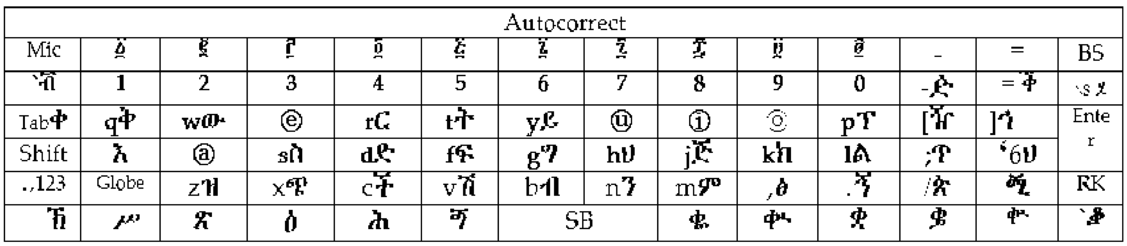
FIG. 74. From previous patent application. The top row can be removed. The second "a" as well as the 2rd shift on tab can be moved elsewhere.
Figure 75:
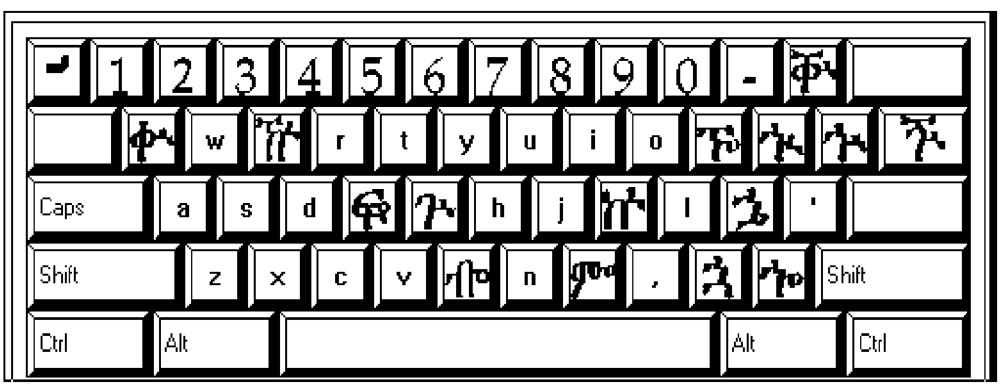
FIG. 75. An example of one of the tone symbols on tilde
Figure 76:
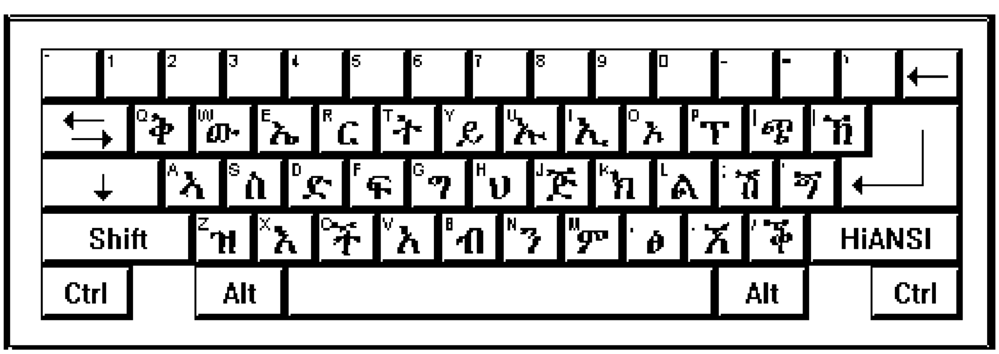
FIG. 76. Another Ethiopic Layout

In the U.S. Pat. No. 10,133,362 patent FIG. 32 the 13 vowel keys were given their own keys. This is a new claim. In the Werkie system the third shift key easily describable in the computer keyboard was moved to the "v" key and the "a" vowel was moved to the "x" key or both to any of the commands keys as examples. Also, a third "a" key was assigned to the "4" key. FIGS. 73 and 74 are to show that the "tab" was used as a second keystroke vowel for first order Ethiopic glyphs as well as the symbols on the number keys and others. In FIG. 73 the "U" next to the "Tab" is to indicate this and note that the sixth order "ህ" was default and the "6" key was instead given to seventh order vowel as shown by "ሆ". The function of the "tab" key was moved to "v" and the first "ኧ" to "x". The "8" was for the eighth order too. The vowel keys were made dedicated and the Ethiopic glyphs there moved to the last row. In FIG. 74 the "ቀ" on the "tab" key was to show its first order usage similarly as a vowel. The features in FIGS. 73 and 74 were modified for use in the new invention.

Figure 9:
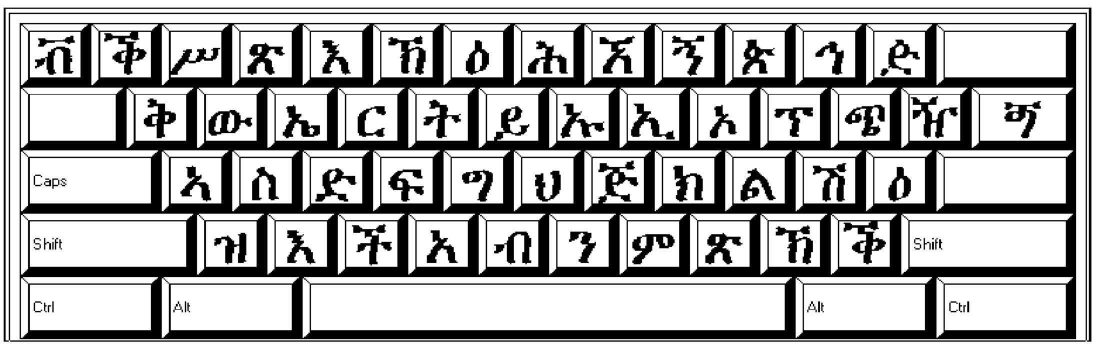
FIG. 9. Ethiopic Qwerty
Figure 10:
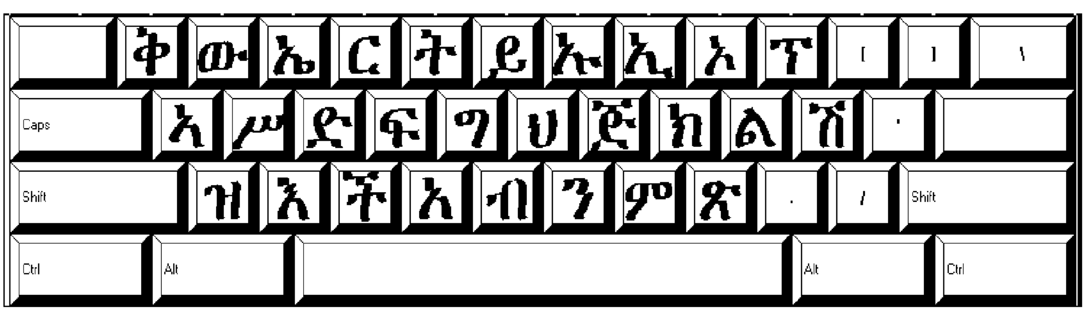
FIG. 10. Default 10-key Qwerty Amharic
Figure 11:
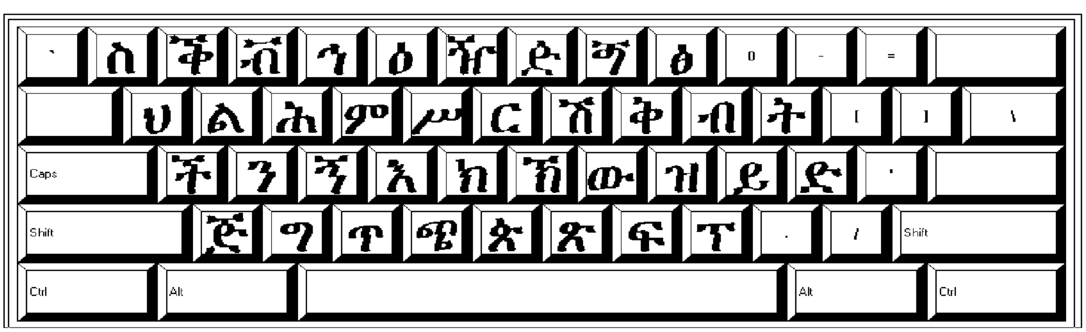
FIG. 11. Default 10-key Hele Amharic
Figure 12:
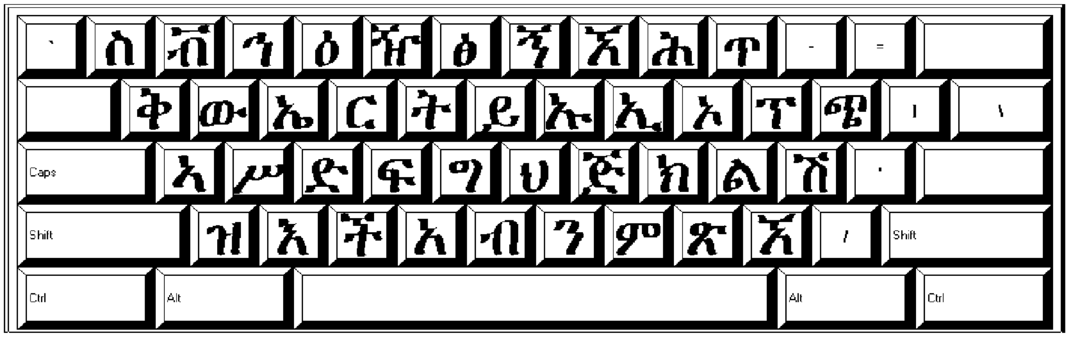
FIG. 12. 10 or 11-key Amharic
Figure 13:
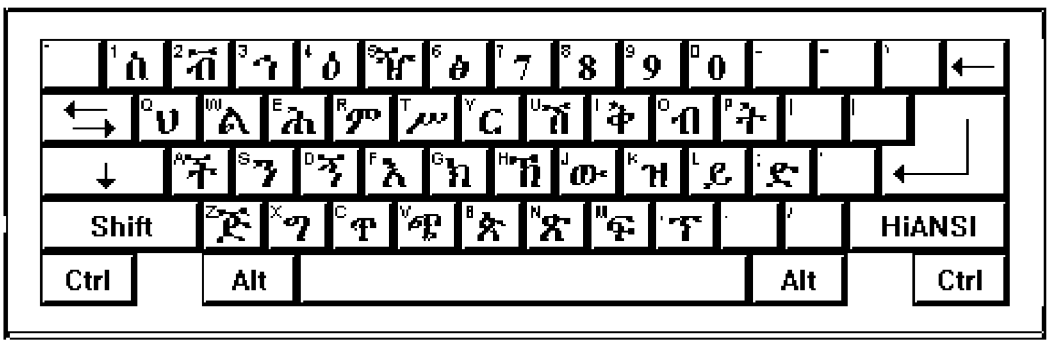
FIG. 13. Default 10-key Qwerty Amharic
Figure 93:
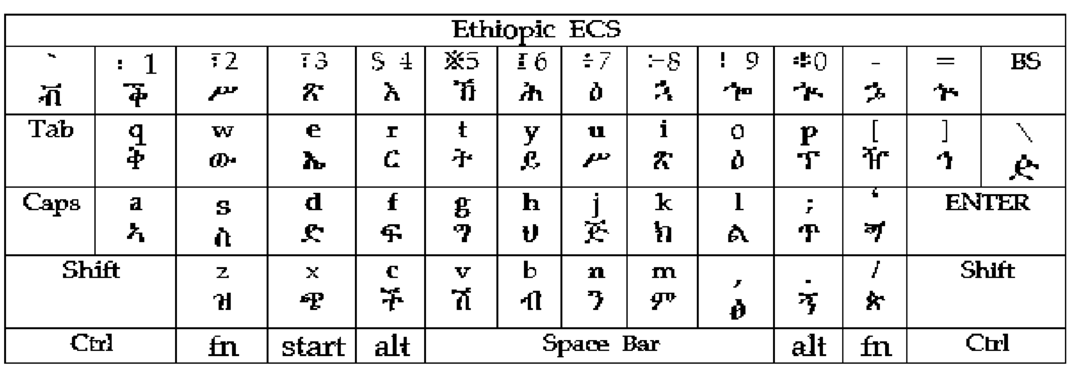
FIG. 93. For laptops and smaller keyboards

These key assignments are examples and not limiting. Ethiopic was clearly and scientifically documented in the inventions by Molla. The current invention is a new solution to problems associated with creation of the Unicode system leaving the keyboard dedicated to ASCII and extended ASCII. The issue thus involves the alphabets of the world and the novelty is a panacea for all. One proof for the inventor's theory come from the fact that both the regular number keys and those of the numeric pad used the same font while the Ethiopic ones require more. This novel keyboarding examples are shown in FIGS. 74, 93 and more. In FIG. 93, the glyphs displaced to dedicate the vowel keys to vowel only were moved to the top row. FIG. 9, 15, 19, 20, 21, 25, 27, 96 and more are to show examples of the current layout varies. The association of the keyboard keys with the glyphs showing up on the screen is straightforward in the English ASCII system. Introduction of more glyphs in Unicode brought in more not represented by the keyboard keys as well as those to appear on the screen. These new Unicode glyphs thus can't be rendered and settled with a keystroke each as these were already dedicated to Lain ASCII and thus require more than one default and shifted default novel writing methods. The Unicode system thus requires at least one more keystroke to render and settle the default and two for the shifted glyphs. Unfortunately, just adding a second keystroke and a third one for the shifted glyphs alone are not enough as the keystrokes also leave behind the characters on the screen unassigned. There is thus a need for a second default and a third shifted keystroke to settle the more than 60,000 Unicode glyphs without showing the keystrokes or the glyphs. This invention does solve those issues in many ways for the first time and is thus a new claim. In one method the ASCII keystroke and the appearance of the glyph is suppressed. In another an unassigned Unicode glyph is added to the mapping key sequences. In a third method the glyph is incorporated at a stage such as conversion, saving and the like. An example is the use of the apostrophe, glyph 0129 or 11743 and suppress their appearances on the screen. The presence of the suppressed code renders and settles the glyph without interfering with the vowel or other keys that follow it. This also applies where one or more glyphs are typed with more than one keystroke and the inclusion of the suppressed glyph. It does not matter whether "ሃ" is typed with "ha", "q4" or any other way. Even in cases involving typing the "ት" with "t" or "ጥ" with "T" is performed, it is with the novel method that the glyphs are settled whether the vowel forms appear or the keys are highlighted. It is because the "ት" has not been settled that a second one appears for selection and the principle is the same for the shifted ones. Thus, another new claim is the typing of a glyph with two keystrokes and three when shift is involved. The importance of this claim is also to stop those who have falsely claimed the typing of Ethiopic with a keystroke and held back Ethiopic for decades and even convinced Amharic Wikipedia to use fake methods.

The novel claims above can be repeated in virtual abbreviated or unabbreviated keyboards, in virtual and on-screen and related clickable keyboards. The desktop as well as the virtual keyboards can be the same especially in on-screen keyboards. However, every process is not necessarily the same as tin he case of the smartphone a long press of the "t" key can produce "ጥ" while "ጥ" can be rendered by one of the command keys and "t".

In another innovation the old method of breaking up the Ethiopic into 8, 12, 13 and more fonts is presented as in the accented varieties of the "a" vowel and one selected on second press of the number keys and the minus and plus keys are enough with or without showing the glyphs. Another feature is the availability of these and more novelty in EthioSuite for Ethiopic and English. "ኧ" can be typed many ways. FIG. 73 is modification from previous patented application. The top row can be removed while the second "a" as well as the 3rd "shift" on the "tab" can be moved elsewhere. The characters at the bottom row have been moved to the top. The moves have been used effectively in the current applications. The "V" key that has not been assigned to the Ethiopic alien "ኸ" with the digitization of Ethiopic by the inventor in the 80's has substituted the second keystroke use of the "tab" to render first order glyphs while the "tab" has acquired additional novel split shift and other novel functions.

Figure 59:
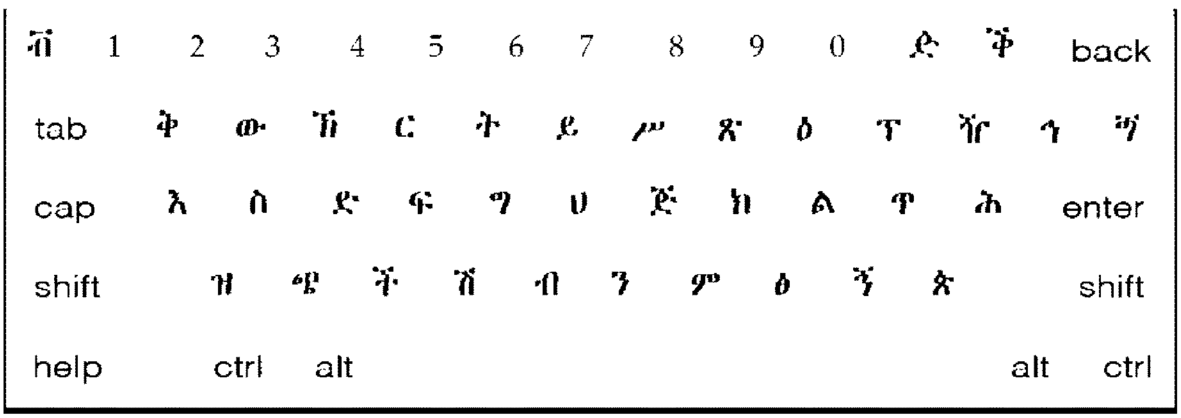
FIG. 59. Computer Ethiopic
Figure 60:
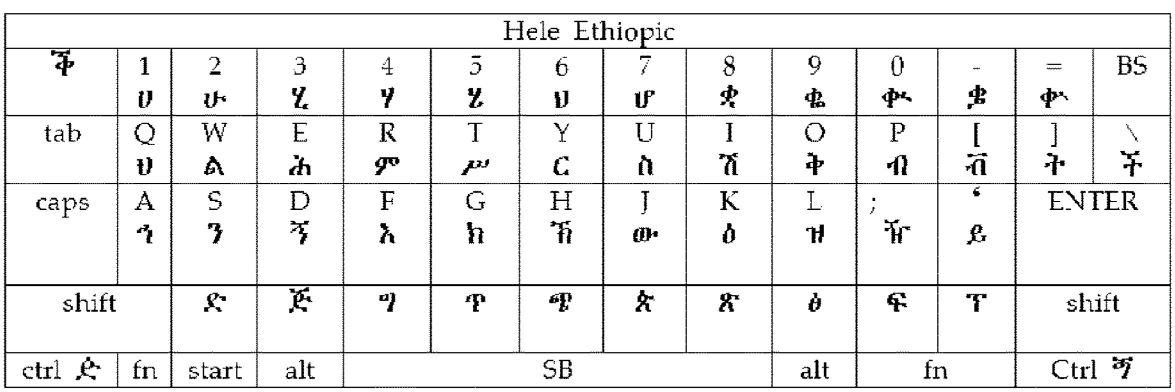
FIG. 60. Ethiopic layout with alphabetic command keys
Figure 62:
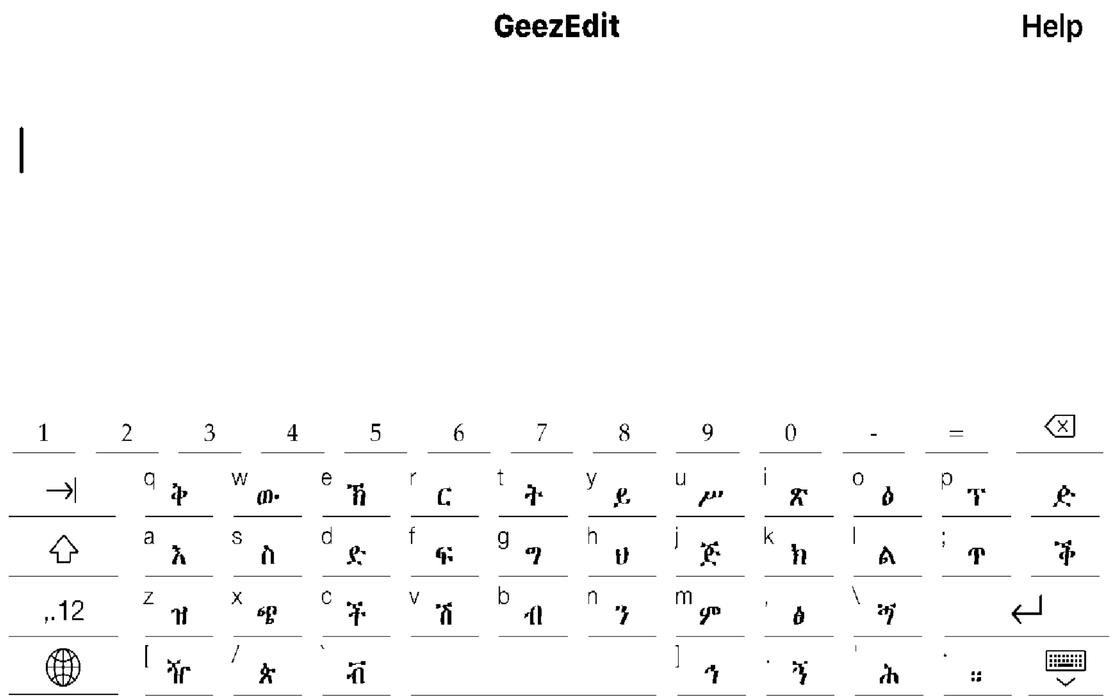
FIG. 62. Old Smartphone Ethiopic
Figure 63:
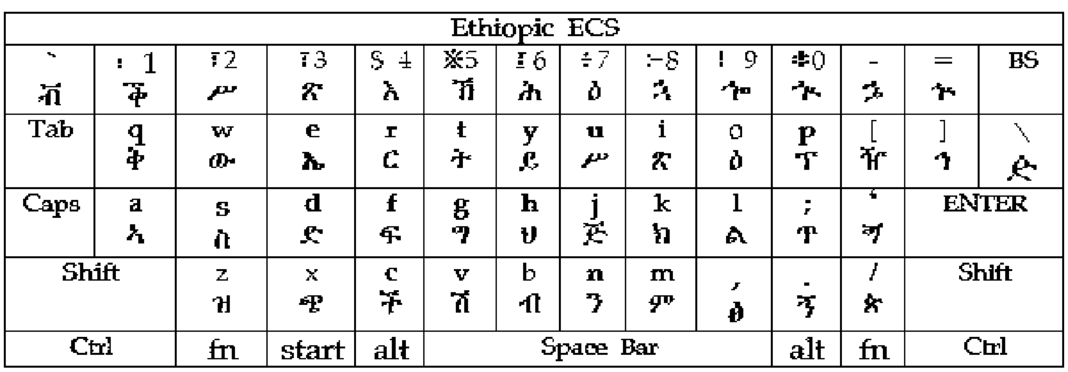
FIG. 63. Ethiopic Computer Layout
Figure 64:
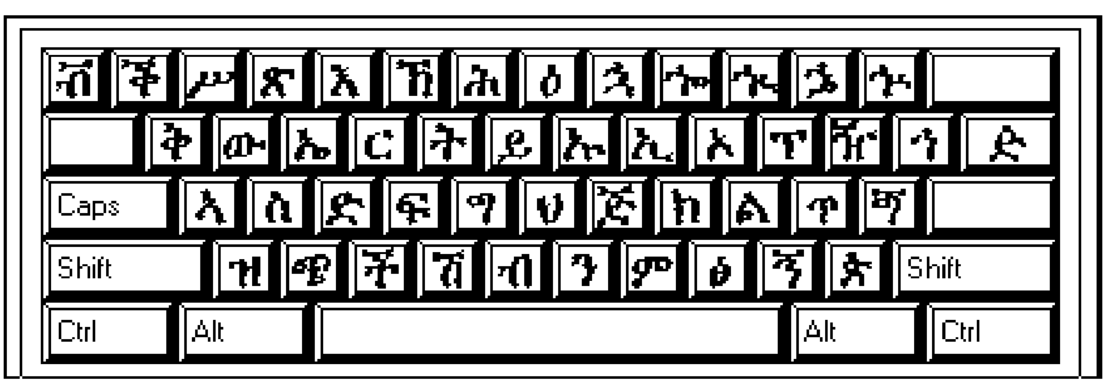
FIG. 64. Ethiopic Laptop Layout
Figure 65:
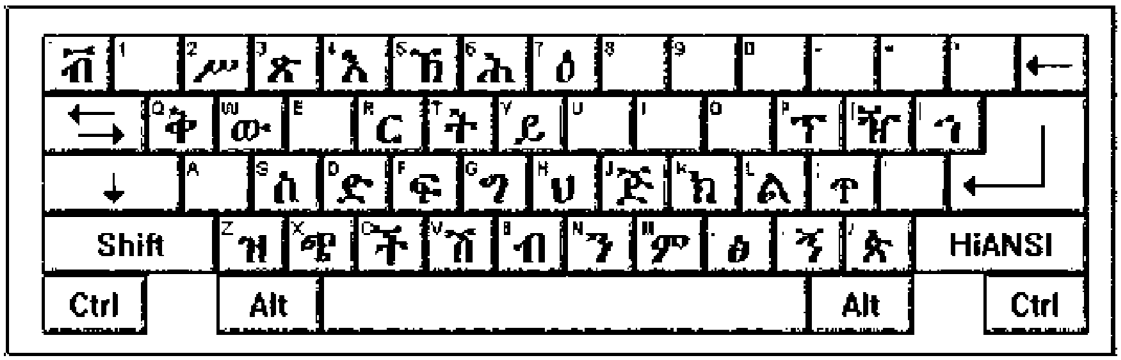
FIG. 65. Amharic Layout
Figure 66:
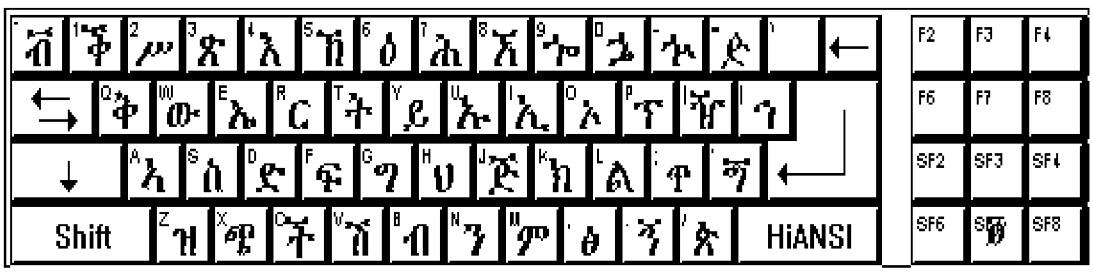
FIG. 66. Ethiopic with Numbers on the Numeric Pad Showing Ethiopic Zero

Another feature is the availability of the glyphs of the extended characters such as "ï" and "ã" to represent glyphs especially on virtual keyboards. This expands the keys available for programming without showing them on the screens as shown in FIG. 71. FIGS. 59, 60, 62 show the same feature. It should be understood that between the command keys and programmable extended ASCII characters there is no shortage of keys in computer and virtual keyboards.

Figure 103:
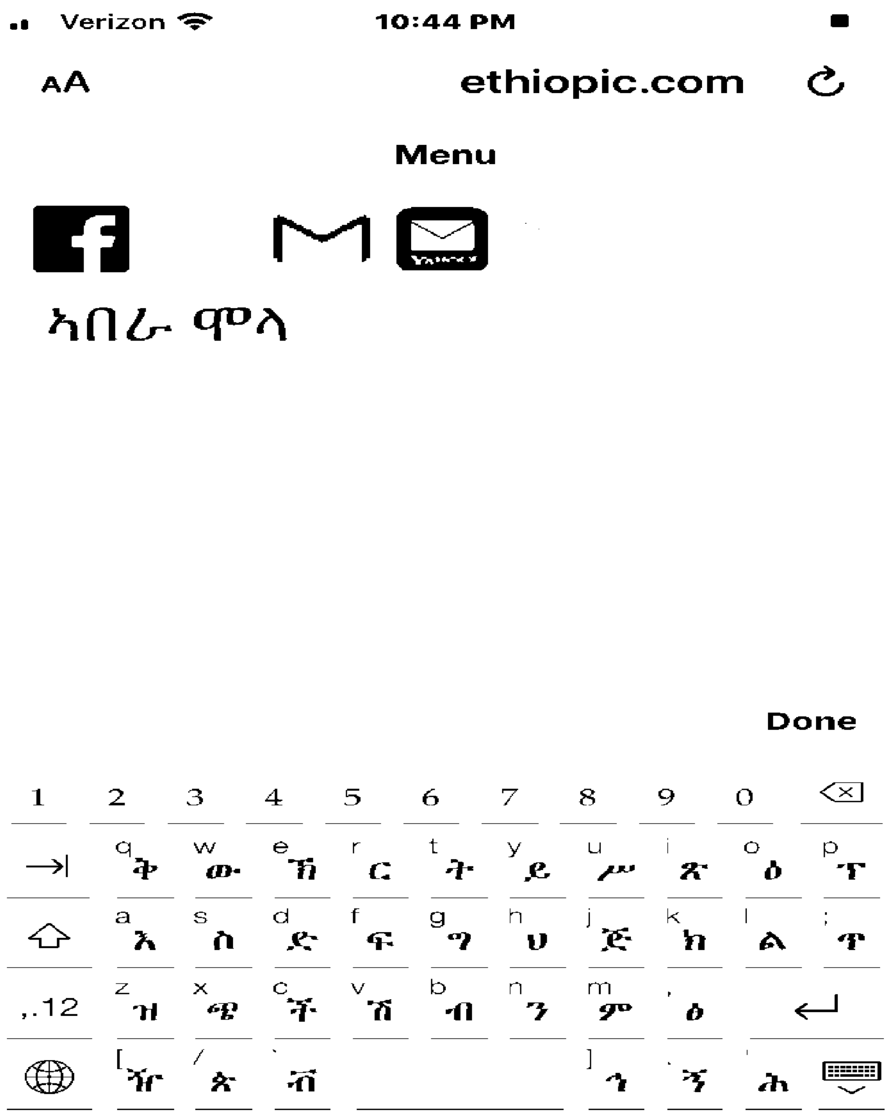
FIG. 103. Typing at Ethiopic.com from Smartphone 11 keys per row

It is also possible to remotely use the regular or modified keyboards at Ethiopic.com page as in FIGS. 71 and 103.

In the past distribution of the Ethiopic glyphs on the computer keys was similar to that of the English with exception of some keys. Characters such as "ዠ" and "ጎ" were assigned to the "[" and "]" keys because of the small number of Amharic words that use them. Keys such as "–", "+" and "\" were reserved for minority user languages, such as Oromiffa (ዾ), Tigrigna (ቐ) and Agew/Bilen (ጘ) respectively and not used by Amharic.

Figure 69:
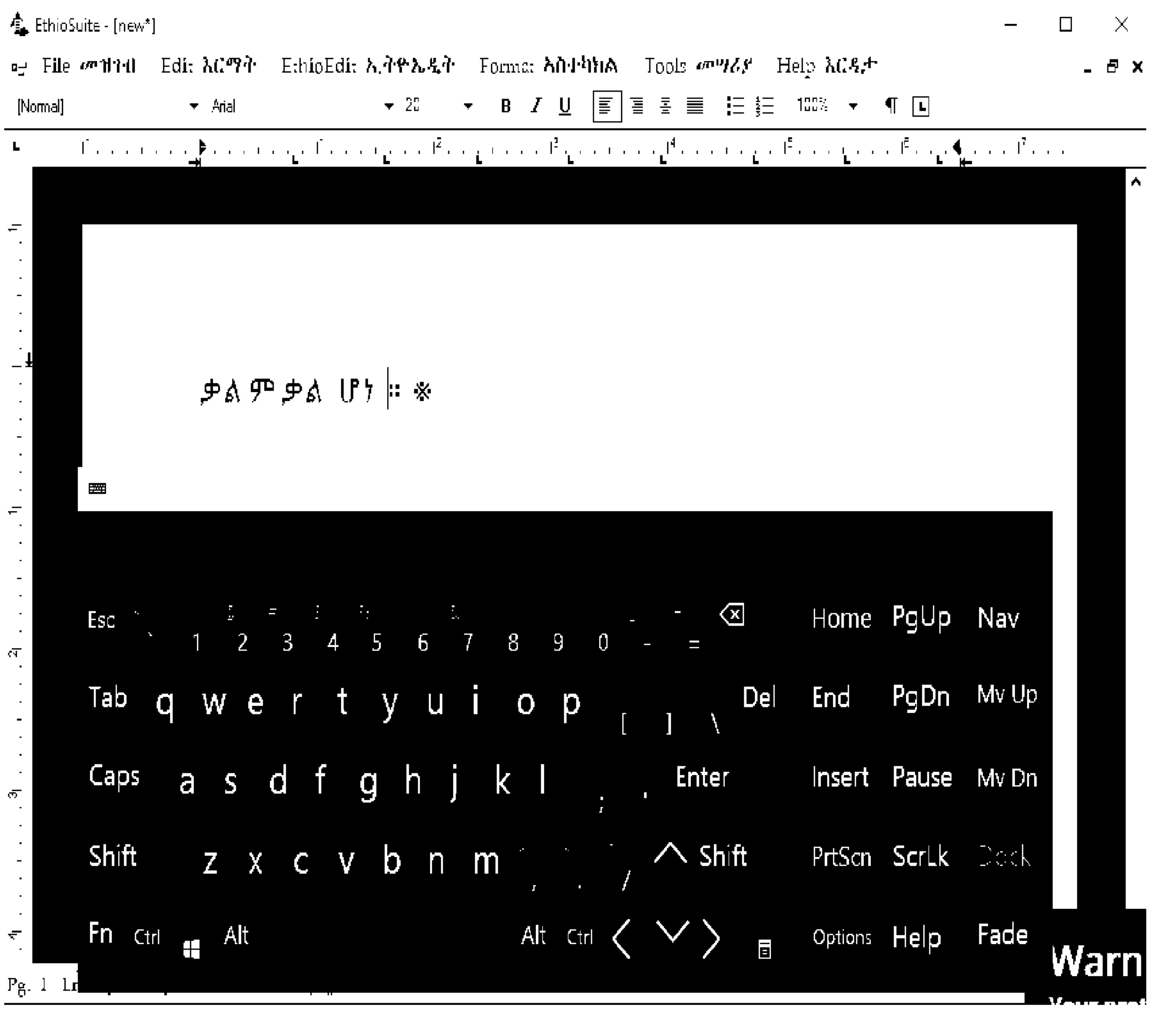
FIG. 69. On-Screen Keyboard in EthioSuite

The current invention allows the typing of the about 500 Ethiopic glyphs with one or two keystrokes each. It is theoretically possible to type a glyph with a keystroke each using most of the available keys including the function keys on the computer. All can be typed with additional second keystrokes. If one is interested in focusing on the keyboard around the "F" and "J" home keys, a third keystroke can be introduced while four or more keystrokes are unnecessary. However, it is possible to balance the spread of hardware computer keyboards by using the keys close to the center while virtual keyboards can utilize similar keyboards for a different reason. These are shown in the first 48 figures. The problem with the computer hardware keys is because they are too far apart while those of smartphones is because they are too close to each other. Switching between landscape and portrait views where possible makes it simple to take advantage of this novel invention and focus on the basic science to enhance it with the wishes of all the potential users of Ethiopic. Even older layouts as shown in FIGS. 69 and 79 can use the current invention also by assigning additional glyphs such as "ኦ" and "ኧ" to the shifted positions of "ኦ", "እ", "ር" and "ው" while the second "/", "+" and "−" keys by the numeric pad can type glyphs different from those assigned to such keys and this is another claim. However, the inventor does not recommend these as reasonable new optional layouts and these have to be agreed upon with consensus.

Assignments of the glyphs to the keys have been described in earlier patents. The important current novelty is the potential of assigning two key combinations while also allowing bidirectional typing in computer hardware and virtual keyboards such as those of smartphones. Each of the following keys −, =, L ctrl, L fn, start, L ctrl, R alt, R fn, R ctrl L Arrow, Down Arrow, Up Arrow, R Arrow, numeric pad numbers and more can also be used bidirectionally with other programmable keys to generate glyphs in excess of what Ethiopic needs. This does not mean the use of three or more keys struck simultaneously or consecutively are excluded.

Typing with the QWERTY keyboard is close to the versions described in previous patents. In one configuration the "ASDF" keys are still assigned to the "አሰዴፈ" orders while "JKL:" was assigned to the "ጀከለሽ" keys. The previous "ጀከለጠ" was changed because the "ጠ" was moved to the shifted "t" position. The claim in the virtual keyboards include 10 keys per row though this can be reduced or increased. An example of the best layout is FIG. 1 for hardware and that of virtual keyboards.

In the past apps such as Keyman, Lexilogos and Hagerigna and similar software show the glyphs on striking a key or two or applying a mouse click while they are actually not settled as described in U.S. Pat. No. 9,000,957 to Molla. The evidence for these is the necessity that striking an "e" key shows an "እ" glyph without settling it. Settling the "እ" requires the addition of a space to render it. Those who encourage this approach have been at it for a long time cheating the Ethiopic users by falsely claiming that a glyph is rendered with a keystroke. Further evidence comes from trying to type "እእ" with two keystrokes as that can't be written because the double strike is supposed to type the vowel form of the fourth order glyph or "ኣ".

Typing the two "እእ" glyphs requires the addition of a space between them requiring a total of six keystrokes. Striking the "e" key forces the appearance of an Ethiopic "እ" glyph that in reality has not been settled. This is because striking another "e" does not type another Ethiopic "እ" glyph and instead brings up a single third character because the combination is for typing a new glyph such as "ኣ". It is possible to type "እ" by first typing the first "እ" with an "e" keystroke and add a space with a space bar to settle it. These two keystrokes are then followed by a backspace key to remove the space with a third keystroke to be followed by the second "እ" with a fourth keystroke. Unfortunately, this is just half the job as only the first "እ" was settled. It takes two more keystrokes, another space bar and backspace, totaling six keystrokes to settle the "እእ". It is also possible to apply the delete key instead of the backspace in these processes to remove the spaces. The current novelty is to eliminate applying spaces, backspaces and delete keys or another process that slow down typing when the typist is supposed to concentrate on typing only. In those case where the vowel is not followed by another vowel, the user is cheated to move on to another glyph after the vowel as if it was typed with a keystroke. Unfortunately, all the glyphs typed these ways were never settled and thus not documented. This is because the first "እ" was not settled whether followed by a vowel or non-vowel glyph. For the same reason the single glyphs rendered with a keystroke each were never settled. Ignorance of this fact by the public has encouraged copycat authors of such methods to undermine Ethiopic. A system to represent Ethiopic with ASCII abbreviated as SERA to represent Ethiopian script with Latin and key entry scheme has remained a disaster since 1994. SERA falsely claims a Latin representation method as a key entry or a typing tool where the defaults are typed with a keystroke. This fiction has been taken for granted by the gullible and has become the typing tool of numerous apps such as Keyman and Amharic Wikipedia. As a result, people have been wasting their times. In the current invented method, the "እ" is rendered and settled with a keystroke with a system different from what has been described in U.S. Pat. No. 10,133,362 and an Ethiopian patent.

In a different typing method by these other troublesome methods, it is possible to type the "እእ" and then go between them with a third step involving the mouse. This can be followed by a space bar fourth keystroke and a backspace or deleted fifth keystroke. A sixth step involves the right arrow to get ahead of the second "እ". Unfortunately, even seeing the "እእ" does not mean both are typed as only the first one was done and the second one is in a limbo. Typing the "እእ" thus requires many keystrokes. Similarly, even seeing an "እእእ" does not mean they were documented unless the numerous steps were involved. Yet the spelling of the "እእእ" is to type a different glyph such as "ዓ" by these other apps. These issues also affect glyphs typed with three or more keystrokes by their methods.

Figure 109:
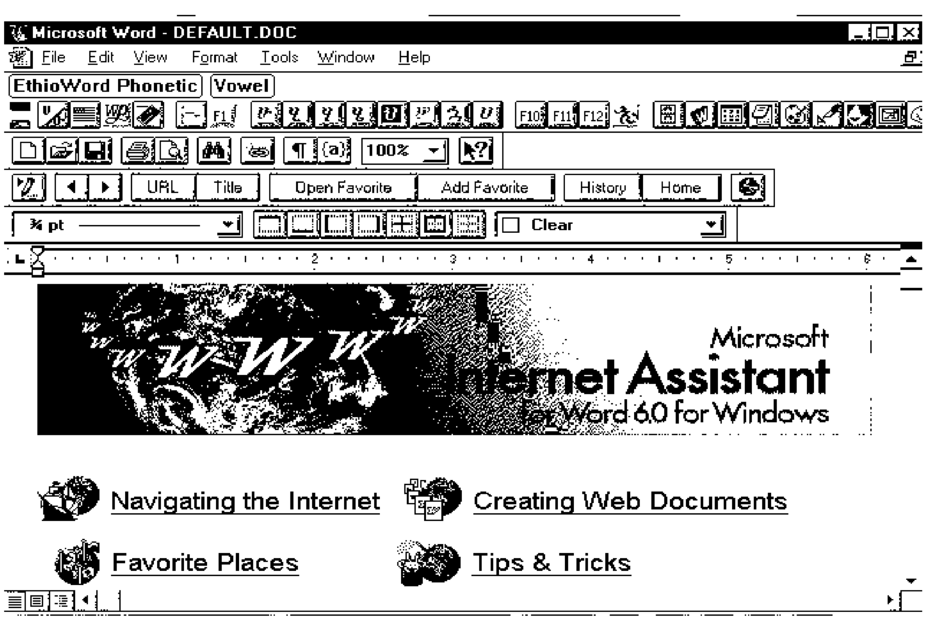
FIG. 109. EthioWord 6.0 for Microsoft Windows, 1993

In reality this error involves glyphs other than the vowels and Ethiopians have been coned to falsely read untyped documents. To make things worse, they are using arrows, backspace and/or delete keys and pretend they are typing Ethiopic like English. It is unfortunate that all these are going on while Molla computerized Ethiopic with two keystrokes each in the eighties (ModEth) and introduced Ethiopic to Windows (EthioWord as in FIG. 109) and recently (GeezEdit) with a default first keystroke and the balance with two keystrokes. Molla computerized Ethiopic with a scientific word processer in 1983 (FIG. 110) that was also used for the fake Amharic typewriter version (FIG. 50) by him.

In English one types an "e" with a keystroke and an "ee" with two keystrokes. One focuses on typing instead of wasting their times for decades.

At Lexilogos "ትዝታ" was supposed to be typed with "tzta" or by mouse clicks. The word can't be typed because the spelling to type "ፀ" is "tz" and the "ትዝ" word can't with "tz". These are not the only Amharic words that can't be typed. This patent application is thus also a wakeup call to end the stupidity that has been around for over a decade. An app that can't even type Amharic is of no use for other Ethiopic-user languages because they have more glyphs.

At Hagerigna, the ModEth system by Molla was brought in as something new for the gullible. Striking a "q" brings up the default "ቅ" followed by an incomplete list of the orders on the accent row. The trick is to accept the "ቅ" as default or switch to its vowel form by selecting one of the vowel varieties with finger tapping. As in the examples above the default glyph was there but never settled. One can switch this unwritten glyph with another one provided a space has not been added. There is no description for a need to apply something to settle it, though some are using selecting another second key to settle it and the method is now claimed because it is described here. Furthermore, scooting through the vowels is a waste of time even for English. The purpose of the keyboard is to type without looking at the keys and there is no need for the user to see the hundreds of the glyphs other than for the purpose of teaching the alphabet to children The Hagerigna hunt, scoot and peck Amharic typing requires too much finger movement and the typist is forced to look for each glyph and slowed down. It also requires the use of keystrokes such as shift keys for a large number of characters especially in virtual keyboarding. The method that started out by copying Latin accent vowel typing has been expanded to cover the whole Ethiopic without typing it and one of the purposes of this patent is to stop the deception. In the Kekros systems incomplete, different and non-documenting methods are presented as the best in spite of patents and continue to be an insult on the intelligence of people. A first keystroke brings up the vowel choices while the second types the choice and claiming the typing of the sixth order with a keystroke is a lie as the sixth order glyph is there on the list to be picked up by a following keystroke or mouse click. The Latin alphabet is not typed with mouse clicks while some Ethiopic users seem to have missed the basics (FIG. 104). Striking the "a" key brings up the various accented "a" choice and one of them is selected and rendered with two keystrokes. One keystroke is to type a non-accented "a" glyph only. Typing an accented "a" takes two keystrokes or steps. The purpose of typing on computers (and smartphones) is to type at a high speed without looking at the keyboard especially on computers. The invention fulfills those needs across different gadgets, operating systems, layouts and keyboards. The methods where the vowels are lined up at the top row of a keyboard is similar to the Ethiopic numeral keyboard of the 80's by the inventor abandoned in favor of the vowel keyboard to eliminate the unnecessary distance between the numeric row and the alphabets below it. Currently these could be presented as floating vowels though this then requires looking at the keyboard and thus not an advantage.

In the Hagerigna keyboard, if after the "ቅ" typing with "q" one adds a space and type another glyph, say "ው" with "w" and then remove the space and select one of the "w" orders, that changes the unwritten "ቅ" to the chosen "ው" variety and the joke continues because none were really typed. The "ቅ" would be changed to "ቄ" for selecting "ቄ" and the process continues. Typing "j" after selecting "ጅ" and then "ጃ" would change the "ቄ" to "ጃ" because that too was never typed. So, what started with an unwritten "ቅ" has gone through untyped "ቄ" and ended up with an undocumented "ጃ" all in the first starting spot. Now newer copycats are picking up the bad habits. An example is at https://translator.abyssinica.com/ where an unsettled sixth order glyph is changed by adding a vowel next to it. One of the novelties of the current invention is to stop fake documentation whether done deliberately or out of ignorance. As described above the novel method does not need introduction of space or mouse clicks or other processes. However, the current claim includes adding a space and then bringing the next curser next to the glyph with finger typing or mouse click to settle a glyph. This is because these other people did not add a space after every glyph and cheated with some only because they did not understand the purpose. Thus, the claim includes any method that corrects these errors for otherwise people would not have woken up to correct them without the current invention. This is also because the purpose of the English keyboard is to type two glyphs next to each other and not to change the first one with another. These principles thus apply to utilization of various computerized systems as long as the default language is not Latin and associated with the default one and two keystrokes of the alphabet. In the previous granted patents to Molla the glyphs were forced to appear and settle within a timeout (9,000,957) or at zero time (10,133,362). With the current invention, which is an improvement, the Unicode glyph is settled with second processes such as adding an invisible second keystroke. This also applies to the use of a third process to settle glyphs rendered with two keystrokes such as those generated with shifted keystrokes. In the current invention this may also apply to glyphs generated by using the command and related keys when utilized to generate a glyph with two or more keystrokes. Without the current invention a glyph associated with the default ASCII cannot be utilized for any other Unicode glyph without something similar to what is claimed.

Unlike Molla's method where timing was introduced as a factor to differentiate the appearance of one or two glyphs as a result of one and two keystrokes, the SERA group resorted to the inventors earlier two keystrokes method while falsely claiming that the default Ethiopic glyphs were typed with a keystroke each. This was further compounded by creating shortage of keys by assigning the Latin symbol keys to Ethiopic symbols. Attempt to rely on English spelling to type Ge'ez was unsuccessful and the newer versions use pluses and hash tags. An abandoned two-keystroke patent application is available at US20130057478A1—Ethiopic computer keyboard The current novel methods are numerous to list as claims and only some examples are shown. A few examples are as follows mainly because many are falsely claiming that a default Ethiopic glyph is typed with a keystroke each. This false narrative can be proven wrong using words such as "ትዕግሥት", "ፊኤል" and "ፊዑል". The novel approach of typing an Ethiopic glyph followed by an independent vowel that has remained a problem is now resolved with this invention. The current invention solved this problem with numerous novel solutions. "T" or "tv" types "ተ" and "Tv" or "vt" or "vT" is for "ጠ" while "Ta" or "at" is for "ጥ". Each typed glyph is settled and thus documented. Clicking on the "t" or typing it with a finger shows and settles the "ት". It is not as in these other systems where one sees the glyph that is undocumented. Striking the "v" key with the curser next to the "ት" removes the "ት" and replace it with a settled "ተ" glyph. This Werkie Ethiopic writing system is similar to typing the 26 English alphabet except that the Ethiopic is documented as in English or Molla's other methods in more efficient novel methods. While the typing looks like English, there is a lot more going on in the background and its look like the Latin is only on the visibilities of the glyphs. This is typing and settling of an Ethiopic glyph with a single keystroke each.

The typing of "ት" and "ጥ" from the "T" key was to limit the number of keys at the expense of more keystrokes and Ethiopic typing required four or more keystrokes. The current invention solves these problems with one and two keystrokes with options and choices with no more than three. Typing of "አ" with just an "a" keystroke and settling it is possible through programming alone by using "a'" in the program than through the keyboard alone.

Another part of a similar claim is that a glyph can be type and settled similarly when the shift key is superimposed to type a glyph or two glyphs are involved in typing one. This claim involves two defaults or the same glyph as well as shifted glyphs. For the sake of a claim even three keystrokes can type and settle an Ethiopic character and the third is often the Shift key. The two keys could also be the commands. To go along with the invention the simplest keyboarding can be allocated to Amharic as in the typing of " ዘ" with "zv" or "Z" while " ዠ " can be typed with "Zv". "zV" could be for " ዧ " and "z2" or "ZU" for "ዡ". The four-keystroke method is not utilized by the Werkie system without abandoning the claim, so "ዡ" can be rendered by "z" and the "Left fn" keys or with one of the command or arrow keys as first or second keystroke. "z" and numeric pad "2" is also a possibility.

Ethiopic documentation has also faced another major and independent hurdle other than the fake ones described above and solved by the inventor now. This also is a programming method to solve real problems. In these other erroneous methods, the vowel keys were often dedicated vowels representing a glyph while also acting as vowel keys requiring toggling without settling them due to the problems described above. There is no need for toggling.

Another problem with SERA and related software is not only involving the vowel keys as described above, but other syllables too. It also involves the non-vowel Ethiopic glyphs typed with one and more keystrokes. One can't have a glyph and also change it (by methods other than those of Molla). It is like having a cake and eating it too. Thus, a standalone glyph generated with one or more keystrokes not modified by a vowel remains undocumented. It is because the " ው" was not settled that it can be changed to a " ዌ" by " ኤ " or the "e" key. An unsettled " ው" can be changed to an unsettled " ዌ" with more than one keystroke. It should be noted that this principle has been described in previous patents by Molla. The point here is to point out that the " ው" was never settled and thus not documented in the SERA system.

A third serious problem involves the need to maintain the default followed by a vowel character. An example is as in the above " ው" to be followed by an "e" or " ኤ " keystroke since the "e" changes the " ው" to " ዌ". To avoid the change the typist has to introduce a space to render and settle the " ው". The need for introduction of a space next to every non-vowel glyph was never fully described and understood. This is because the " ው" that needed a space to be documented alone also needs to be followed by a vowel to be documented. Thus, a glyph that needed a space or a vowel to settle it also needs a space when followed by a non-vowel glyph. Unfortunately, a glyph followed by a non-vowel won't be settled by the second glyph as the second one was never settled. The rendering of an Ethiopic glyph with two keystrokes each was described by the inventor in his patent applications to the US and Ethiopia in the 80's and also here. The rendering of a glyph with one keystroke was described in Molla's patent while Ethiopic users have failed to understand it. They also failed to understand that Molla computerize or digitized Ethiopic by rendering glyphs with two keystroke each. Since Ethiopic can't be rendered without using two keystrokes every Ethiopic user is plagiarizing unless they bought his software. There is thus a need to avoid this quagmire and the inventor solved it in combination with other novel methods differently and this is another claim. In simple terms if a " ው" glyph is followed by another glyph such as " ዶ", both have not been rendered and settled and thus not documented. This also applies to glyphs generated by shifted glyphs such as " ጥ" with "T" and typing " ጥሩ" or " ጥር" does not change the non-documentation of the " ጥ". The current invention settles every glyph.

Another novel method is as follows. When a " ዌ" typed by a "we" is followed by an "e", the " ዌ" is broken down to a " ው" and " ኤ" in this novel invention. This is breaking down the " ዌ" to the glyphs mapped under the "w" and the "e" keys with a third "e" or " ኤ" key. This is also typing of the " ኤ" with "e", "ee" or "E", two other two keystroke novel typing methods. It is also possible to type the " ኤ" with "xe" or " እኤ", a different novel method of typing an " ኤ" from a default keyboard differently. There is thus no need to type a glyph with a space bar. The beauty of this approach is because one also types an " ኤ" with a single "e" keystroke or "xe". The steps are scientific description of Ethiopic documentation while we have the option to select and standardize the simplest, easiest and the best ones. It should be remembered that this principle also applies to methods where a glyph is typed with two keystrokes as in the involvement of the shift or command key and also the need to involve the vowels as third keystrokes. It should be understood that the above description about rendering and settling an Ethiopic glyph with one or more keystrokes is also a new claim because the glyphs were settled and include corrective actions involving non-documented materials.

The use of novel base ten Ethiopic numerals replacing the default Arabic as well as the numeric pad is described. The most common desktop keys are shown in FIG. 72. The inventor has two types of Ethiopic zeros. One was the ASCII type with a crown and a seat. That lost out as the Ethiopic was moved to Unicode because the default was left to the Latin ASCII numerals only. A second zero is a novel one whose seat was removed to differentiate it from the old or previous one (FIGS. 16 to 27, 73, 74). It is presented here due to its utility with the novel keyboarding without abandoning the old one.

Some African languages have tones. A novel example of one of the many is shown on the "tilde" key in FIG. 56. Examples of current ideal layouts are as in FIGS. 1 to 4, 7 and 9. Some of the methods presented here also come from previous granted and pending patent applications incorporated here. In spite of published materials and patents by Molla, many have continued to promote typing methods that do not type Ethiopic. This patent application is to stop the nonsense that started with the lack of a patent system in Ethiopia and hopefully now put these fake legends and stories to rest once and for all times. This is because Ethiopians and the rest of the world can't afford the backward movement of Ethiopic, primarily because of the ignorance of virtually all its users over the last 34 years. This invention is different from the use of the ASCII system as in ModEth and EthioWord. It is a solution to problems associated with creation of the Unicode system that allowed the dedication of the keyboard to the Latin ASCII and extended ASCII. The issue thus involves the alphabets of the world and the novelty is a panacea for all. Switching to Ethiopic ASCII or Unicode through programing and starting out with default Ethiopic is not default typing as it makes English a two-keystroke method or requires additional steps in the background as described at the Ethiopic keyboard. One proof for the inventor's theory come from the fact that both the regular number keys and those of the numeric pad use the same font while the Ethiopic ones require more. A solution is to use the foreign language as an operating system font, though that then requires the English to use the Werkie writing system. Even Ethiopic glyphs such as the eighth form of "U", "0" and "θ" as wells as "Ç", "©", etc. will follow the patterns in tables 1 and 2.

Another novelty is typing glyphs such as "ጠ" series with "lt" or "t1", "ቸ" with "t" and "ጥ" with "T" or "t1" making this approach another one and two keystroke "Senait" system. In this layout the numbers as well the minus and equals keys are dead on first keystroke. This is because the numbers are typed with the numbers as second keystrokes preceded by keys such as "tab". This avoids the use of three keystrokes. To avoid interference all the features may not have to be utilized at the same time. It should be noted that unsuccessful attempts to hold back Ethiopic even includes deleting references to patents. Other than the obvious, the 14 command keys as well as the ones by the numeric keypad can be programmed to type with the "/", "*" and "–" by the numeric keypad and thus with the more than 74 computer keyboard keys (FIG. 57, 85, 98) or virtual keys. These alone, with straight and second keys as well as reversed second keys are more than enough to type Ethiopic with one and two keystrokes only. Thus, "ctrl key left", "alt key left", "alt key right", "ctrl key right", "up arrow", "left arrow", "right arrow", "down arrow", "win key left", "win key right", "tab key", numberpad keys "0", "1", "2", "3", "4", "5", "6", "7", "8", "9", "/" "*", "–", "+", and "." 25 keys can be used. These 47 keys alone and with shift in forward direction alone can renders 47×2×25=2,850 glyphs. Expansion of the combinations to three and more keystrokes even without including the function keys is huge. Varieties of known methods such as long hold and timeout expand the choices. This patent is thus to show that thousands of characters can be typed from the current keyboards without the need for more than three keystrokes. These approaches can be tried for other Unicode glyphs.

Figure 4:
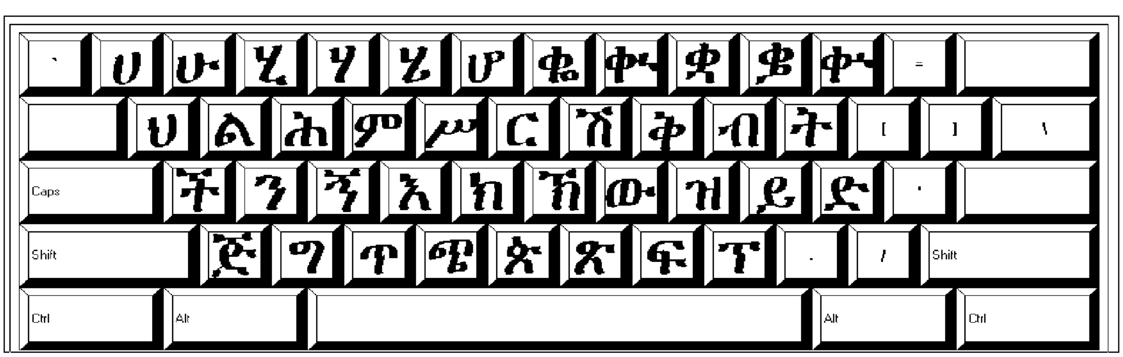
FIG. 4. Ten-Key Amharic Hele Layout
Figure 5:
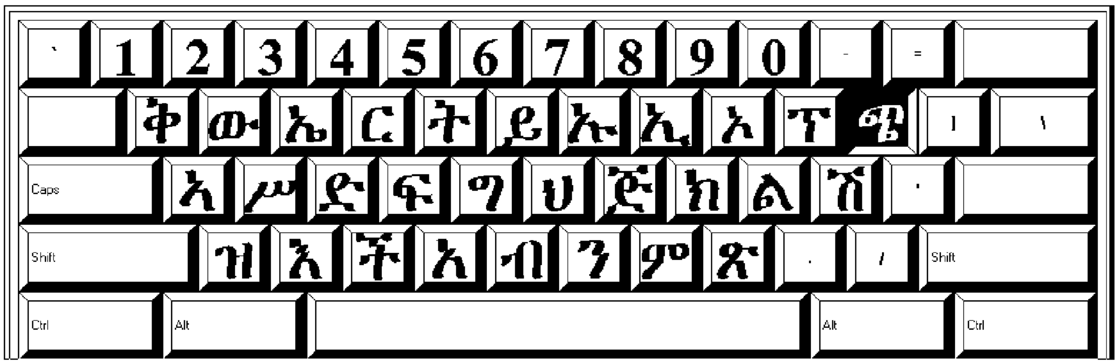
FIG. 5. The "[" key can be moved optionally next to the space bar in smartphones FIG. 6. The "-" key can be moved optionally next to the space bar in smartphones FIG. 7. The "qwa" key on "8" Page 9 of 56
Figure 6:
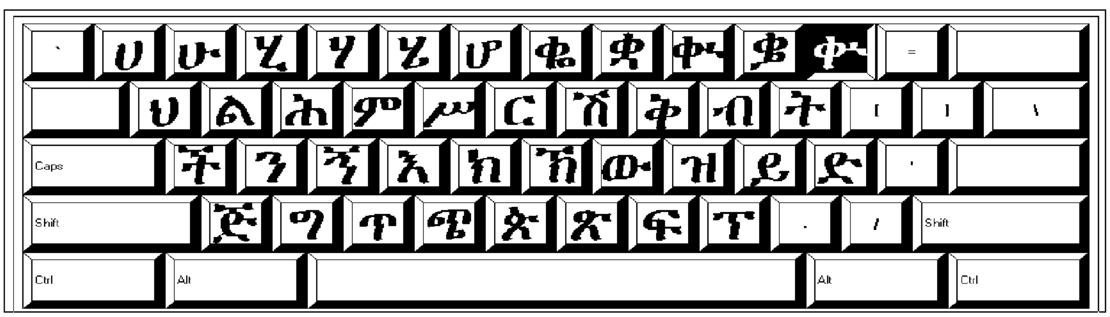
Figure 7:
Figure 8:
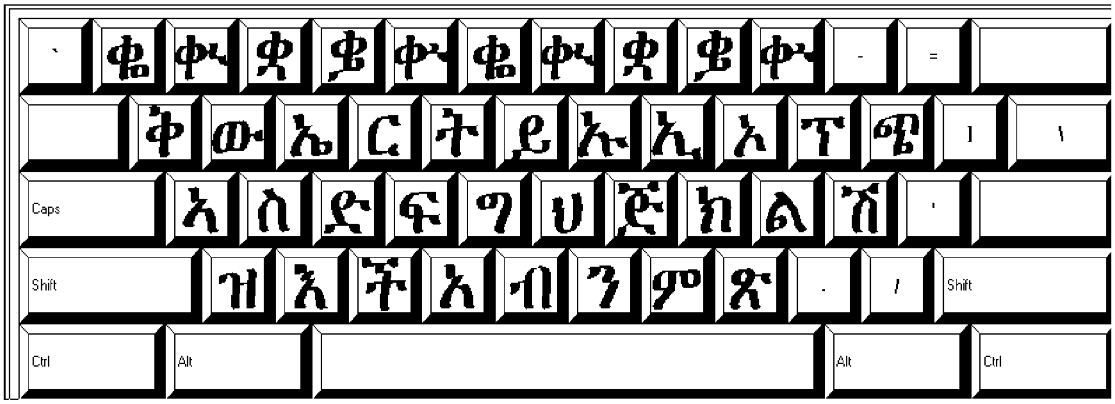
FIG. 8. The five numbers could be used for the "qwe" series.
Figure 14:
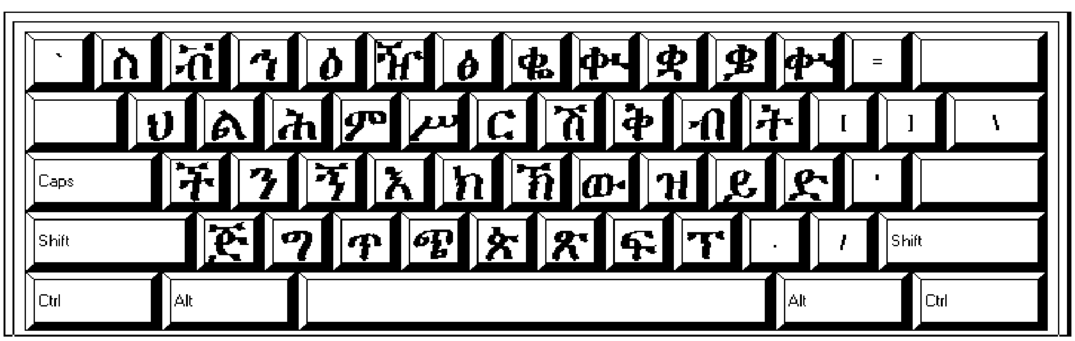
FIG. 14. Default 10-key Hele Amharic
Figure 15:
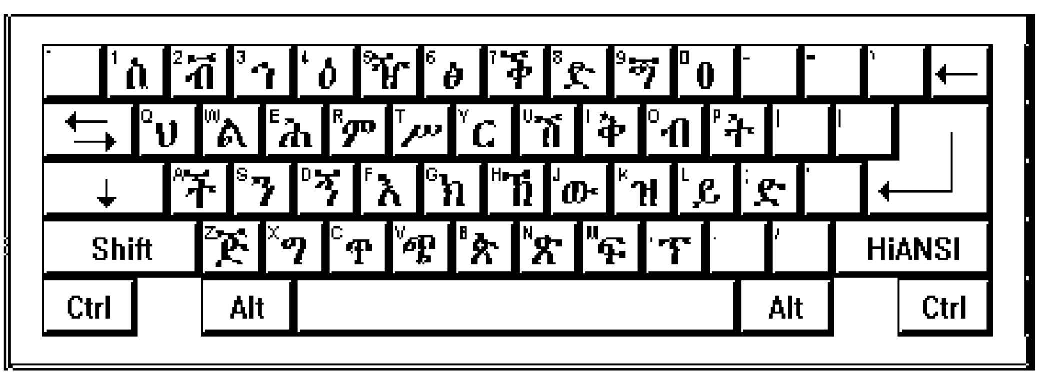
Figure 35:
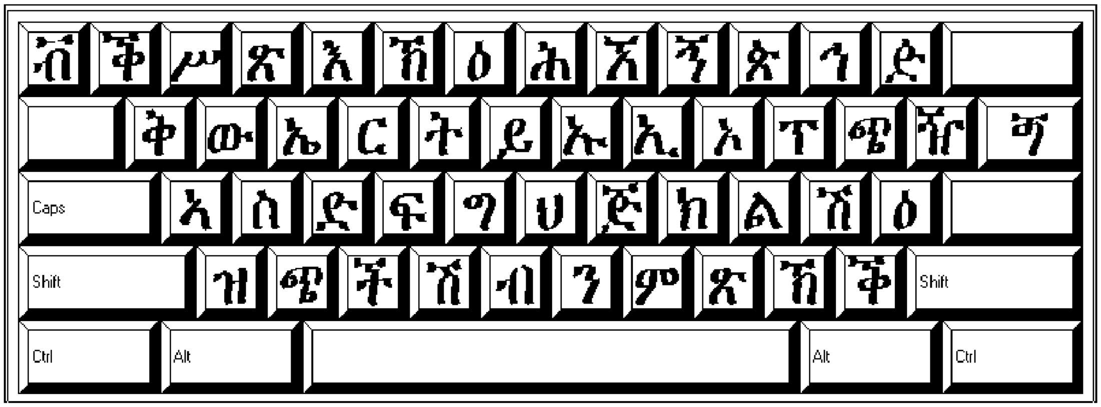
FIG. 35. Another Ethiopic layout
Figure 36:
FIG. 36. Laptop, on-screen, etc. layout
Figure 37:
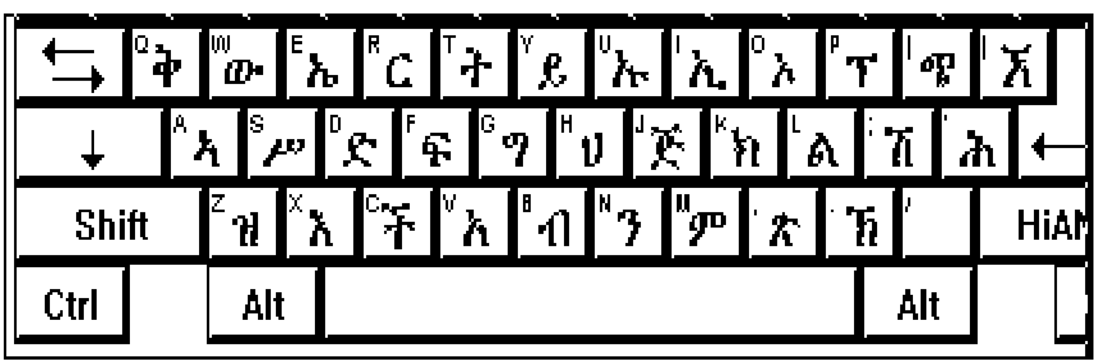
FIG. 37. Standard Amharic
Figure 38:
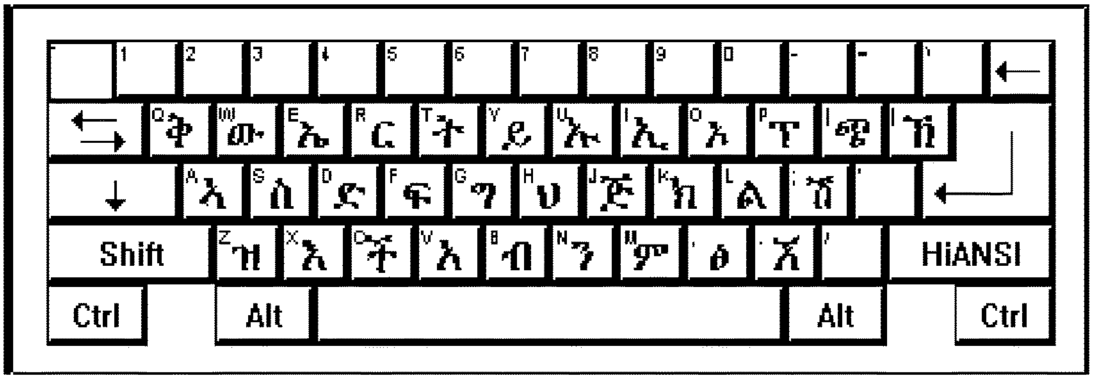
FIG. 38. Amharic Optional
Figure 39:
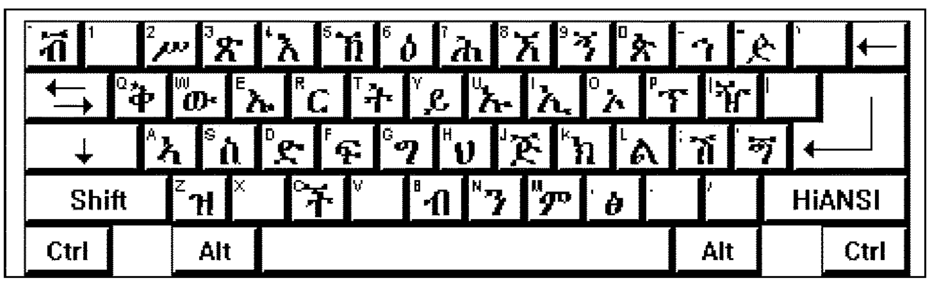
FIG. 39. Glyphs under numbers including the one on 4
Figure 40:
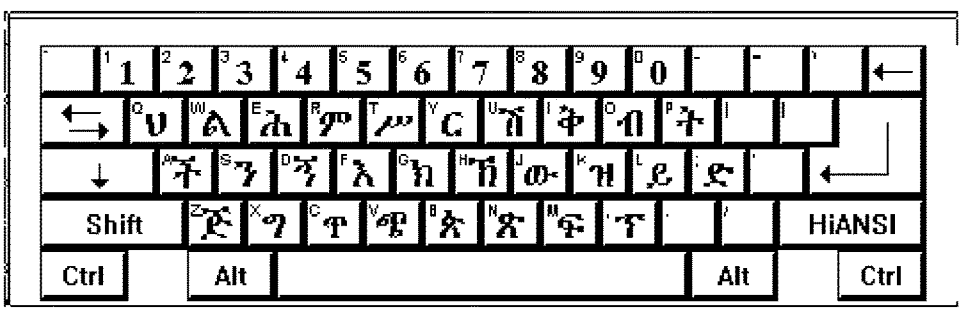
FIG. 40. Numbers and glyphs there are typed with two-keystrokes each
Figure 41:
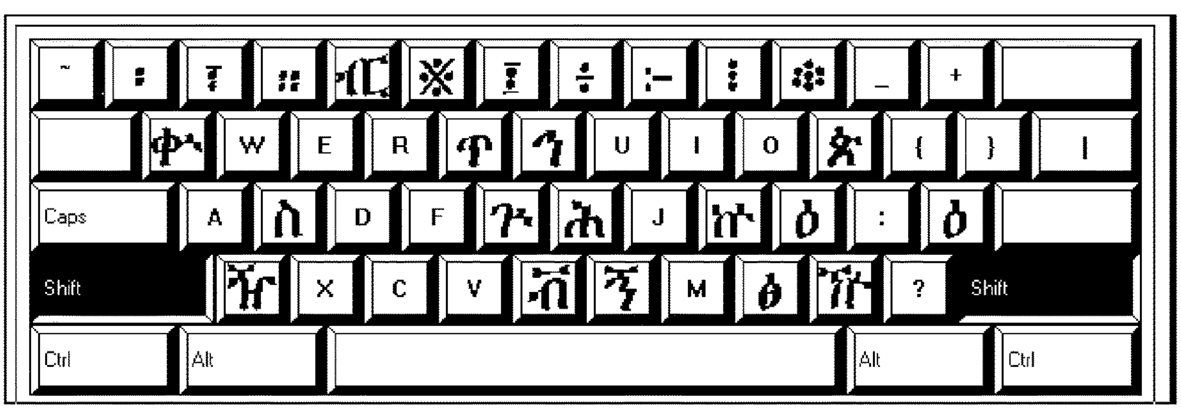
FIG. 41. Standard Amharic Shifted or Second Layout
Figure 42:
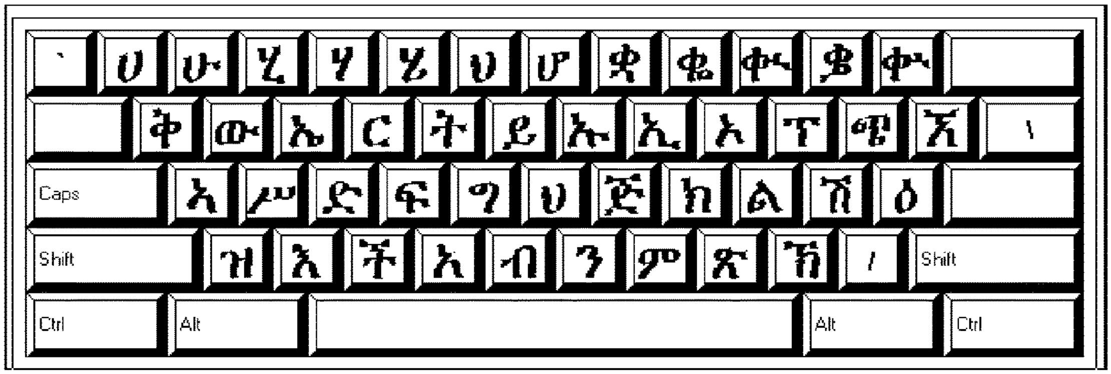
FIG. 42. Another Example Amharic Keyboard Layout
Figure 43:
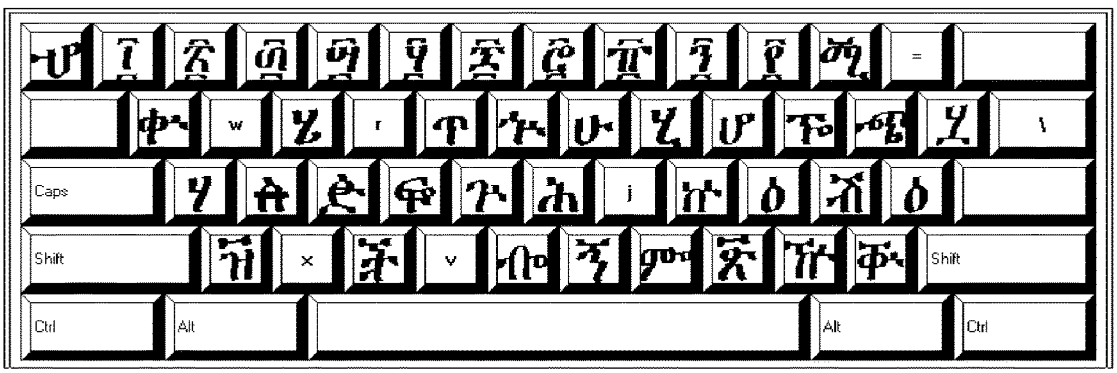
FIG. 43. Ethiopic Third Layout
Figure 44:
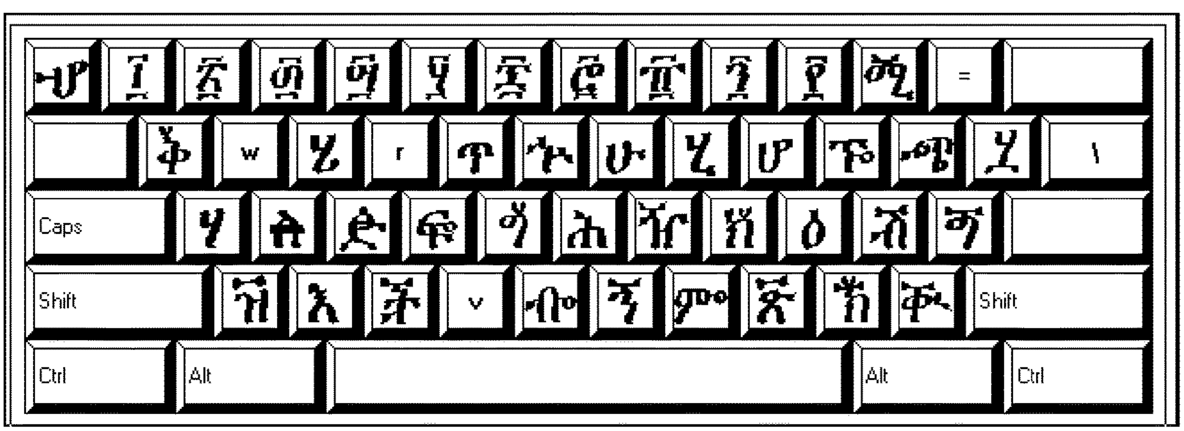
FIG. 44. Ethiopic Guragie
Figure 45:
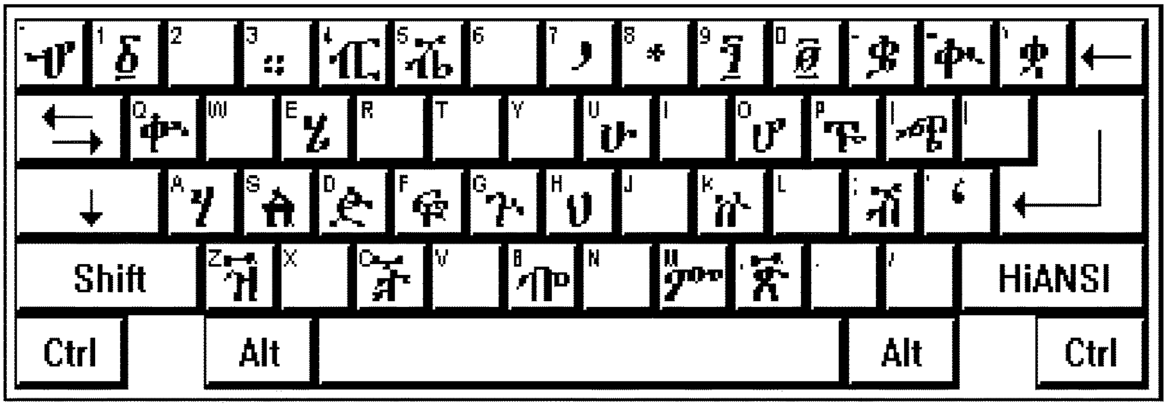
FIG. 45. Standard Ethiopic typing examples showing generated varieties
Figure 46:
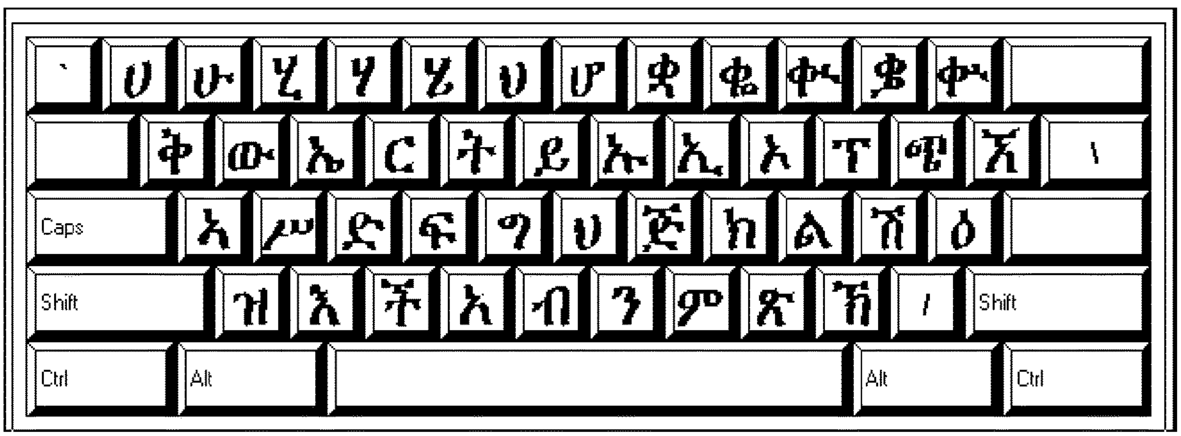
FIG. 46. Vowels in Amharic and English
Figure 47:
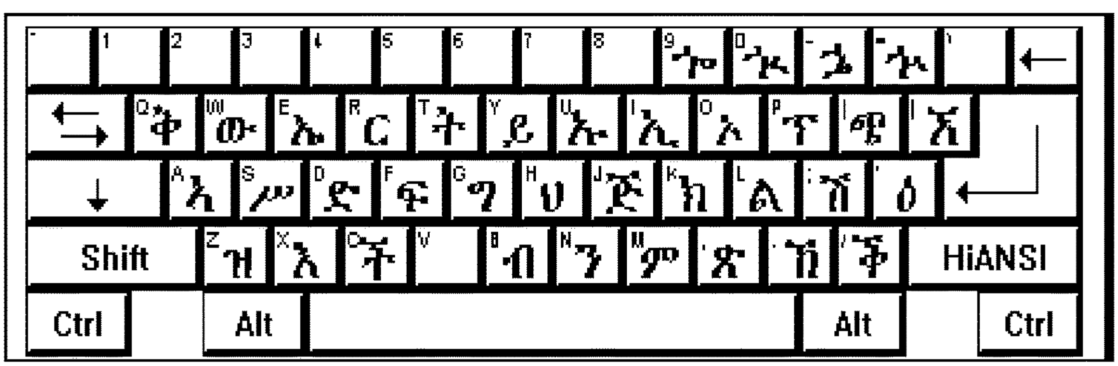
FIG. 47. Standard Tigrigna
Figure 48:
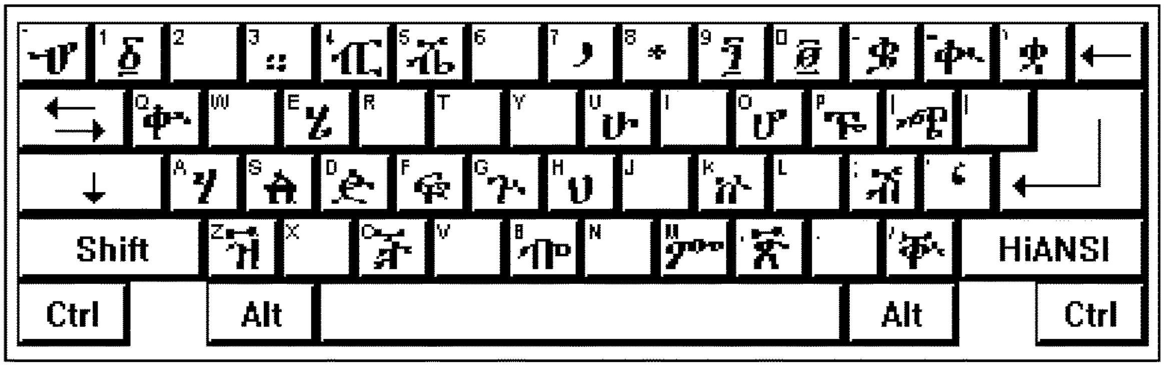
FIG. 48. Some glyphs typed from the shifted positions or two keystrokes
Figure 58:
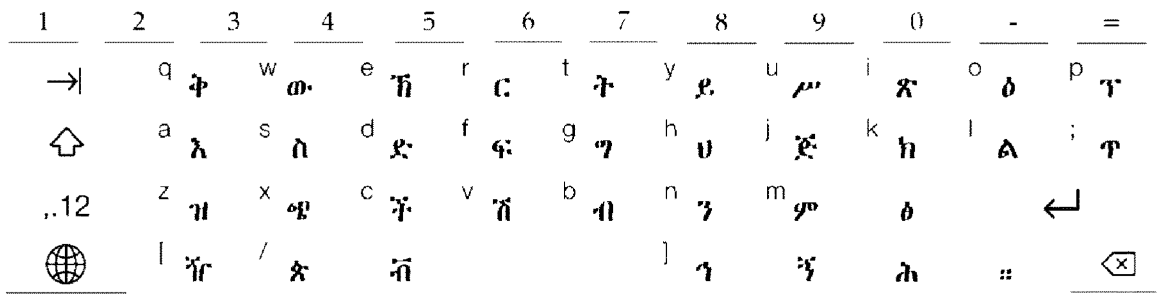
FIG. 58. Smartphone Amharic
Figure 61:
FIG. 61. Color Coded Language Glyphs with Novel Ones by Molla
Figure 68:
FIG. 68. More than ten Ethiopic glyphs can be accommodated in a row

There is thus no need to type any Ethiopic glyph with three keystrokes other than for the reason that many are used to the shift keys and that is an advantage. On the other hand, typing the Ethiopic with many keystrokes for the sake of spelling out each Ethiopic glyph in English as in SERA's SIL is not a good idea because Geez typing should have nothing to do with spelling as spelling is alien to Ethiopic. Both GeezEdit and EthioSuite work with on-screen keyboards (FIGS. 69 and 79) and spread of the keys on computers is thus not a problem in various layouts and touch screens. Similarly, the small width of smartphones can handle less than ten keys per row (FIG. 27) at the expense of columns. Even portrait and landscape formats of cell phones with 11 keys per row were satisfactory and can be improved (FIGS. 28 to 34) and can even accommodate more than a dozen glyphs per row (FIG. 58, 59, 62). The number of keys per row was not the same for the Amharic as well as the English (FIGS. 62 and 68). The concept should be to create what Ethiopic needs and not adjust the Geez to fit the machines or Latin alphabet. This is also because typing the about 100 English glyphs is less challenging when compared to typing the more than 500 Ethiopic glyphs (FIG. 61). It is obvious that there are varieties of typing options and the best can be selected. For instance, key name or first order typing is with "1" as in typing "U" with "q1" in the Hele layout (FIG. 14). "Shift e" types "ጎ" while "I" ("Shift i") types "ቐ" (FIG. 15). "X1" types "ጘ" (FIG. 22) and "x ctrl" or "ctrl x" types "ኀ". "k1" types "ዘ", "K1" types "ዠ", "k ctrl" types "ዡ" while "K fn" types "ዥ". The "ጬጭጮ" varieties can also be moved to the "ጠ" or the "C" key and typed as in "ዘዠዡዥ" series with "ዘ" as default. They can be typed from the "V" or "ጬ" key. Reverse typing adds more choices though they may not even be necessary. In the past the combination of "ctrl alt" keystrokes allowed switching between Ethiopic and English in apps from Ethiopian Computers & Software, Co. and now such combinations can also be utilized for typing. In the Qwerty keyboard key name or first order typing is with "v" as in typing "ቀ" with "qv" (FIG. 37). "Shift t" types "ጥ" while "Tv" ("Shift tv") types "ጠ". "gv" types "ገ" and "Gv" types "ጘ". "g ctrl" types "ኀ". An alternative is "g1" or "G1". Similarly, "z" types "ዘ", "zv" types "ዘ" and "Z" types "ዠ". "ዡ" is typed with "z ctrl" or "z1" while "ዥ" is typed with "Z fn" or "Z2". Typing of "ዥ" with "fn z" or "2z" is not recommended because of interference of the "fn" or "2" with the typing of the preceding default, though this can be broken down with apostrophe. Note that "ቈ" can also be typed with "qWe" and to type one glyph with four keystrokes is not recommended. "ጉ" is typed with "g-" and "ጙ" is typed with "G-" and generalizations are the same in both (FIGS. 4 and 36). "ቈ" can be put on the numbers on qwerty as "ቈቊቋቌቍ" by assigning them to "12345" and/or "67890" (FIG. 8). The shift could open or present another glyph that can then be modified there with the vowels. However, shifted shift is not recommended as it adds unnecessary keystrokes. This invention thus helps even the Latin alphabet. There are numerous novel ideas in this application and not listing them does not mean exclusion. "x tab" could also types "ኧ" and interference has to be avoided. In the virtual environment extended characters can be used to expand the keys and the command methods utilized on them.

Comparing the two layouts, probably the best is the Qwerty as it can combine the numeric typing for third and fourth tier minority language-user glyphs. Defaults and their shifted forms could use the regular vowels as the order varieties are four. The command keys as vowels or consonants are available for optional use here. The Hele rely on the numbers forcing the command keys on the user. Relying on virtual mix is not a good idea.

Another is introduction of a space after a default or shifted glyph at the end of a word. This is claimed because the current method by others does not describe it and the problem has persisted. The addition of a space as new claim in Molla's methods to settle the glyphs is new. If one were to go to Amharic Wikipedia and write "ውድ" and then type a "u" each next to the "ው" and "ድ", the word is changed to a different new word, "ዉዱ" because both the glyphs were never typed and settled. The typing and settling of an Ethiopic glyph with or without the need for introduction of a space is a new claim. In the Wiki example the space was already there after the "ድ" or "ጥጥ". It is a pity that some morons running Wikipedia were deleting documents about the inventor without realizing the problems with the SERA they were not documenting.

Figure 67:
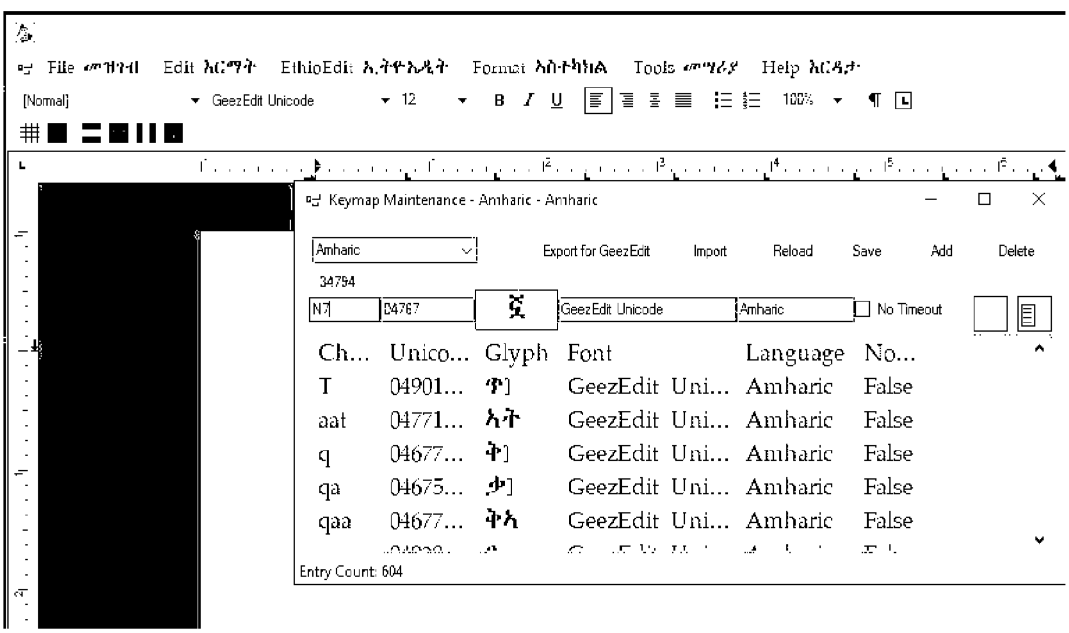
FIG. 67. Another Keymap maintenance

The typing is controlled through a keymap maintenance editable map accessed through one of the "Tools" menus and an example is shown in FIG. 67, 80, 81, 86. This feature is not going to be shown in the commercial versions of the apps and shown here for the purpose of the patents. FIG. 104 is to show that the default is not typed with a keystroke by others such as *Abyssinica* Amharic app as this typing is what was claimed in Molla's recent patent. In the iOS app striking the "ቅ" key brings up eight of the 12 Amharic vowel form so that one of them would be picked by a second tapping.

Numerous figures were presented for the sake of giving a choice for standardization. The programming of more than 15 command keys has allowed progressive expansion of the keyboard. Even the "/", "*" and "–" second glyphs by the numeric keypad can be separately programmed. The purpose is to allow an Amharic typist with one and two keystrokes or clicks with the least movement of the fingers. Keys not used by the language revert to English and the inventor prefers the QWERTY keyboard. African languages will have their own menus. The numeric keypad requires clearing the numlock to type the Ethiopic numerals and also perform other activities.

In previous keyboards the English vowel keys were used for Ethiopic glyphs and vowels. This unique invention by the same inventor in the 80's is close to vowel and consonant uses of the English alphabet, though the vowels do not show up in the case of Ethiopic. In the current method, the keys there and those utilized as vowels were optionally moved to the number row and elsewhere while the vowels were dedicated to the Ethiopic "አ" series. In the GeezEdit keyboard for computers and smartphones (FIGS. 28 to 34, 35, 56, 58, 59, 64, 65, 66, 72 to 75, 79 and more), the Ethiopic vowels were switched to by the vowels, numbers and/or symbols. The current claimed novel keyboarding include these old and new Qwerty, Hele and other layouts and documentation methods. Some of the methods and figures have been presented in PCT and other applications such as "Extended Ethiopic Typing" and include FIGS. 36, 40, 49, 50, 51, 55, 58, 65, 69, 72, 85, 91 and 93.

The method whereby the previous keyboard where the vowels are also used for glyphs is incorporated other than adding them to the numeric row and use them as dedicated keys. For instance, "2u", "uu", "us", "Su" and "uS" can type "ሡ". "u2" and "xu2" type "ኡ/ሥ" while "'u" or "2" also type "ሥ". Varieties eliminate confusion by picking the best as "S", "vs" and "Sv" type "ሠ". "t2", "T2" or "t fn" as well as "fn t" can also types "ጠ".

The assignment of the keys can be moved around to facilitate typing as Molla assigned the "v" key to another alphabet and empty spaces such as "J" can be used by unrelated Ethiopic glyphs. It should be remembered that even the so-called SERA is fake as the principle of representing Ethiopic with ASCII did not work.

In a virtual environment an 11 key row can be switched to a 12 key row in landscape mode as shown in FIG. 68. Note that "q1", "1q" or "qq1" can type "ቀ", ቈ or "ቐ".

Figure 77:
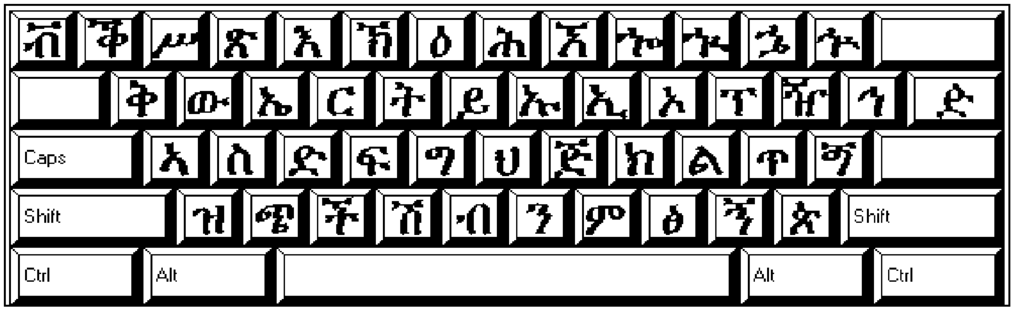
FIG. 77. Ethiopic default keys
Figure 78:
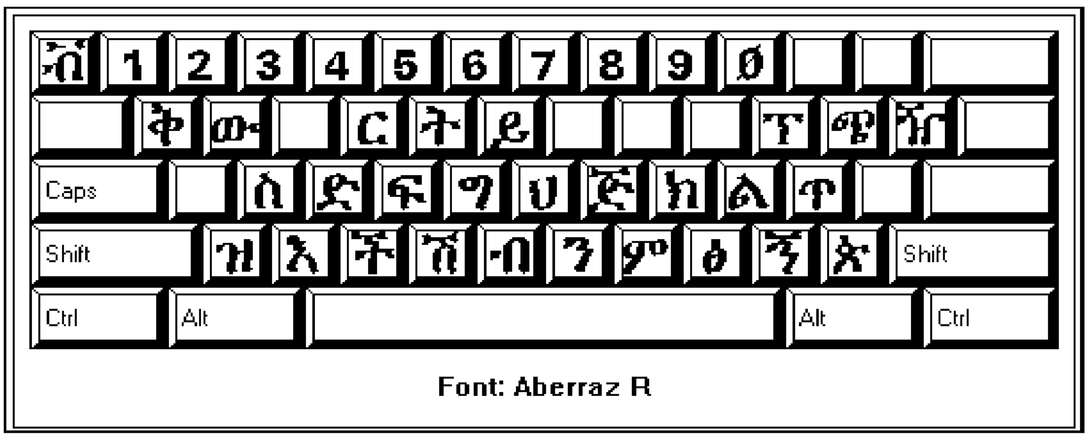
FIG. 78. First order is typed with shift or tab
Figure 92:
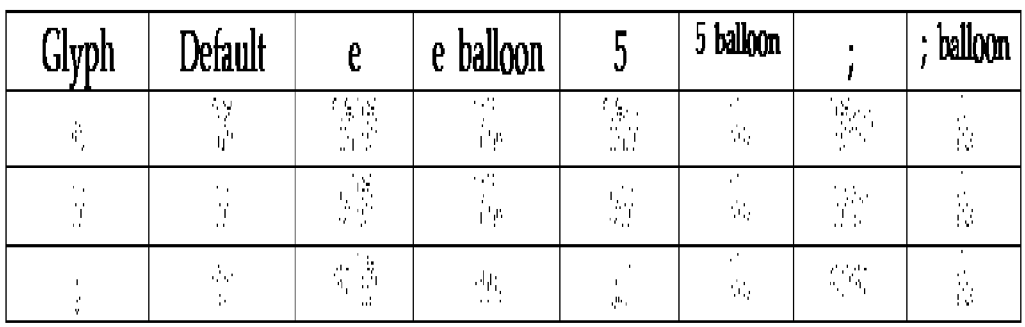
FIG. 92. Example callouts or balloons on "e", "5" and ";"
Figures 111, 112:
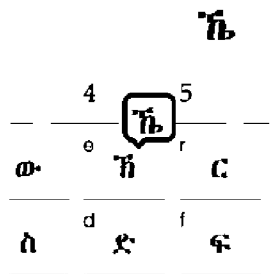
FIG. 111. Callouts or balloons examples from previous application
FIG. 112. An example typing table

The Ethiopic need for more vowels was shown in FIG. 74 from previous applications and patent. This includes representation of "a" key as an individual key while another "a" was assigned to "ኧ". FIG. 77 also shows that the keys that were sharing the vowel keys as in "a" for "ኧ" and "ኣ" were given their own spots such that "ኧ" is typed with "4" and ኣ as well as with "4 tab" as novel. Even command keys such as "tab" that doubled or tripled the "shift" function is now dedicated and its function expanded to novel uses. This method includes expansion of these features to render glyphs as first or second keystrokes with potentially every usable key of the 101-key keyboard. Numerous methods of rendering and settling has been described in the past and they can be incorporated in the novel system. These include the use of Unicode Ethiopic into the eight vowel forms as well as balloons and callouts in the various layouts including Latin characters to type themselves or Amharic. With balloons and callouts striking the "e" key as in FIG. 92 brings up "ኸ" on the key and also "ኾ" on "5" or "6" and "ኸ" on the apostrophe key alone or with their vowel forms. More than one glyph can also appear depending on the need where "ኼ" balloons or callouts appears on the "e" and/or "5" keys (FIG. 111). This is on striking or tapping on the "e" key. The novel method could even incorporate the typing font such as the "EA" from EthioWord utilizing the Unicode versions of the order typeface. The current invention also takes advantage of methods created earlier to document Ethiopic. For instance, it includes the incorporation of callouts and balloons shown in FIG. 92. Balloons and callouts can bring up all the 32 glyphs of the 5 "g" orders or "ገጐጘጙጘ" series show up at the same time to be picked up with a keystroke, click or tapping as second keystrokes with or without settling the default. The layouts described in this application are examples and not limiting. The characters assignments have been moved around in the past and an Amharic typewriter layout, AZERTY, Hele, Ebugida or stacking up glyphs and the like should not be considered novel by others.

Figure 97:
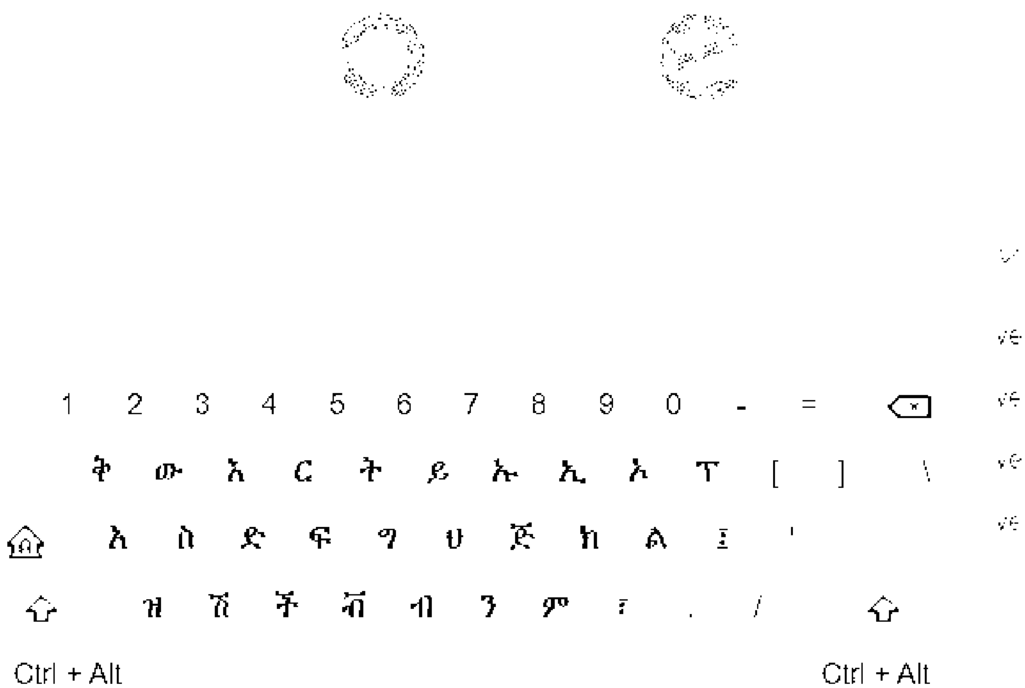
FIG. 97. The novel method can even be used on older layouts

At Google Ethiopic typing with a mouse include addition of spaces to search (FIG. 97). With GeezEdit the Ethiopic is typed in numerous apps just like English and there is no need to use spaces and mouse clicks to type while they are not excluded from the current claims. Typing a glyph with drop-down menus to select glyphs and typing with mouse clicks to select them as in FIG. 97 method is a horrible idea in the computer age. The invention eliminates such hassles. This is because GeezEdit allowed the typing of Ethiopic in numerous apps including Google Chrome. Also, GeezEdit is an independent app with its own screen (FIG. 68) and features such as "Remove Keyboard" was introduced.

Another novelty is the use of more than one typing methods to render and settle Ethiopic glyphs. Example "ሣ" can be typed with "2a", "As", etc. This is thus a combination of the Qwerty and Hele methods in a layout to avoid spread of the keys or inconvenient finger movements such as the use of the command keys. The "caps lock" can be used as any regular key.

Another novel method is correction of past errors by converting the Unicode documents to the correct current methods. One thing that has to be remembered is that the layouts are examples and not limiting. For instance, the "90-=\ and '" keys can be assigned to "ኟቖጎዷዃ and ኻ" respectively adding options. Meen sets can be typed with the command keys. Another novel method is the use of "a tab" to type "ኧኧ" as an example. This eliminates the problem of rendering only "ኣ" from "aa" typing. This is because the unfulfilled documentation of typing "ኣ" or "ኧ" with one keystroke has remained false statements by others. Typing "ኧኧ" with "a tab" is another one keystroke method per glyph. Similarly, "shift t tab" renders "ጥጥ" eliminating a fourth keystroke. All the features may not have to be utilized at the same time. Another novelty and claim are follow-up of what have been described in previous patent application as shown in FIG. 74 where the vowel keys such as the "A" key were dedicated and independent while adding another "A" key. The "A" key typing of "a" can be moved to any key including command keys such as "ctrl" or any regular key. This is to assign a key to Ethiopic glyphs or vowels by re-mapping. Example "ctrl", "Arrow key" or numeric pad "0" render Ethiopic glyphs alone or in combination with other keys as first or second keystrokes or simultaneously as in the usage of "shift keys". Even without using the Function keys, there are over 17 keys other than the regular 60 that can be remapped to render and settle solitary glyphs with single keystrokes. The "tab" key can be utilized as a "shift key" to free up the regular two "shift" keys. The extra "a" key can be assigned to the "x", "v" or any regular or virtual key. In the past the inventor used the "v" key for glyphs other than the Ethiopic "v" or "ቨ" because it was alien while the "x" key that has been suggested as an Ethiopic "a" key was not disclosed and dedicated to an optional key until now with the novel invention. This invention is also to stop plagiarists from undermining Ethiopic by reading patents and incorporate ideas in incomplete methods.

The principles for computers also apply to on-screen and external keyboards, laptops, abbreviated and non-abbreviated smartphones keyboards and similar gadgets. Smartphones require keys in excess of the 11 per row as well as more than 5 columns and some default keys allow switching to a keyboard that revert to the default after second keystrokes. Some of these have been mentioned in previous applications by the inventor. It is also possible to reduce the number of keys per row instead of relying on landscape for fat fingers.

As shown in FIGS. 1-21, a keyboard with 10 keys as well as its shifted and other positions can accommodate Ethiopic with one and two keystrokes only within a few keystrokes from the F and J keys. For instance, "ጣእ" can be typed with "Taa" while "Ta" types "ጠ". Another claim is about the utilization of this invention for other Unicode glyphs on the world. In the DOS era Ethiopic was sharing the keyboard with English, the default was occupied by ASCII and Molla required two keystrokes to type each glyph. This was because the Ethiopic was sharing the ASCII code with Latin by replacing it. The first keystroke was to move the font out of the default Latin font associated with the keyboard while the second was to pick the glyph. With Unicode the Ethiopic still needed a keystroke to move into the font and a second to render the glyph.

As shown in in the first few keyboard figures glyphs with varying shifted and command key positions can accommodate Ethiopic typing with one and two keystrokes from around the F and J home keys in various layouts. The vowel forms assigned to the vowels, numbers, command keys and the numeric pad are more than sufficient for Geez. Three or more keystrokes are not necessary and claimed not to allow inefficiency by others as something new. For instance, some glyphs by others are typed with shift key and toggling though the vowels require picking them with three or more keystrokes. These features can be added similarly in abbreviated and non-abbreviated virtual and on-screen keyboards. In another instance the "Q" key is assigned to "ቅ" or "ሀ" keys while the one key can also be replaced by "ቕ" or "ሀ" series. For the sake of those who insist on typing some Geez series with two keystrokes, "ኝ" can be typed with "N" in the Qwerty and with "S" in Hele layout (FIG. 15) and this is another part of the claim. (There is no need to type "ኝ" with "N6".) The displaced minus key can stand alone for "ጉ" and also accommodate the "ጕ" as the character set is increased.

In one of the methods the rendered glyphs are settled through the space key. Since a key is assigned to one and changed by the following vowel provided the typeface is default, the novel methods include the use of breaking up the Ethiopic into orders an in ModEth and apply these to Unicode Ethiopic. Long hold such as on "t" can generate "ጡ" in QWERTY or generate "ገ" on the "ሕ" key in the Heleheme keyboard. Timeout and disable keys can be incorporated. In the standalone novel method typing the "4" again as in after typing "ሃ" with "h4" reverts it to "ሀ" and "4" (with "h44") in the Heleheme just like the "wee" typing to get "ውኤ" out of "ዌ" in the qwerty typing. In the Heleheme method the default is rendered and settled with a keystroke and there is thus no need to strike the number six or any other key to settle it. Neither striking another key nor just skipping the process is novel and settling it at the end of the word or the glyph with a space or any other process is claimed. The number 6 key can thus be assigned to other keys or other functions such as seventh order "ሆ" vowel. The "ቋ" can be moved to "7" position or left on the "8" key.

The virtual keyboards are modifications of the GeezEdit Amharic apps for iPhone and android smartphones covered by previous patents. In the virtual version that includes on-screen keyboard as well as those in GeezEdit and EthioSuite, different layouts are switched from the default with "shift", "፩፪፫" key, "tab" "kd4" (keyboard number 4) and other command keys. The keyboard reverts to the default after rendering the glyph in those cases where typing of a glyph only is needed. If the key is to open another keyboard order, switching is after selecting the vowel form with an additional keystroke. Thus a "shift" key could open a keyboard to type "ጡ" from the settled "t" key with a keystroke. Vowel forms such as "ጠ" are then typed with "a" or "4" depending on the layout. The "፩፪፫" key is mainly to render the numeric varieties of the Ethiopic including the new Ethiopic numbers created by the inventor. The "kd4" button opens up a fourth keyboard for symbols such as Ethiopic copyright or Yared's symbols and quotation marks depending on need in different layouts. The keyboard reverts to the default after rendering and settling the glyph with a keystroke. Something novel over the English system is where a keystroke opens the "kb4" screen so that the required glyph including English is rendered with two keystrokes instead of the current four for Latin. In English glyphs such as "#" are typed from the "#+=" keyboard after arriving there with a prior "123" button for other symbols. The claimed novel method thus cuts the keystrokes for English by half.

Another claim is the completed and scientific version of the non-documenting type keyboarding that is close to the numeric keyboard and balloon methods similar to the Hele layout. Since the method is just another attempt without documentation, its complete version where the ordered glyphs may show up or not with spell checker as well as autocorrect is claimed. This is because these fake works have continued to hurt science and Ethiopic. As shown in FIG. 104 striking "I" key brings up the "ቀቁቂቃቄቅቆቋ" keys with the "ቅ" key separately displayed prominently while the "ቈቊቌቍ" are missing. Since the purpose of striking the "I" key is to bring up the choices, typing of the "ቅ" requires another finger touch to type it and the method is thus a two keystroke one. Similarly, any one of the other seven glyphs require a second touch. The current invention avoids incomplete typing with two finger strokes or similar rendering. One other disadvantage of such typing is because the typist has to focus on the list and move around to pick one slowing down the typing. With the current novel method, touching the "I" key settles it with a finger stroke or keystroke and one of the rest complete "ቀቁቂቃቄቆቋቈቊቌቍ" 11 glyphs is settled with a second touch. Because of the possibility of showing the complete varieties and typing them with one or two finger strokes, this is a novel claim. The lack of settlement with two steps have already been described for Hagerigna. Figures such as 22 and 23 show the defaults on number 6 and that does not mean that they have to be involved to render them.

Last, but not least, it should be noted that the descriptions are examples and not limiting. Clicking on a kb4 key in the smartphone variety opens up another keyboard that can revert to the default after one or two finger strokes there. This kb4 can also generate the Meen glyphs with two keystrokes as in "kbd4 a" to type "ኣ". The patent application is for the whole Ethiopic character set with about 500 Ethiopic Unicode glyphs. The idea is to start out with Amharic and expand to other Ethiopic-user languages though Geez language uses less characters. Thus, presenting Amharic as a stand-alone application is discouraged. A system that is dedicated to Amharic, which is about half of the Ethiopic set is also covered in the patent protection. As in GeezEdit that has been around since 1994, the Amharic must be presented such that it is not interfered with by other Ethiopic character sets while the Amharic itself should also not interfere with others as shown in this application. This is because Ethiopians have continued to tolerate even those without an app when they claimed computerizing Ethiopic Without making anything that works in Ethiopic. Similarly, there are many who claim they type Amharic without showing a simple complete Amharic set. Some of these then extend their fiction to Ethiopic because nobody seems to understand what is going on. To make things worse it is only the cheat and the copycats who read the patents and what the inventor describes and turn around and use it to cheat the gullible and ignorant.

The figures are representatives and best examples of Heleheme and QWERTY layouts are shown while the actual final versions may not look the same as in the figures. The major idea is to approximate the Heleheme and QWERTY layouts of virtual and computer keyboards. More character sets are expanded from the Amharic. The best representatives are in the first figures. Between the use of the number rows for vowels, programmed command keys, long-hold, modified patented time outs and smaller computer keys the methods provide many more Ethiopic keys. The virtual can be accommodated on a ten key per row with four or five rows and four keyboards switched to from a keystroke each as even 11 keys per row can accommodate the Geez especially in landscape format for fat fingers. The current GeezEdit Amharic type keyboard can even be improved by giving the grayed command keys the same sizes as the character keys where applicable.

There is thus no need to access symbols from a third keyboard even for English. Ten keys per row is equally good. The best options are thus to reduce the sizes of keys on computers while increasing those of smartphones for various layouts though virtual keyboards are flexible. It is possible to type all Ethiopic glyphs with no more than two keystrokes each and thus there is no need for more. For instance, the "ፘ", "ፙ", and "ፚ" series can be typed from the "L", "J" and "R" default keys followed by the "left ctrl" and their second orders typed by the "left fn" and so forth for the orders. The reverse typing is available but can be avoided to simplify typing. There is also no need to alter the Ethiopic to fit the gadgets made for Latin especially with virtual keyboards and the current methods are not substitutes for all previous methods by the inventor. Typing the "ፘ" from the "L" is at the expense of using three keystrokes. Typing Ethiopic with numbers and showing every glyph is primitive and not preferred by the inventor, though claimed in the novelty. The numeric pad by default type Ethiopic numerals while the number keys render the alphabetic Ethiopic numerals optionally. Numbers followed by those of pad also type alphabet numerals and the point here is to show the extensive potentials of the methods.

Ethiopic speech recognition is probably the best because of the phonetic nature of the alphabet and its addition could alleviate the problems associated with keyboards. Using a top row to switch between orders may look simple in the Hele or QWERTY smartphone keyboard while it is cumbersome in computer keyboards as it is the old numeric ModEth keyboard. The Ethiopic QWERTY has advantages here as the keys can be pushed to the home keys in both. These problems are not acute in the on-screen keyboards in variety of keyboards and they are thus the best. On-screen keyboards can still handle the Ethiopic distributed on the 37 keys and are incorporated in the current claims.

In a nutshell the current inventions include the following major solutions that Ethiopic has faced over the years. This mainly is because people were misled not to use the patented methods and were wasting their time with undocumented Ethiopic. This has continued to hurt the users ever since the computerized Ethiopic was made public in 1987. The typing and settling of an Ethiopic glyph with one or two keystrokes each are essential pre-requites. Some have gone as far as removing references to Ethiopic patents from Wikipedia to keep people in the dark. Tolerating such nonsense and lies has hurt Ethiopic and one has to ensure documentation before moving to Ethiopic spell checkers, translation and the like. It is surprising that intellectuals do not understand the difference between the typewriter and Ethiopic glyphs or apps such as Lexilogos are tolerated in spite of not typing words such as "ትዝታ" in Amharic and Tigrigna. EthioSuite is a dedicated publisher with novel features particularly for Ethiopic. The previous menu for regular and short versions of character set layouts has been replaced with "Hele" instead of "Short" language menu so that the user chooses one or even use both Qwerty and Hele layouts in a document. This application covers lots of materials and it may be necessary to break it up to many because of the large number of novelties.

Embodiments of the present disclosure contemplate and provide:

1. If a non-vowel Ethiopic glyph is typed with a keystroke or a similar step like a mouse click of a "w" to type "ው", that character is unsettled unless the patented methods by Molla is used. If it is settled by any other method, it is because a space on a second step is used and that is covered by the previous or current invention. The reason why others were using a space or a related process was unknown to them and this is thus a new claim. The default is settled on typing with a keystroke because another keystroke is superimposed to settle it in the current novel without showing it on the screen. This also applies to methods where more than one keystroke is used to settle a glyph as in the typing of "ጥ" with "shift t" and this is a new claim involving more than one keystroke. In the inventor's methods a settled "ው" is altered to a settled "ዌ" by the "e" and this is a new claim. The claim includes the settling of an unsettled or settled "ው" to a "ዌ".
2. If the typing of the "ው" is followed by a vowel such as "e", the character is changed to "ዌ" as the second keystroke is to change the first to the second. The typing of the "ው" followed by an "e" could result in a "ዌ" and the patented methods by Molla are used. If it is settled by any other method, it is because a space on a second step is used and that is covered by the previous or current invention. This applies to methods where more than one keystroke is used to settle a glyph as in the typing of "ጤ" with "shift te". In the inventor's methods a settled "ጥ" is altered to a settled "ጤ" by the "e" and this is a new claim. The claim includes the settling of an unsettled or settled "ጥ" to a "ጤ".

Figure 54:
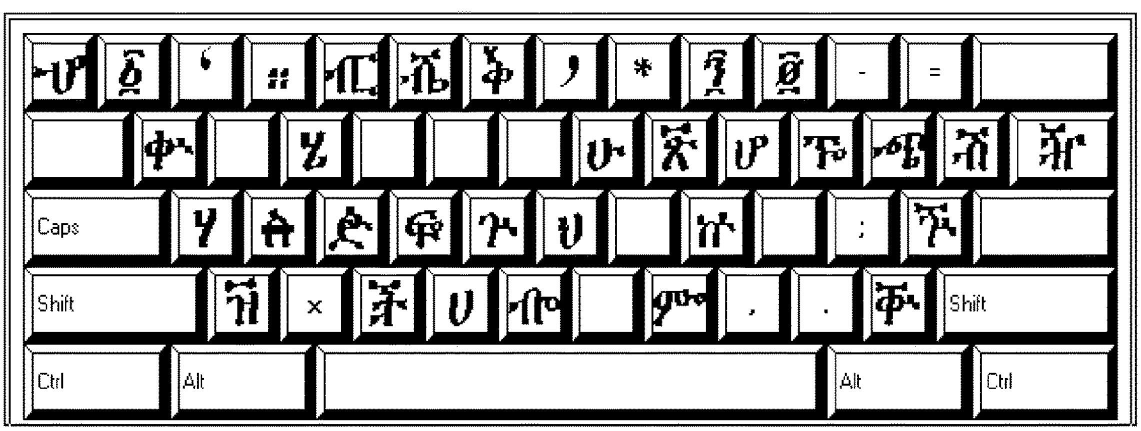
FIG. 54. Another Ethiopic with Agew/Bilen
Figure 55:
FIG. 55. Hele Oromo and Tigrigna

3. If a "ው" is followed by an "e" and the characters mapped to the "w" and the "e" show up independently, then one of the methods patented by Molla or the current invention is used without purpose. This is because a "ው" typed and settled can't be changed to a "ዌ" because an "e" is typed next to it. If the "e" was mapped to generate an "ኤ", the typing of a "w" followed by an "e" can't generate a "ዌ" and also generate a "ው" and an "ኤ" unless the previous and current methods by the inventor are used. This also applies to a glyph generated with two keystrokes as in "ጥ".
4. A "ዌ" generated from a "ው" and an "ኤ" can be broken down to a "ው" and an "ኤ" with a third keystroke or similar process by a third action. An example is an "e" typed as a third keystroke to generate them from the "ዌ". This is another novel claim. This is also a one and two keystroke reversal and efficient and a similar process like a mouse click shouldn't be considered different. The "ee" can generate an "ኤ". The method also applies to glyphs generated with more than one keystrokes as in "ጥ" and "ጤ". The method of breaking down a "ዌ" to a "ው" and "ኤ" with as in "wee" typing also applies to the vowels mapped under shift such as "E". The shifted version is claimed, but discouraged as it adds unnecessary keystrokes.
5. A vowel key such as "e" that acts as an Ethiopic vowel except by the methods created by Molla or a similar process may be programed to type "ኤ". The "e" acts as a vowel if preceded by another glyph. This may also apply to "ee" in the current invention. A character followed by a vowel is changed to its other Ethiopic vowel form not only because it is the second keystroke, but also because the first one was never settled by these other copycat methods. The reason why a vowel is changed by another vowel to a different glyph is because the previous vowel was also settled previously and in the current novel invention. In some fake Ethiopic methods repeated keystrokes of an "e" key generate different vowel forms of the "አ" orders. If the default was an "ኧ", second and third keystrokes of the vowels may generate glyphs such as "አ", "ኤ" and even "ዓ" without being documented. It is also possible to add dead key features depending on need in the current invention. The current invention eliminates these problems as each vowel also has its own key. In the SERA method "ae" types "ኧ" and thus typing the Ethiopic glyphs mapped to the vowels require introduction and removal of a space to type the ones mapped under the "a" and "e" keys.
6. While Molla concentrated on giving a key to an Ethiopic order just like the Latin system some tried to rely on a method known as SERA, a system for Ethiopic representation in ASCII. The system now uses incompatible methods and symbols like the equal sign to spell out glyphs as if they were words. They write the solitary Ethiopic period "::" with two colons messing up the Ethiopic and at sites like Amharic Wikipedia some characters are in limbo while some are not. Typing a vowel next to some glyphs changes the word while some do not. An example is "ት" and "ታ". The current method eliminates these problems since each glyph whether in the middle of a word or at the end is documented. In the above link typing an "a" next to the four glyphs in "ጠቅላይ" changes it to "ጠአቃላአያ" with no logic for the arbitrary alteration. The current invention eliminates these issues because every glyph is documented at the time of typing and there is no need to cheat the user. Some also do not have good intensions as glyph such as "ቈ" and "ቜ" can't be typed with a mouse at the Wiki site.
7. Because of the power of the current invention, it is now possible to type an Ethiopic glyph bidirectionally. While "ta", "tA" or even "Ta" type "ታ", "aT" or even "At" can type "ጣ". Timeout increases the number of glyphs that can be generated though this is not necessary. There is thus no need to use more than three keystrokes such as "TA" and "AT" to type any Ethiopic glyph as two keystrokes are sufficient. To avoid confusion, it is better to add a third keystroke with shift (" ጣ" with "Ta" or "At".) However, there is no need for four or more keystrokes to render and settle an Ethiopic glyph.
8. Ethiopic computerization was based on the QWERTY keyboard and introduction of different layouts including "ሀለሐመ" types are unacceptable plagiarists. Ethiopic key names and descriptive names such as " አጥፋ" for "delete" key can be introduced for those who need them. There are issues that were not raised for the sake of brevity. For instance, the "apostrophe key" is utilized as a settling key and also to type other glyphs such as in FIGS. 30, 35, 36, 37, 41 and 45 and Agew/Bilen series as in FIGS. 39 and 54. The backslash key is an option.
9. The Ethiopic numerals can be typed from the numbers, the numeric pad or the alphabet keys. The claim in the virtual keyboards include 10 keys per row.
10. In the "ሀለሐመ" type keyboard the same principles can be applied where the numbers and the command keys and their reversals can handle four varieties. FIG. 18. Reliance on the number keys, the shifted positions and the command keys makes this keyboarding cumbersome, though an example of a modification is at FIG. 54. The "ሀሕ" key can be combined on the "Q" key and the keys concentrated to the left side to avoid the right spread of the QWERTY keyboard by keeping the "F" and "J" home keys for Latin and Ethiopic writing systems. These can be changed if necessary. However, the inventor does not like this keyboard as it is presented as something new when it is not and the QWERTY has been established with purpose for over thirty years.
11. It is also possible to add dead key features depending on need in the current invention. For instance, double striking an "እ" renders only one "እ" while it can be programmed to type "ቍ" on striking "q" as a third keystroke. This innovation adds more power to the vowel keys.
12. It is often suggested that the keyboard layout should consider the frequency of the characters. Many are trying to base their studies on files on the internet without thinking that unreliable writing tools and incomplete character sets were behind these documents on computers. These have been put into consideration ever since ModEth was released and improvised over the years. The "EA" typing font had the sixth order glyphs in the default position while the shift was given to the first order glyphs. These were first and second in frequency respectively consisting of more than 50% in Amharic. The "u", "i", "a", "e" and "o" five order forms were assigned to the "ሁ", "ሂ", "ሃ", "ሄ" and "ሆ" vowels and the keys also doubled as alphabets just as in the Latin system. Similarly, the "ቌ", "ቍ", "ቋ", "ቊ" and "ቈ" were assigned to the numbers or symbols "/", "[", ".", ",", ";" and "]" respectively. The eighth form with the least number of glyphs was assigned to the "\". It is possible to assign glyphs such as "ዠጵኚጽ" to the "90-=" keys.

13. In the current invention an "s" typing results in a settled "ስ". "sa" types "ሰ" and "sxa" type ስአ without the need to settle the "ስ" with the apostrophe key or involvement of the timeout. The "ስ" can also be settled with a single keystroke because a second settling glyph is incorporated in the programing to settle it without the keystroke (or processes such as mouse clicks). Keystrokes from Apostrophe typing and the like keystroke do not show up on the screen and this is a breakthrough novel claim.

14. The above principles work with various layouts and "ት" is typed with "t" only while "ጥ" is typed with "T" only and there is no need to use the "6" key or any keystroke to render or settle them and that key is instead assigned for the seventh order. Similarly, and in the other layout the "z" types and settles "ዝ" and the "Z" types "ዥ" without second or third keystrokes respectively. In virtual abbreviated keyboard a "T" keystroke may open up another keyboard where the vowel forms are typed and settled with the vowel choices or balloons. Varieties such as the "ዠ" and "ዟ" may be presented in the third and/or fourth keyboards without necessarily being on the "z" key or as balloons even from the default keyboard. These features could appear with or without the individual glyphs or highlighting showing up.

15. The current invention is a panacea for problems Ethiopic computerization has gone though over the years and the variety of novelties are too many to pack in a patent and it may need breaking it up and refining in the future. It is worth nothing that the vowel keyboard was preferred over the numeric during the Mod-Eth era and it was abandoned because typing with numbers required too much finger movement and thus cumbersome for computers. The layout was effectively used in a patented system in smartphones by the inventor and the current approach is different. The Command keys could be used separately or in combination though "ctrl alt" was to switch to and from Ethiopic to Latin keyboard in the past and that can be changed now.

16. Typing a glyph followed by a number (3) is not interfering with the 3 followed by a tab because the 3 has been settled through programming. Typing the ጽ followed by a tab is to render the ጸ. If the ጽ has to be settled, the apostrophe has to be used optionally as it can also be typed from the comma key with a keystroke from the comma or shift comma too. The 3 followed by another 3 keystroke renders a settled 3 followed by a settled ጽ. Striking the 3 renders ጽ.. "3" followed by a tab render "3" only because of programming and thus settling the 3. It is possible to unsettle the 3 after tab not to settle and give back the tab function of the tab because it was default especially on double striking it. This was deliberately disabled not to confuse the user. The programmed disabling of the tab and the use of the tab to settle the 3 that proceed it is another proof of programmed settling of the 3. Without this feature the used would have been more confused as the tab would have introduced a tab especially if it is typed before or after typing the 3 and this is another claim. This applies to other command keys too (and with combinations).

In some embodiments, methods are provided such as a method whereby an Ethiopic glyph is rendered and settled with a keystroke and altered to another key such that:

a. One keystroke render and settle a glyph (ው) while two keystrokes may render two of the same glyphs. (ውው)
b. One keystroke render and settle a glyph assigned as vowel (እ on e) while two keystrokes on the same vowel may or may not render the second glyph. The appearance of only one vowel glyph from two keystrokes is recommended to avoid interference and thus nothing happens on second keystroke.
c. A non-vowel glyph rendered and settled with a keystroke (ው) can change to its vowel form if a key assigned to be a vowel (ኤ) is struck as a second keystroke, then a third glyph is rendered and settled. (ዌ)
d. A glyph rendered and settled with a keystroke (ው) when changed to its vowel form (ዌ) with a second key assigned to be a vowel (ኤ) and the third glyph is rendered and settled (ዌ). Striking the same vowel (ኤ) as a third glyph renders and settles the first glyph (ዌ) and also renders and settles the vowel assigned to the second keystroke (ኤ) as ውኤ. This is a one and two-keystroke system. If a fourth glyph that is the same vowel (ኤ) is struck, a third glyph ውኤኤ is rendered and settled.? A third vowel (ውኤኤኤ) typed as fourth glyph may render only ውኤኤ and a fourth glyph may not appear because of programming.
e. A glyph rendered and settled with a keystroke, changed to its vowel form with a second key assigned to be a vowel and the third glyph is rendered and settled as (ዌ), an እ can be typed next to it with an ኧኤ as to render and settle ዌኤ with another two keystrokes. This is a twokeystroke system. It is possible to avoid steps d and e of typing "ዌኤ" with "wee" since they can also be typed with "wexe".
f. Striking the "3" key may render a "ጽ". One keystroke render and settle a glyph while two keystrokes may render a glyph without showing the first one. An example is "1 tab" rendering and settling "1". This is a novel two-keystroke system. (The numbers could substitute glyphs previously assigned to the vowels as in "ጽ" on "I".
g. Striking a "shifted 1" or "!" key renders and settles an Ethiopic space symbol ":" as described in earlier patents and now incorporated as a novel one; and/or
h. A glyph is rendered and settled with key sequences and programing that also include keystrokes that do not show up on the screen. This eliminates the use of two or more keystrokes as the key sequence programming allows settlement with an accompanying glyph that does not show up on the screen. An example is replacing the apostrophe with 129 code or other disabled extended ASCII or Unicode glyph. In one method a character is rendered with one or more keystrokes such that the glyph is settled with a second activity involving programming of the sequences. In a second method the activities are performed in the reverse direction with the same end result. In a third method a glyph rendered with two or more keystrokes is actually settled because of programmed inclusion of another code that does not show up, but settles the glyph generated by the two keystrokes including the shifted one. This can also be broken down to two or its components with a third keystroke. The process continues with more keystrokes.

In further embodiments, methods are provided whereby an Ethiopic glyph is rendered and settled with two keystrokes and altered to another key such that:

a. Two keystrokes render and settle a glyph "ጥ" from "T" while four keystrokes render two of the same glyphs. (ጥጥ)
b. A non-vowel glyph (ጥ) rendered and settled with two keystrokes can change to its vowel form if a key assigned to be a vowel ("e" or "ኤ") is struck as a third keystroke, then a second glyph is rendered and settled as "ጤ".
c. A glyph rendered and settled with three keystrokes, changed to its vowel form with a third key assigned to be a vowel and the third glyph is rendered and settled (ጤ), striking the same vowel (ኤ) as a fourth glyph renders and settles the first glyph (ጤ) and also renders and settles the vowel assigned to the third keystroke (ኤ) as ጥኤ. This is a one and three-keystroke system.
d. A glyph rendered and settled with three keystrokes, changed to its vowel form with a third key assigned to be a vowel and the third glyph is rendered and settled (ጤ), striking the same vowel (ኤ) as a fourth glyph renders and settles the first glyph (ጤ) and also renders and settles the vowel assigned to the second keystroke (ኤ) as ጥኤ.. This is a one and three-keystroke system. If a fourth keystroke that is the same vowel (ኤ) is struck, a third glyph ጥኤኤ is rendered and settled. A fourth vowel (ጥኤኤኤ) glyph typed as fifth keystroke renders only ጥኤኤ and a fourth glyph may not appear due to programming. This is a two and third keystrokes system. It is possible to continue with this pattern if necessary, so that more glyphs would show up. This is a three-keystroke system. It is possible to avoid changing the steps of typing "ጤ" to "ጥኤ" with "Tee" since they can also be typed with "Texe". It is possible to disable "Tee" typing of breaking down the "ጤ" to "ጥኤ" and type it with "Tee".
e. Two keystrokes can also render glyphs such as (ዔ) with "shift e". This is needed to differentiate the Ge'ez glyphs Ethiopic needs. This patent application is also to protect the rendering and settling of any Ethiopic and other Unicode glyphs with two keystrokes each in this novel system. The two keystrokes are as in use with shift, command keys and any key including double strike. To describe it with an example a glyph such as "ጥ" rendered with "shift t" or "T" has also not been settled just like the "ተ" rendered with "t" requiring settlement at zero time or the addition of a non-printable glyph described here. Glyphs rendered with two or more keystrokes are also rendered and settled with non-printable glyphs just like the single keystroke varieties. 3. A method whereby a key particularly command keys such as tabs, alts, ctrls, fns, arrows, alt opts, the numeric pads, glyphs next to it and the like on computers or other gadgets such as smartphones are programmed so that one or more glyphs are generated in many ways such that one keystroke render a glyph while the rest of the Ethiopic characters are rendered and typed with a maximum of two keystrokes. (This method is expansion of typing all the Ethiopic characters with a maximum of two keystrokes. An example keyboard is QWERTY. The use of these methods with "Hele" replacement of the qwerty keyboard is included.)

a. Striking the "tab" key renders no glyph.
b. Striking a "1" key renders and settles a different glyph mapped to the key ("ቕ").
c. Striking a "tab" key followed by the "1" key renders "1" and settle it. (A default glyph "1" on second keystroke is rendered, when "1" is struck after the "tab" key.)
d. Striking the "1" key followed by a "tab" key render and settles "ቁ" glyph. (A different programmed glyph "ቕ" is rendered as a first keystroke without involving the "tab" key when assigned to the "1" key or any other key such as "/" as in FIG. 9.)
e. Striking the "tab" key followed by "q" can renders and settles the "፩" glyph though this is not recommended due to interference. This is because the option of "tab 1" typing for other purposes may also require the use of apostrophe. Striking the "tab" key followed by "q" also applies to smartphones etc.
f. In smartphones and the like another novel method can be utilized in combination with previous methods whereby glyphs representation take advantage of extended characters. (Example:- "¡" for ቕ as in FIGS. 59, 60, 62 and 71)
g. Striking a "tab" key followed by "shift 1" or "!" renders a "." Ethiopic note glyph.
h. Striking the "tab" key followed by an "a" renders and settles an Ethiopic numeric "1". Other utilize the row. Striking the "tab" key followed by a "z" renders and settles an Ethiopic numeric [፩]. Other utilize the row.
i. Striking the "tab" key followed by the "Q" renders and settles "ቖ|" glyph.
j. The use of keys such as "v" as an alternative to the shift key or first order key.
k. Striking "d" types "ድ" and "da" types "ዳ" while "d4" types "ዷ" and "D4" types "ዿ" and so on. Striking "a" types "አ" while "ta" types "ታ" and "at", "t4" or "aT" types "ጣ". "Ta" or "tA" can also type "ጣ", though "Ta" is better.
l. "ታ" is typed phonetically with "ta" in Qwerty layout and as "p4" in Hele layout. "ጣ" is typed with "Ta" in Qwerty while it is with "c4" in Hele. "4t" typing of "ጣ" is available in Qwerty as an option and "4c" in Hele is also available in the current invention and these hybrid availabilities in double layouts are new claims. However, typing with vowels is better than the numbers because of their proximity to the home keys in computer keyboards. These become irrelevant as the keys are brought together in laptops, on-screen keyboards, custom and related approaches. Even in smartphones there is no need to limit the keys to nine keys per row as the landscape view can handle a dozen or more. Side scrolling the keyboard also makes sizes and shifting less relevant.
m. Distribution of the Ethiopic keys is with considering the potential users of the glyphs. The ዕ series can be typed from keys such as the apostrophe which is also the sixth order home key for others optionally.
n. A method whereby the distribution of the keys to the glyphs is progressive such that the number of users is put into consideration as other sets are incorporated beyond those such as Amharic.

o. Striking an apostrophe key settles the glyph typed ahead of it while a second keystroke renders a different key (" ቯ").

p. Striking a key with fingers, mouse or gadgets with similar effects settle the glyphs while selected keys also alter and settle it.

q. Striking the "w" key renders " ው" and the "e" key renders " ኤ" while "we" renders " ዌ" and "wee" renders " ውኤ". Also "ee", "E" or "xe" renders and settles " ኤ" as a novel invention. The typing of " ኤ" with "xe" or a related combination allows the typing of " ዌ" with "we" and " ውኤ" with "wee". This breakthrough allows the typing and settlement of an Ethiopic default glyph with a keystroke as well as typing more characters with superimposed shift key as in real typing of " ጥ" with "T". This claim is with or without the timer.

r. Striking "wee" to get " ውኤ" is different from getting to the same result of rendering them by typing two or more glyphs from one or more keystrokes. "wee" can type " ው'ኤ" and more in a method whereby a keystroke or two type two or more glyphs respectively by just showing " ውኤ" on the screen is another claim. Breaking up a "wee" spelled typing to " ውኤ" is different from typing it ("wee") where a keystroke could result in the typing of one or more glyphs with a keystroke without showing all the glyphs (" ው'ኤ") on the screen.

s. The above applies to reverse typing and is assisted by the existence of many options as in the typing of " ሥ" with "vs", "'s" or "S".

t. In smartphones or dedicated screens and similar gadgets striking a command key could open a different keyboard whereby a glyph is rendered with a touch or a click and the keyboard then reverts to the default. The glyph may also use two keystrokes on the second keyboard and then revert to the default. There may be more than one key to open up more keyboards from the default. Examples are "shift", " ፩፪፫" and "kb4". The "shift" key could allow the appearance of the glyphs mapped there where the default appear to select the vowel varieties with third keystrokes. The " ፩፪፫" keyboard is mainly for numerals while the fourth keyboard (kb4) is for Latin symbols and more. The keyboard reverts to the default after striking the desired key.

Figure 57:
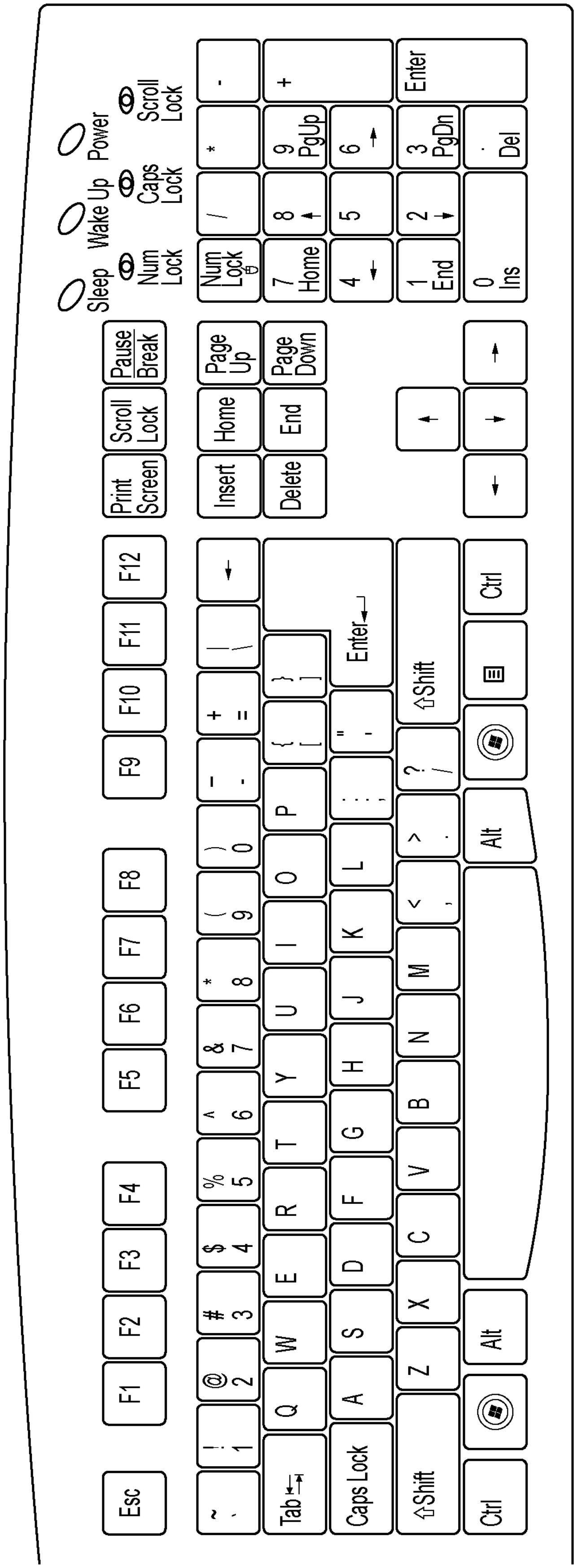
FIG. 57. 101 Keys available for Ethiopic use
Figure 98:
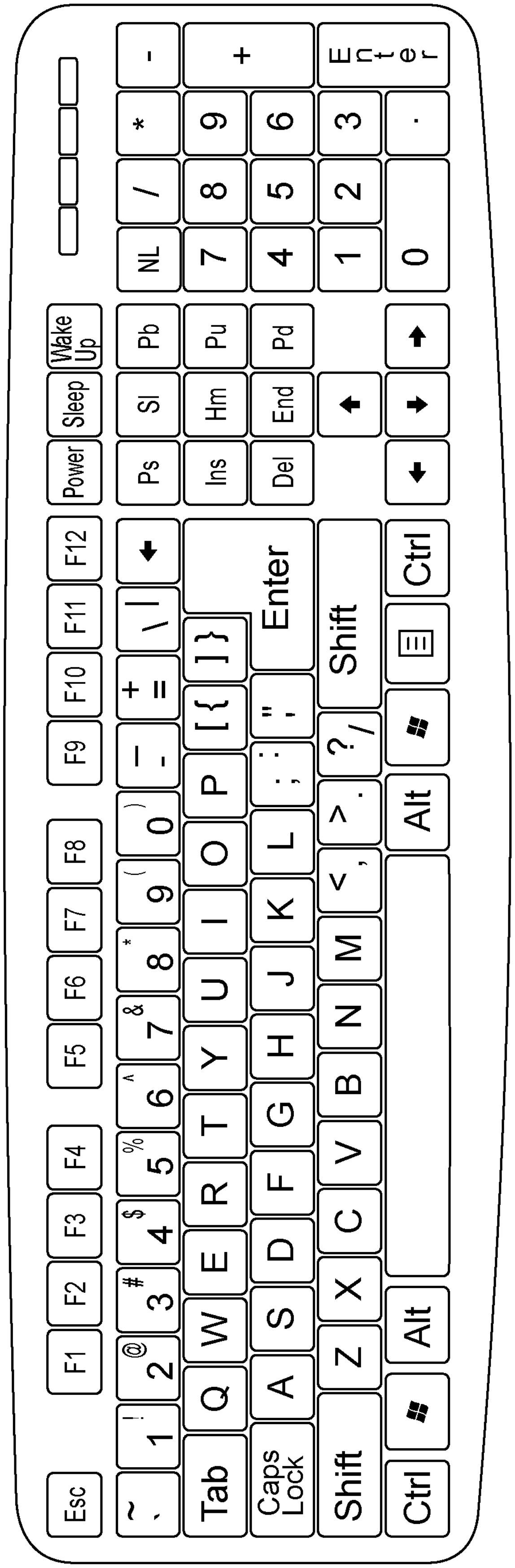
FIG. 98. The more than 75 Default Ethiopic Keys Keyboard
Figure 99:
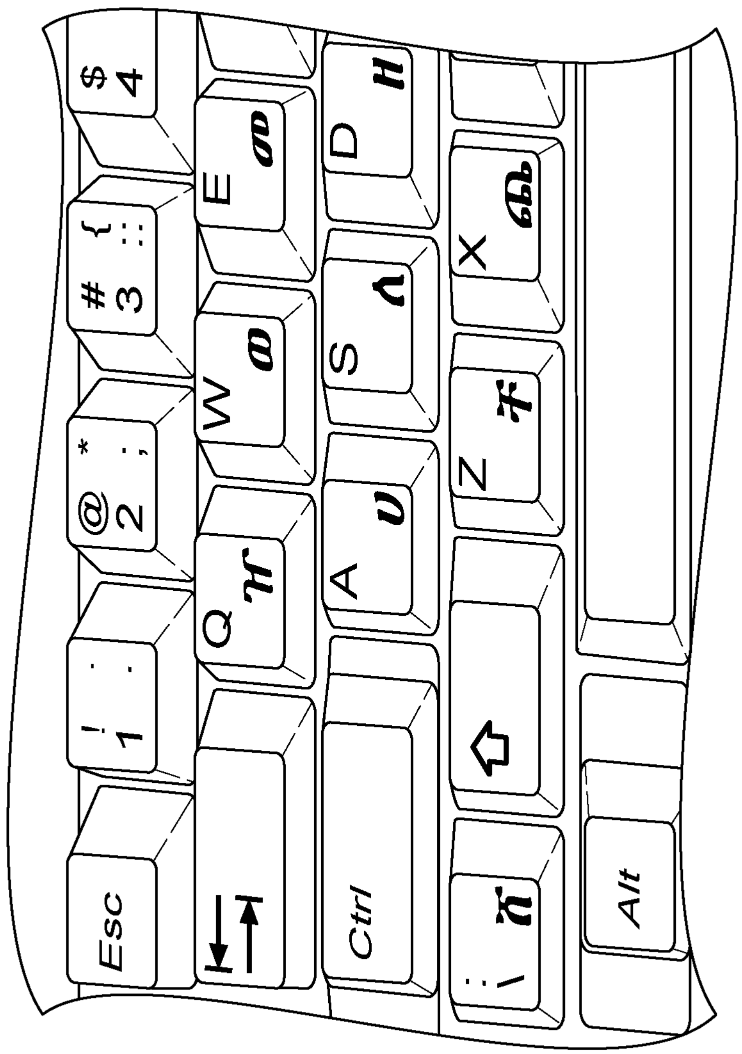
FIG. 99. ModEth Overlay or keys for newer use

4. A method whereby a key particularly command keys such as tabs, alts, ctrls, fns, arrows, alt opts, the numeric pads, the "/*−+." glyphs next to it and the like on computers or other gadgets such as smartphones are programed so that one or more glyphs are generated in many ways such that one keystrokes render the defaults while the rest of the Ethiopic characters are rendered and typed with a maximum of two keystrokes (FIGS. 57 and 98). This does not mean the one and three or more keystrokes in the novel system are excluded from the claim. An example keyboard is Hele and its modifications. The steps are the same as in above except that the number rows or even functions keys are optionally used as vowels along with the command keys. Some have already been mentioned above. The "/*−+." Are also separately programmed from the regular keys in all layouts.

a. Striking the "tab" key renders no glyph or an assigned default. Striking a "1" key renders and settles a different glyph mapped to the key such as " ጎ".

b. Striking a "tab" key followed by the "1" key renders "1" and settle it.

c. Methods described for the Qwerty layout also work for the Hele. The number keys "1234567890" keys can also be mapped to " ኀስቕቭዕኽዥድቫፀ" respectively. Thus " ሃ" mapped to "4" as a vowel is typed to with "1" and "4" or " ሀሃ" as well as the better "q4" or " ሀሃ". Reverse typing and three keystroke methods described earlier and under 3 also apply to the Hele series. The " ዘ" on "k" can share the " ዠ", " ዡ" and " ዟ" series as described for the Qwerty from the "z" key.

d. The Hele layout is more suited to virtual keyboard which in reality is not an advantage. A computer layout example is FIG. 22 where the vowels are on the numbers, shift numbers, the command keys and reverse commands. FIG. 23 is that of Qwerty layout computers where the vowels are on the vowel keys, numbers. Shift numbers, commands and reverse commands. The Ethiopic system requires a minimum of four vowel systems and the Qwerty with six has an advantage over the Hele with four. This is excluding others such as the function keys though laptops and smaller gadgets can use it.

e. A method whereby two or more pieces of any language glyphs are ligated to make representative glyphs with one or two keystrokes. Another approach is to assemble parts such as those of Amharic typewriter fake parts and then convert each to Unicode glyphs with EthioConvert. EthioConvert also converts the ModEth and EthioWord type Ethiopic glyphs rendered from different fonts to Ethiopic Unicode glyphs.

f. A method whereby Ethiopic digit numbers are generated with single keystroke each from other keys.

g. Other features described in 3 above also apply here. For instance, " ሃ" typed with "q4" or " ሀሃ" can be decompressed to " ሀሃ" by typing another "4" as "q44", etc.

h. Comparing the Qwerty and the Hele layouts the Qwerty has an advantage in that it does not need the numeric row and saves on real state and finger movement. The number keys 1234567890 can also be assigned to the ሀሁሂሃሄሂሀሆ[glyph]ቍ[glyph][glyph]ቍ respectively so that "14" types " ሃ" as in FIG. 60. This should not be confused with the usual assignments where the default " ሀ" on "6" is not needed as in FIGS. 4 and 51.

5. A method where all Ethiopic glyphs are typed and settled with a maximum of two keystrokes as shown below examples. This is by avoiding all three keystroke and instead use the command keys as first or second keystrokes. (It is also possible to reduce the number of choices to spread to two keystrokes each.)

a. Striking the "[" key followed by a "1" or "tab" renders and settles "[glyph]" glyph while striking "shift [" or "{" followed by a "1" or "tab" renders and settles "[glyph]". "[glyph]" can be typed with a "1" and "[".

b. Striking the "1" followed by "{" renders and settles the "[glyph]" glyph.

c. Striking a "left ctrl" followed by an "[" or "[" followed by a "left" or "right ctrl" renders and settles the "[glyph]" glyph.

d. It is also possible to assign the "[glyph]" to the "Left ctrl" key and type the vowel forms with the numbers. This expands the default by expanding them as Ethiopic consonants instead of vowels. This is similar to FIG. 74 where the characters are mapped to the bottom row or the top row as in FIGS. 13 and 35.

e. In the above example the "ፌ", "ፏ" and "ፎ" series can be typed from the numbers and commands and bidirectionally and thus there is no need to type any Ethiopic glyph with three keystrokes.

f. Striking the "k" key followed by a "1" renders and settles "ዘ" glyph.

g. Striking the "K" key followed by a "tab" renders and settles "ዠ" glyph.

h. Striking the "k" key followed by "left ctrl" renders and settles "ዣ" glyph left.

i. Striking the "left fn" followed by the "k" renders "ዥ".

j. Striking the command keys and others as first or second strokes bidirectionally expands the keyboard by numerous folds. Apart from the methods mentioned above, the "Q", "A", "Z", rows as well as command rows as well as the numeric pad numerals and the second "/*−+." and even the function keys can be assigned to Ethiopic classes or vowels.

6. Another claim is a method whereby a glyph is typed from more than one of its own home keys in different methods. One way to describe this is the typing of the "ሣ" glyph with "2a", "Sa", "Sva", "@a", "@va", "@Va", "sVa", "2Va" (FIG. 9) and even expand these by additionally assigning the "ሠ" to additional keys such as "R". What is important is to pick the best, standardize it by giving it a universal layout name. "sVa" may type "ሣ" without showing all the intermediate glyphs. The use of multiple typing methods or layouts are utilized at once or separately for typing with different methods. In the "ሀለ" keyboard the "ሀሑ" key can be combined on the "q" key and the keys concentrated to the left side to avoid the right spread of the QWERTY keyboard. "ቈ" can be typed with "qW", "qV", "q8", "vvq", etc. The method whereby the previous keyboard where the vowels are also used for glyphs is incorporated other than adding them to the numeric row and use them as dedicated keys. For instance, "2u", "uu", "us", "Su" and "uS" type "ሡ" while "u2" and "xu2" type "ኡ/ሡ" while "'u" or "2" also type "/ሡ". Varieties eliminate confusion as "S", "vs" and "Sv" type "W". "t2", "T2" or "t fn" as well as "fn t" also types "ጡ".

7. A method whereby two or more keystrokes type a glyph is another claim. Other examples include the typing of "ቐ" with "q1" or "i ctrl" whereby these features are progressively added to the Guragie and Ethiopic choices. The use of multiple methods utilized at once or separately for typing with different methods is another novelty.

8. The use of the numeric keypad for Ethiopic numerals and typing other glyphs should not interfere with the typing of small character sets such as Amharic. The methods are also followed for smartphones and the like with full or abbreviated keyboards. A method whereby the novel Ethiopic numerals mapped to a different typeface are optionally typed from the numeric keypad are also utilized for typing other glyphs. An example is "፩" typed with "1" and "1" and the font is switched to GeezEdit 2 (2). Typing "1" followed by "1" can type the "፩" also restoring the typeface to the previous one (GeezEdit Unicode "፩"). The "one" is the Ethiopic functionally "1" numeral assigned to the numeric pad. The Ethiopic numerals can be typed optionally with single keystrokes while others glyphs require two each. Another novel three keystrokes method involve double striking an "ኣ" and that renders only one "ኣ" while it is programmed to type "ቕ" on striking "q" as a third keystroke. This can be extended to similar glyphs. The apostrophe breaks the pattern if the "q" is to be used after the "ኣ".

9. A method whereby progressive timeout as well as keys such as "apostrophe" are optionally used in timeout and to terminate them. A method whereby a glyph rendered with one or more keystrokes is settled with a keystroke that follow it or them and it includes any key such as space bar or mouse click as addition to previous settling methods. A method whereby Ethiopic is typed with one and two keystrokes only because there are enough keys to dedicate some keys to use as vowels only because the command keys are programmed to act as regular alphabet keys. The methods allow the typing of Ethiopic from a keyboard optionally without the need to toggle though abbreviated keyboards of computer and virtual keyboards. This can be used for English and other keyboards too.

10. A method whereby more than one typing systems are used at the same or different times as in the typing of "ጥ" glyph with ";" and/or "shift t". Apart from using the methods for the 13 Ethiopic-user representative languages, i.e. Agew/Bilen, Amharic, Bench, Basketo, Dawro, Gamu Gofa, Geez, Gumuz, Guragie, Meen, Oromo, Tigre and Tigrigna, it is utilized by numerous Ethiopicuser languages. For instance, Bench and Xamtang share the same keyboard and the inventor picked Bench because it is sorted first in Ethiopic. Geez can now be used for African languages such as Hausa, Luba, Maasai, Somali (simplified version), Soninke, Swahili, Shona, Beja (simplified version), Twi/Ashanti, Nubian, Nuer, Kikuyu, Kongo, Coptic, Oromo (simplified version), Zulu, Zande, Yoruba, Dinka, Ganda and Gebts/Egyptian according to Mark Powell (FIG. 70). The keyboarding can be used by varieties of other languages and alphabets from ASCII Latin to the international phonetic alphabet and virtually all Unicode glyphs. Virtual, external, on-screen, overlays and keyboard keys would be available for the various languages. Each African language can receive its own Geez set and languages like N'ko now have Ethiopic tonal marks. New glyphs can be created from related Ethiopic phenomes as in the past. This keyboarding improves many world alphabet documentations.

11. Methods whereby keys such as "ctrl", "fn", "alt" are utilized for the same Ethiopic typing methods on the left and right sides of the keyboard. Methods whereby hundreds of Ethiopic glyphs are rendered and settled with a maximum of two or three keystrokes only. The apostrophe to settle a glyph can also be included in the programming without showing it. Unlike the ABSHA method where the apostrophe feature was listed in the table (USA Patent 9000.957 to Molla) settlement is now with showing it or without. Methods whereby "one", "three", "four", "five" and "six" keys (on one side as well as well as "seven", "eight", "nine", "zero" and "minus" on the right) can be used for the double "ቈ", "ቊ", "ቋ", "ቌ" and "ቍ". Methods whereby "seven", "eight", "nine", "zero" and "minus" can render and settle "ጦ", "ጧ", "ጧ", "ጮ" and "ጮ".

12. A superior method as the system allows the use of all current methods incorporated while improving on them. The typing methods as well as the assignment of the keys can be changed. The novel Ethiopic numerals can be typed preferably with a default keystroke each from the numeric keypad or with one or two keystrokes each elsewhere. Disabling the "numlock" should not be forgotten.

13. The system includes overlays and keyboard keys with Ethiopic and/or African languages and definition keyboards. The keyboards can be changed to accommodate different languages.

14. A method whereby "1234567" are assigned to independent default orders such as "ቕሥጽኧኽሕዕ" while 8 is reserved for the 8th order glyphs such as "ጟ". Also [90-=] are reserved as keys to switch to ቈቊቜቊ while the ቜ varieties share the 8. Similar novelty is where the 34 Amharic or the 37 Ethiopic were typed from a default key each while some keys also double. In the Hele layout these assigned to the "123456789" are "ስቭኅዕዧፀቕዽቯ" and the positions or even the glyphs can be moved around or changed. The last three can be presented with separate languages as in the past. The "ቈቊቛቜቊ" can keep their orders. This claim is because, for instance, the default or for that matter any key such as "ስ" can be typed from the "1" key or "shift t".

15. A method whereby "ኾ" is typed with "k L. ctrl" or "klv" This "Werkie" method can also be combined with some of the ABSHA features. For instance, "u" types "ኡ" while "'u" ("Apostrophe u") types "ሡ" in the Werkie system. "uv" types "ሠ" and "vu" types "ሡ". A purely "Werkie" one types "ሠ" with "vs" and "ሡ" with "uv". Actually, ABSHA types "ሠ" with "shift u" leaving "uv" to "ሡ". This may be complicated to use and a practical approach is to stick to one and the inventor's preference is Werkie.

16. Use the methods in on-screen keyboards and the like with mouse clicks or fingers. The method could include using methods as in SwiftKey and similar typing methods such as speech, etc. in even dedicated screens with or without mapped keys including Latin characters to type Amharic. The use of multiple methods utilized at once or separately for typing with different methods.

17. Two or more typing methods and layouts independently as in EthioSuite with or and without GeezEdit. A method whereby a glyph is typed with more than one method such as numbers and command keys are utilized. The use of multiple methods utilized at once or separately for typing with different methods. In the "ሀለ" keyboard the "ሀሐ" key can be combined on the "q" key and the keys concentrated to the left side to avoid the right spread of the QWERTY keyboard. The "ሀ" typing can also be performed from the "F1", "1" and/or "Q" keys.

18. A method whereby the smartphone keyboard is used at Ethiopic.com with the apps and the new keyboard. The method is built on the settling and rendering of the Ethiopic glyphs with one and two keystrokes from previous patents and incorporation from these claims. The principle is useful to improve the listing methods where choices are shown while being applicable to improve on them and other alphabets of the world.

19. A method whereby Ethiopic is typed with one and two keystrokes only because there are enough keys to dedicate some keys to use as command keys are programmed to act as regular alphabet keys. The methods allow the typing of Ethiopic from a keyboard optionally without the need to toggle through pages and abbreviated keyboards of computer and virtual keyboards. This can be used for English and other keyboards too. A method of expanding the keys through programming involves both cases and the extended ASCII. The "tab" key can also be utilized as an independent key like the other keys. Keys such as L can accommodate unrelated glyphs for brevity. Example: one of the h's. The method also allows the typing of glyphs such as "ኟጥጽዧ" form "90-=".

20. The typing of Ethiopic with no more than 3 keystrokes is possible because of the use of the command keys for typing Ethiopic. "qv" types "ቀ" while "q1", "vq", (or "qW") is "ቈ" and "Q1" or "Qv" is "ቐ". Also "qv" types "ቀ" while "q1" types "ቈ" and "vq" or 1q types "ቐ". (A simple layout is to type "ቐ" with "q", "ቀ" with "qv", "ቈ" with "vq" and "ቐ" with "q1". It should be remembered that "ቀ" can also be typed with "qtab", "Shift q", "q ctrl", "ctrl q", "q L. Arrow" and more. A method of progressively adding the typing methods as the languages increase without interfering with typing of the small character sets. For instance, Amharic can use the "qa" (ቓ) and "aq" (ቘ) typing while the Guragie can use the numbers. Typing "ዓ" with "ax" is not recommended because of interference. The apostrophe to settle a glyph can also be included in the programming without showing it. Unlike the ABSHA method where the apostrophe feature was listed in the table (U.S. Pat. No. 9,000,957 to Molla) settlement is now with as well as not showing it. It is possible to type "ቘ" with "aaq" or "aQ" or "qA" or "Qa", or "R ctrl" with "q" or "q" with "R ctrl". The second "a" key could be dead. This also applies to three keystrokes where the shift key is involved as in typing "ጥ" with "T" and then "Te" for "ጤ". Typing the "Tee" reverts the "ጤ" to "ጥኤ". A method is also where the typing methods are progressively added to the smaller character sets without altering them. The number 1 key does not have to act as a vowel in those cases where the shift is utilized to render first order glyphs. It is also possible to cut on the Amharic choices as the Ethiopic-user language character sets is increased. Because of the availability of more than one way to type a glyph, it possible to limit the choices and instead focus on unique typing for each method. Typing "ዓ" with "ax" is not recommended because of interference. The apostrophe or extended ASCII glyphs to settle a glyph can also be included in the programming without showing it. It is possible to type "ቘ" with "aaq" or "aQ" or "q" and "R ctrl".

21. The major novelty is the display and settlement of a default glyph with a keystroke and its subsequent modification with vowels without affecting the default settlement. Another major novelty is the display and settlement of a default glyph with two keystrokes and its subsequent modification with vowels without affecting the default settlement. The two keystrokes may involve any including the shift and command keys. The above description for the QWERTY keyboard can apply to any layout and moving the glyphs around or stacking the characters do not make any difference and thus not novel. There are numerous modifications and that it is difficult to cover all the methods. For instance, the rendering and settlement of an Ethiopic glyph with a single default key or with two keystrokes though shift applies to variety of layouts. Two or more keys also render and settle a glyph and that is another claim. The 37 qwerty keys can handle the same number of the Ethiopic in both layouts. A "ሃ" can be typed with "ha", "h4" or both while the "4" key can also type default glyphs such as "ኧ" and "ዐ". Another major novelty is where a command key such as "tab" is programmed whereby a key generates different glyphs by typing it ahead or after it through background programming and governing key sequence table. Another major novelty is where a glyph generated with one or two keystrokes is rendered and settled by incorporating a non-printing glyph through programming and governed by a key sequence table.

Figure 49:
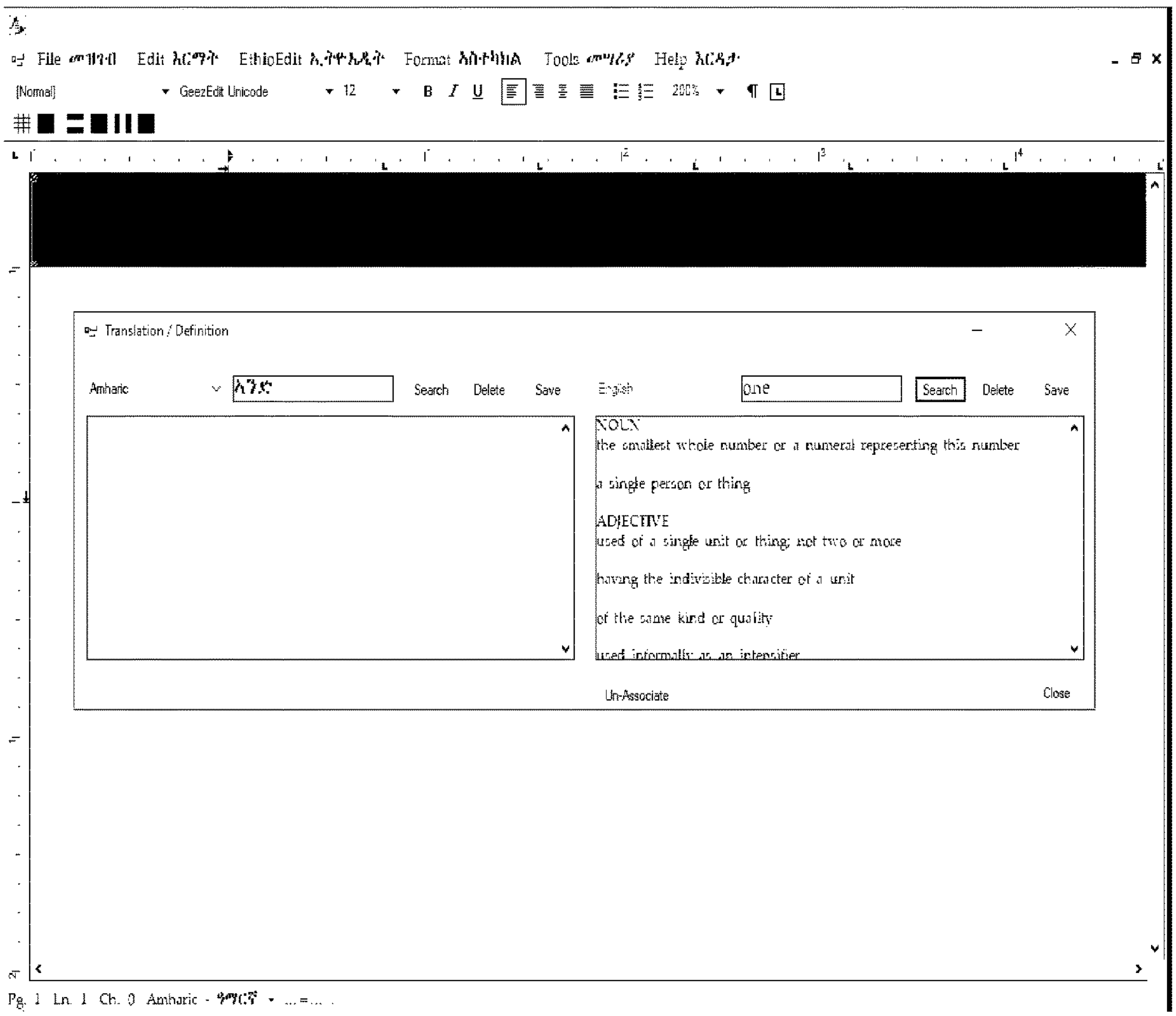
FIG. 49. Building Amharic Lexicon
Figure 50:
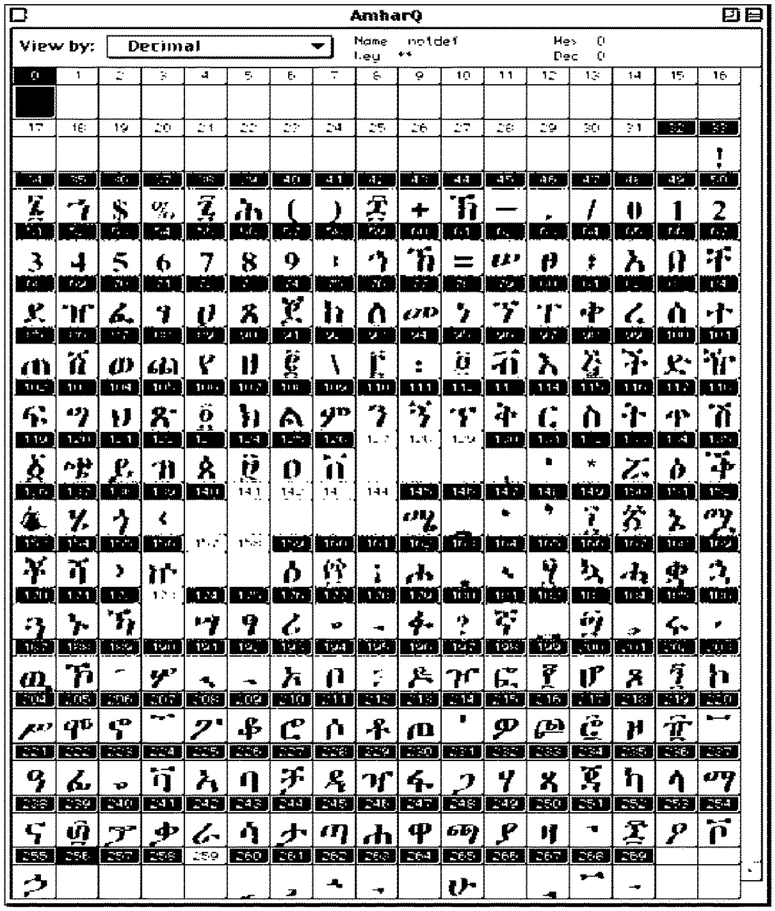
FIG. 50. The invention applies to these types of Molla's fonts too
Figure 51:
FIG. 51. Example Ethiopic Layout
Figure 52:
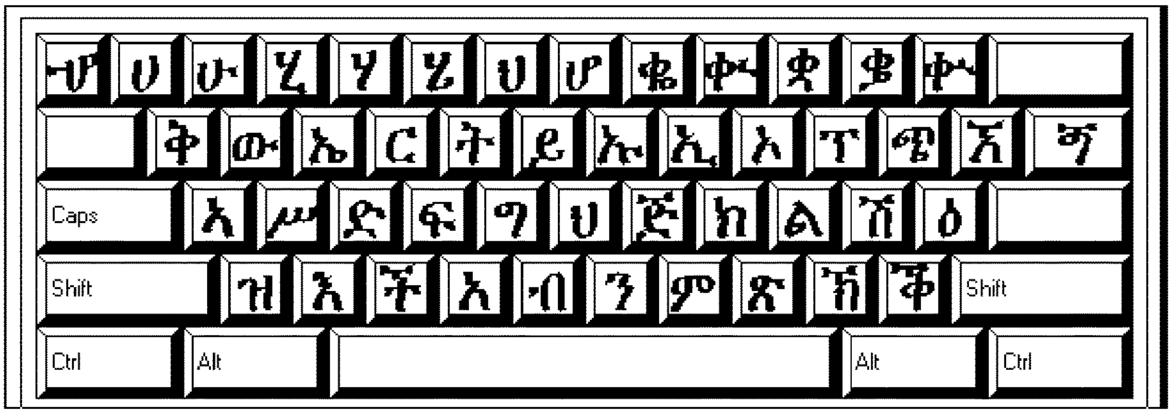
FIG. 52. Another Ethiopic (Optional) Layout with Meen
Figure 53:
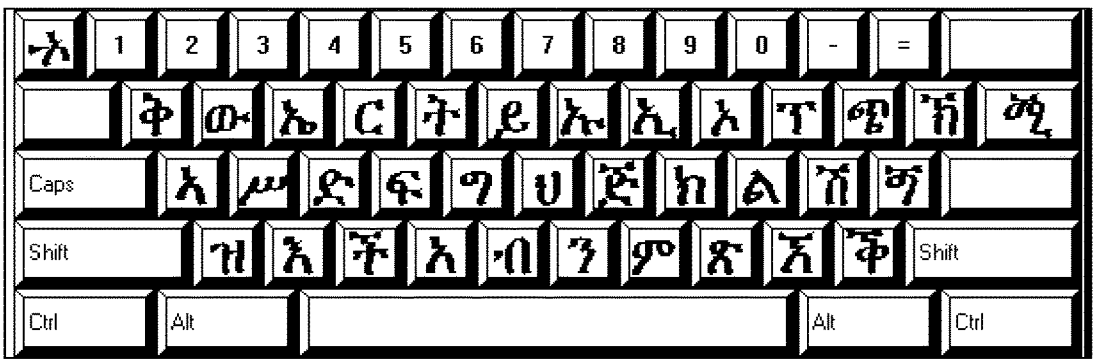
FIG. 53. Another Ethiopic
Figure 79:
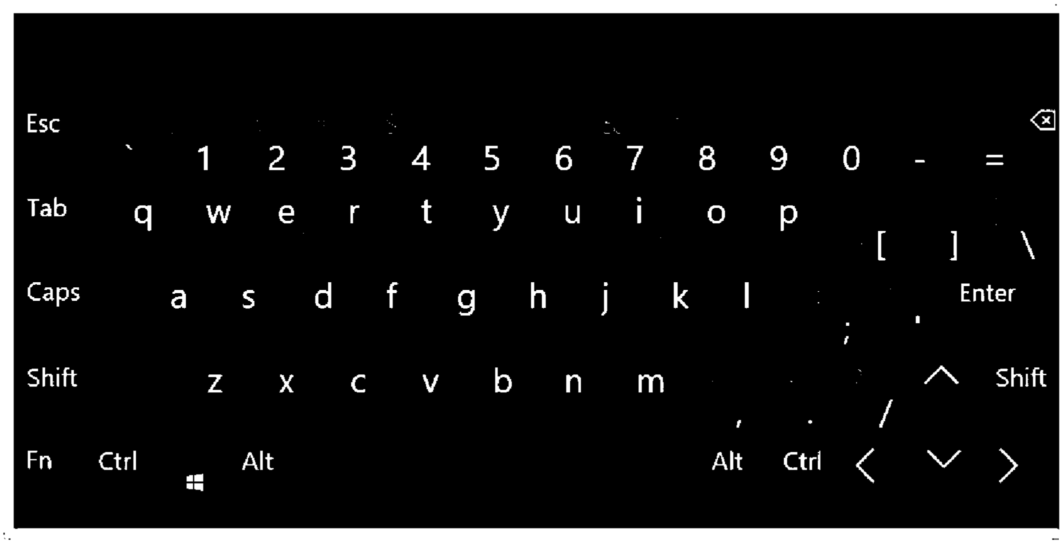
FIG. 79. On-Screen Ethiopic Keyboard on a desktop Windows 10 computer
Figure 85:
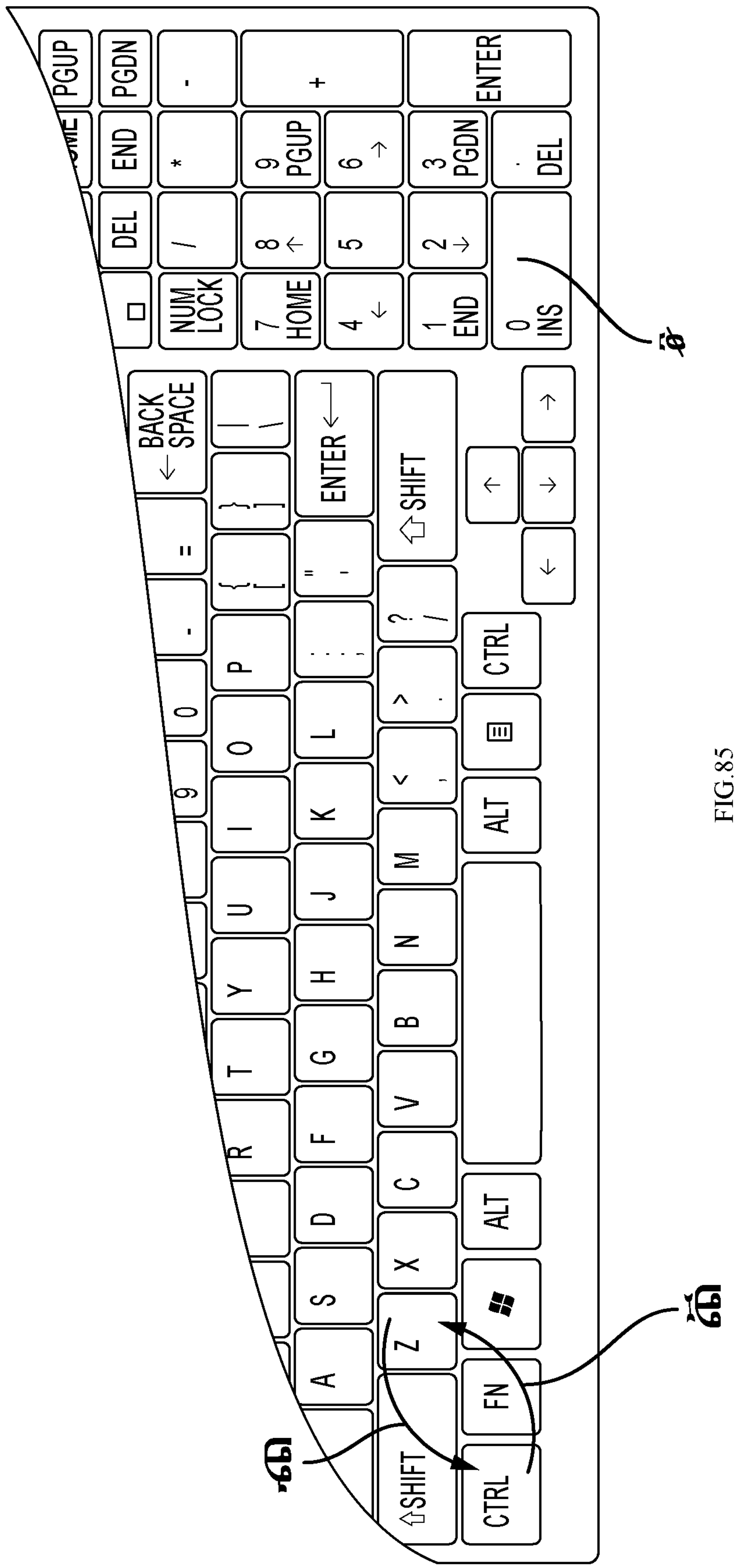
FIG. 85. "ctrl z" or "z ctrl" type different glyphs. Ethiopic zero can also be typed from the numeric keypad FIG. 86. Keymap maintenance defines the Ethiopic and African language keyboards FIG. 87. Default Amharic keyboard FIG. 88. Double strike, shifted or long press could become "RK"
Figure 86:
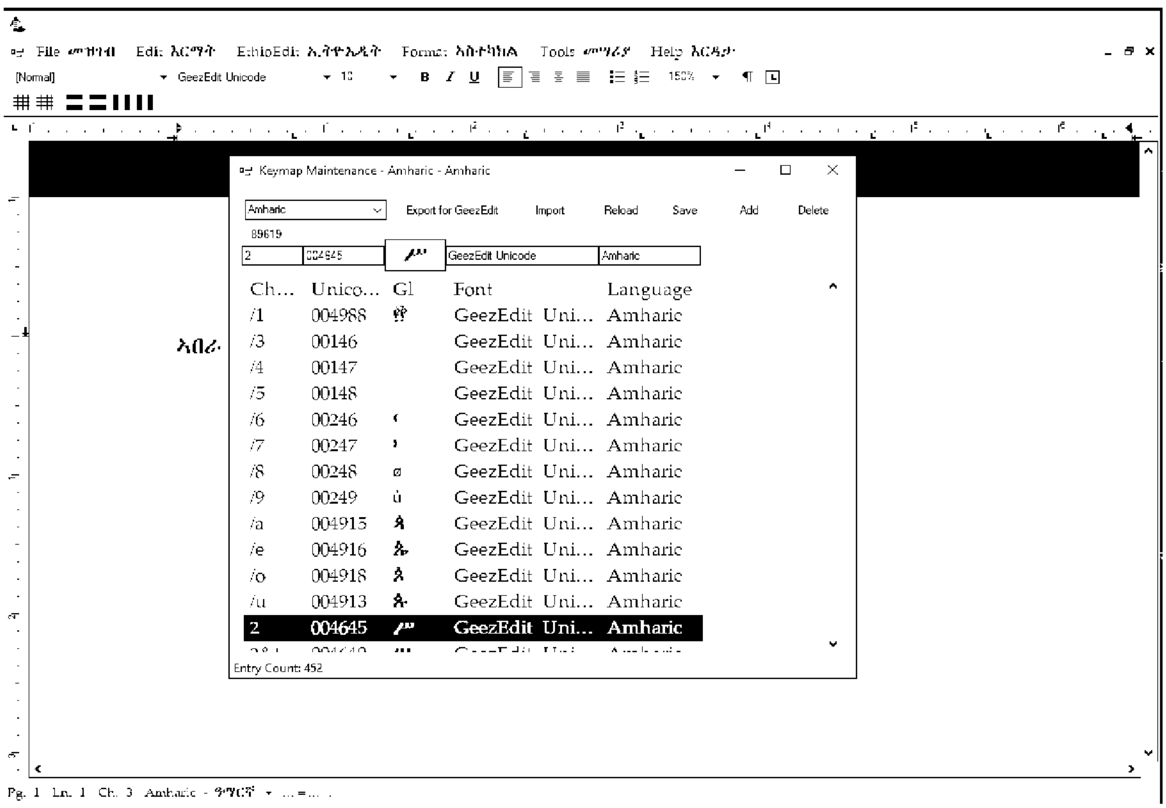
Figure 91:
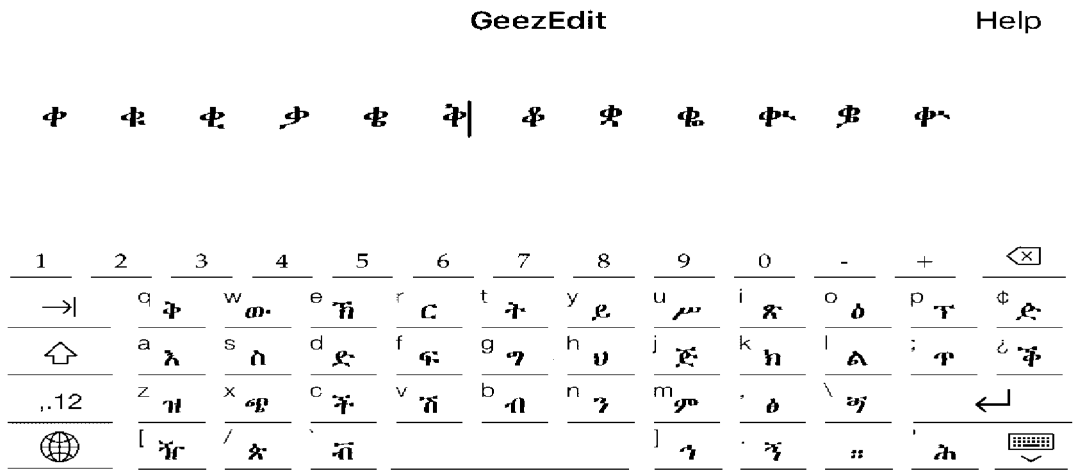
FIG. 91. Ethiopic Smartphone landscape
Figure 100:
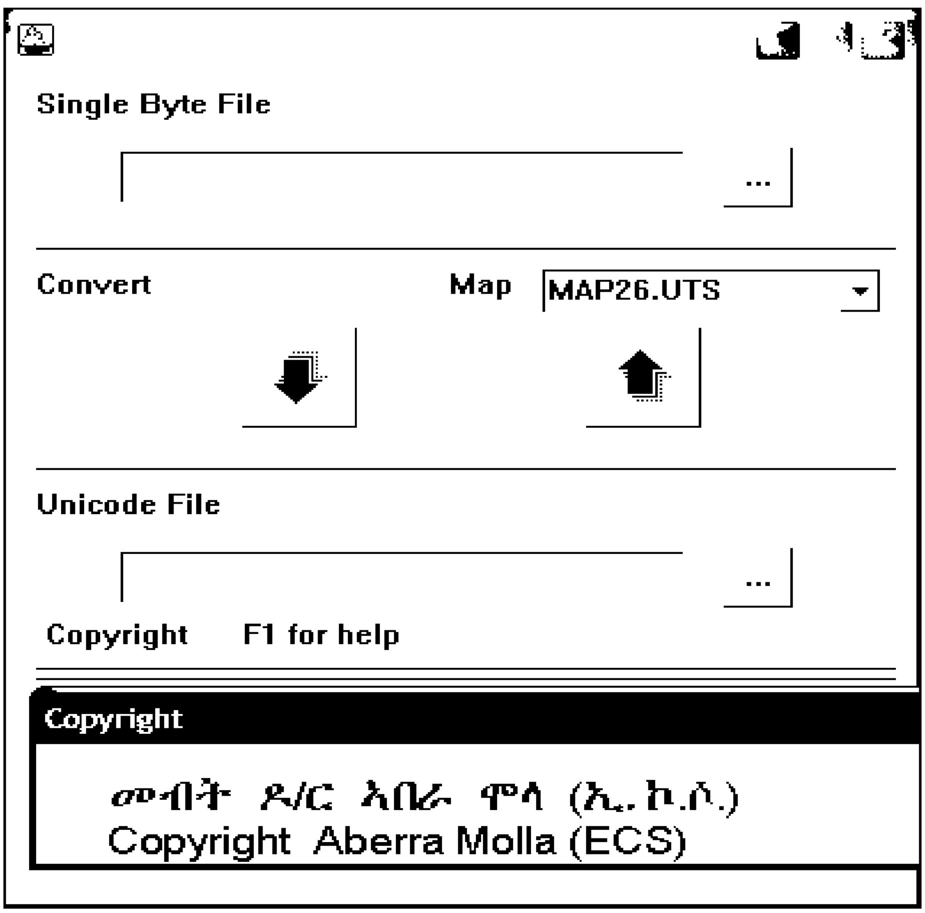
FIG. 100. EthioConvert convers Ethiopic Ascii and ligated glyphs to Unicode
Figure 101:
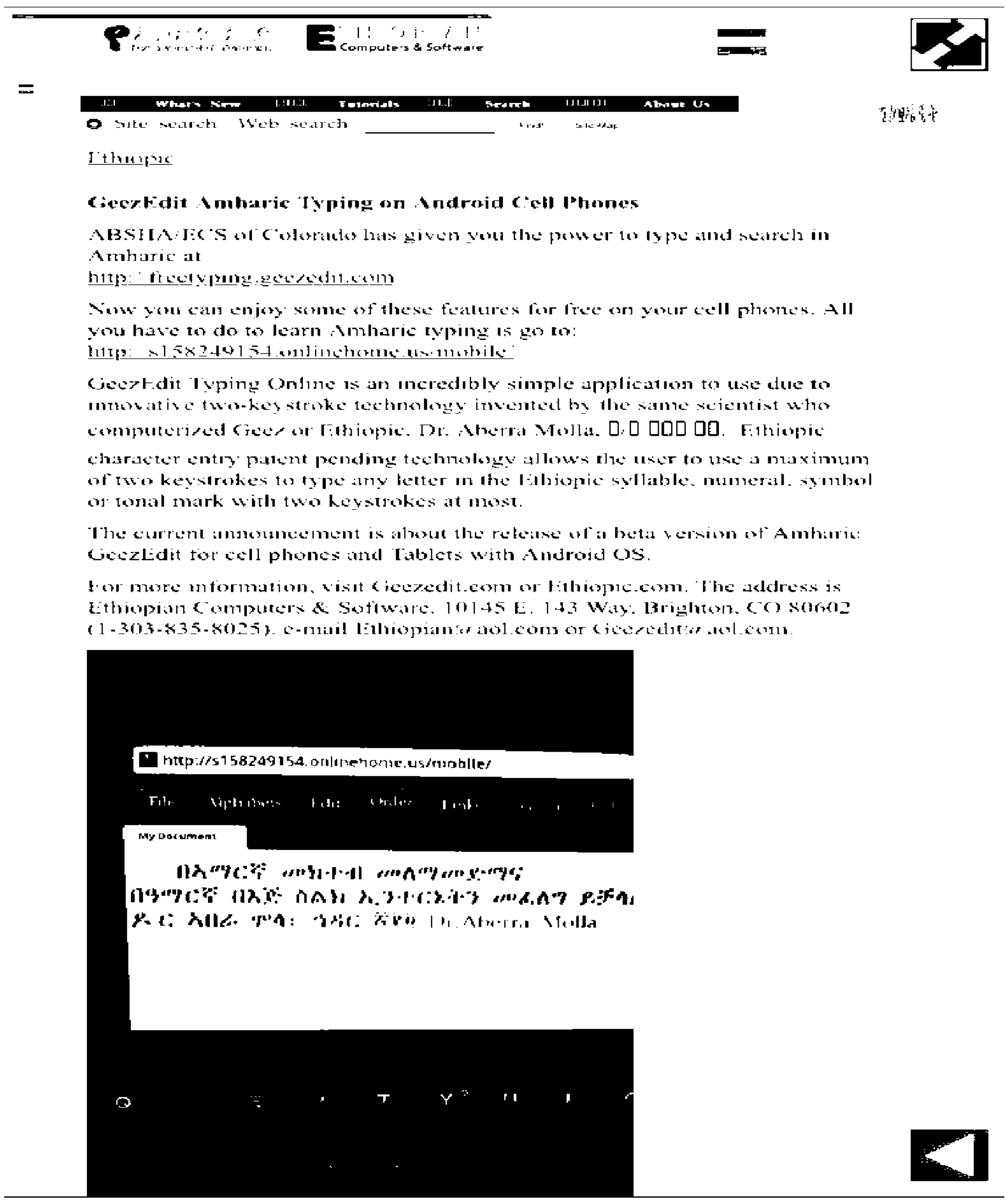
FIG. 101. Amharic in old cellphone
Figure 102:
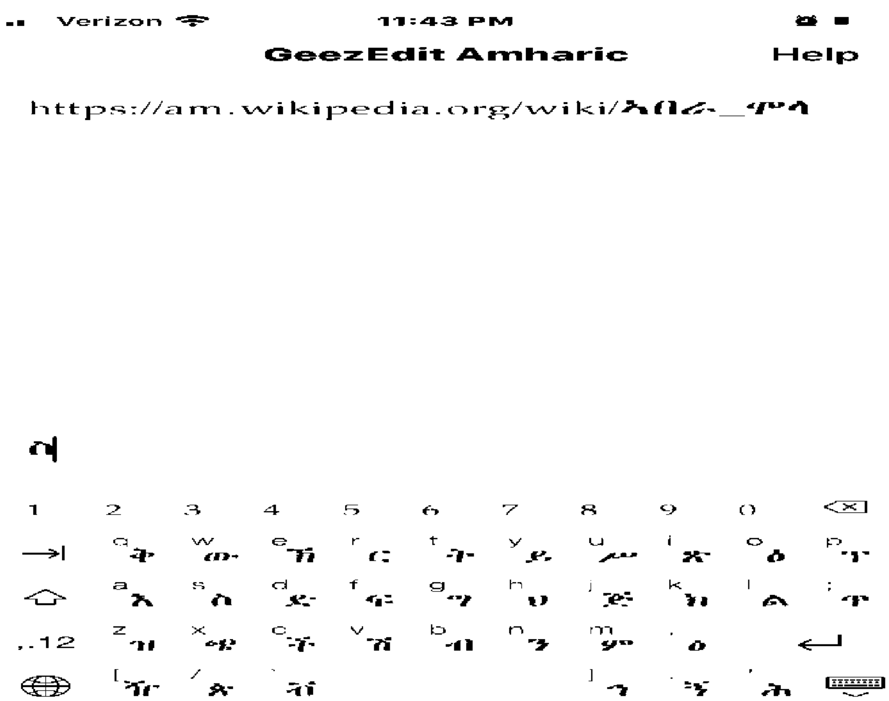
FIG. 102. GeezEdit Amharic
Figure 108:
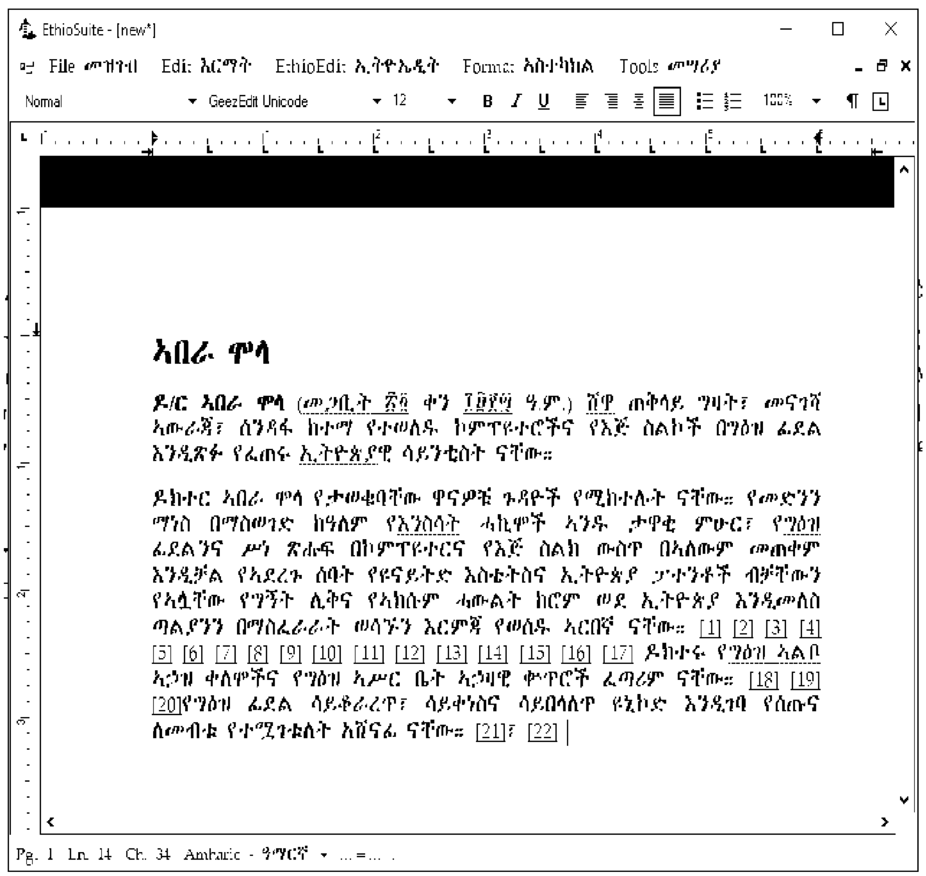
FIG. 108. Amharic in EthioSuite, an Example App

22. The cellphone applications (FIG. 101 from 2012), just like the desktop ones (FIGS. 58, 59, 62, 68, 71, 103 and 105) work in numerous other apps including smartphones and programming in Ethiopic. FIGS. 69 and 79 are examples of onscreen keyboard usage of Ethiopic computer layout in apps such as Notepad, Word and EthioSuite. FIGS. 67 and 86 are to show the key sequence programming of the novel methods. FIG. 108 is to show an independent Ethiopic publisher to build its own features such as dictionary and word databases (FIG. 49). FIG. 100 is to show converter from the fake typewriter glyphs as well as the ModEth type documents to Unicode format of GeezEdit (FIG. 100). 23. Methods described in these applications are a bit complicated and the reasons are because some cover older methods with novel features (FIG. 48, 54, 85, 99), some are old but not publicized before (FIG. 62, 71), some are dedicated features. (FIG. 94, 96), some are obsolete (FIG. 50), some are for dedicated apps (FIG. 49), some are for computers (FIG. 1, 2, 60), some for smartphone (FIG. 21, 25, 87), some are modifications of past methods (FIG. 32, 34, 73, 74, 92, 99), some are new (FIG. 67, 72), some are historical (FIG. 74, 101, 106, 109, 110), some are for non-Unicode glyphs (FIG. 61, 70, 75, 68), etc., some are to improve non-Ethiopic alphabets (FIG. 68, 70, 72) and some are examples of key strokes (80, 81, 84, Tables 1 and 2).

24. Current Ethiopic applications include apps such as GeezEdit, a memory resident application, for computers and smartphones that works in numerous apps made for English and other alphabets. The layout is also used in a dedicated Ethiopic publisher app, EthioSuite. The apps allow switching to English with one or two keystrokes or mouse clicks or taps. The layouts are standardized for potential use in many applications such as programming in Ethiopic languages as well as features such as speech and other methods the Latin alphabet uses. A standardized Ethiopic layout can then be used in different media such as computers, smartphone, on-screen keyboard, etc as in FIG. 12.

25. The system can be used with variety of on-screen keyboards in apps such as Notepad or dedicated screens where the 37 keys represent an order is claimed in the novel methods. This includes modification for use with only one hand.

What is claimed is:

1. A method whereby a typed glyph is rendered and settled, the method comprising:

providing a user-interface wherein the user-interface comprises a display and at least one of a keyboard and a touchscreen;

activating a feature of the user-interface to render a first symbol on the display without settling the first symbol, wherein the first symbol comprises at least one of a character and a glyph;

providing a plurality of options on the display, the plurality of options each comprising a second symbol to which the first symbol may be converted; and performing a second activity to at least one of settle the first symbol and convert the first symbol to the second symbol;

wherein the second activity comprises at least one of a keystroke, a click of a mouse, and saving a file.

2. The method of claim 1, wherein the at least one of a character and a glyph comprises an Ethiopic character.

3. The method of claim 1, wherein the user-interface comprises a QWERTY keyboard.

4. The method of claim 1, wherein the second activity to modify the at least one of a character and a glyph occurs independent of a timer.

5. The method of claim 1, further comprising:

activating the feature of the user-interface to create at least one of a second character and a second glyph;

performing a third activity different from the second activity to modify the at least one of a second character and a second glyph; and wherein the third activity renders and settles the at least one of a second character and a second glyph.

6. The method of claim 5, wherein the third activity to modify that at least one of a second character and a second glyph occurs independent of a timer.

7. The method of claim 1, wherein the user-interface further comprises a mouse.

8. The method of claim 7, wherein one of the plurality of options on the display is selected by operating the mouse to convert the first symbol to the second symbol.

9. The method of claim 1, wherein the plurality of options on the display comprises a first set of symbols and a second set of symbols;

wherein the first set of symbols comprises characters with corresponding keys provided on the at least one of a keyboard;

wherein the second set of symbols comprises characters that are not represented on the at least one of a keyboard.

10. The method of claim 9, wherein a keystroke corresponding to one of the first set of symbols settles a symbol from the second set of symbols.

11. The method of claim 9, wherein the first set of symbols comprise characters of a first language and the second set of symbols comprise characters of a second language.

12. The method of claim 9, wherein one symbol of the second set of symbols is settled by at least one of: typing a key corresponding to one symbol of the first set of symbols, and clicking on a symbol of the second set of symbols using a mouse or a touchscreen.

* * * * *